US011818492B2

(12) United States Patent
Annaka et al.

(10) Patent No.: US 11,818,492 B2
(45) Date of Patent: Nov. 14, 2023

(54) COMMUNICATION MANAGEMENT APPARATUS, IMAGE COMMUNICATION SYSTEM, COMMUNICATION MANAGEMENT METHOD, AND RECORDING MEDIUM

(71) Applicants: Hidekuni Annaka, Saitama (JP); Kenichiro Morita, Tokyo (JP); Kyohsuke Kaminushi, Kanagawa (JP); Hiroyuki Kanda, Kanagawa (JP); Tomonori Aikawa, Kanagawa (JP); Yuya Akimoto, Tokyo (JP)

(72) Inventors: Hidekuni Annaka, Saitama (JP); Kenichiro Morita, Tokyo (JP); Kyohsuke Kaminushi, Kanagawa (JP); Hiroyuki Kanda, Kanagawa (JP); Tomonori Aikawa, Kanagawa (JP); Yuya Akimoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 17/480,159

(22) Filed: Sep. 21, 2021

(65) Prior Publication Data

US 2022/0103763 A1  Mar. 31, 2022

(30) Foreign Application Priority Data

Sep. 30, 2020 (JP) .................................. 2020-166241

(51) Int. Cl.
*H04N 23/90* (2023.01)
*H04N 23/63* (2023.01)
(Continued)

(52) U.S. Cl.
CPC ........... *H04N 5/268* (2013.01); *H04N 5/2624* (2013.01); *H04N 23/635* (2023.01);
(Continued)

(58) Field of Classification Search
CPC ........... H04N 1/00129; H04N 1/00214; H04N 7/181; H04N 23/635; H04N 23/661;
(Continued)

(56) References Cited

U.S. PATENT DOCUMENTS 6,697,105 B1 * 2/2004 Kato ..................... H04N 23/631
348/E7.086
2018/0097682 A1    4/2018 Yoshida et al.
(Continued)

FOREIGN PATENT DOCUMENTS

EP        2 849 439 B1    2/2019
EP        2 641 395 B1   10/2019
(Continued)

OTHER PUBLICATIONS

Extended European Search Report dated Mar. 25, 2022, in corresponding European Patent Application 21196881.3.

*Primary Examiner* — Daniel M Pasiewicz
(74) *Attorney, Agent, or Firm* — XSENSUS LLP

(57) ABSTRACT

A communication management apparatus for communicating with a communication terminal, including circuitry that receives from the communication terminal pieces of designated-position information transmitted, each indicating a corresponding one of a plurality of designated positions in an area where the plurality of image capturing devices are provided, and transmits to the communication terminal identification information of a shareable image capturing device and pieces of predetermined-area information of the shareable image capturing device, the shareable image capturing device being an image capturing device for which distances from any two designated positions among the plurality of designated positions indicated by the pieces of designated-position information are shortest and which is capable of sharing images of the two designated positions, each of the pieces of predetermined-area information of the
(Continued)

shareable image capturing device indicating a predetermined area in which a corresponding one of the two designated positions is viewed at the front.

10 Claims, 42 Drawing Sheets

(51) Int. Cl.
*H04N 23/661* (2023.01)
*H04N 23/698* (2023.01)
*H04N 5/268* (2006.01)
*H04N 5/262* (2006.01)
*H04N 23/80* (2023.01)

(52) U.S. Cl.
CPC ......... *H04N 23/661* (2023.01); *H04N 23/698* (2023.01); *H04N 23/80* (2023.01); *H04N 23/90* (2023.01)

(58) Field of Classification Search
CPC ...... H04N 23/698; H04N 23/80; H04N 23/90; G08B 13/19639; G08B 13/19641; G08B 13/19682; G08B 13/19684; G08B 13/19689
See application file for complete search history.

(56) References Cited

U.S. PATENT DOCUMENTS

| | | |
|---|---|---|
| 2018/0098105 A1 | 4/2018 | Morita et al. |
| 2018/0191787 A1 | 7/2018 | Morita et al. |
| 2018/0227457 A1 | 8/2018 | Morita et al. |
| 2018/0343442 A1* | 11/2018 | Yoshikawa .......... H04N 21/438 |
| 2019/0082144 A1 | 3/2019 | Hakata et al. |
| 2019/0098211 A1 | 3/2019 | Ohmura et al. |
| 2019/0098253 A1 | 3/2019 | Soneda et al. |
| 2019/0191198 A1 | 6/2019 | Morita et al. |
| 2019/0306004 A1 | 10/2019 | Hakata et al. |
| 2019/0306201 A1 | 10/2019 | Ohmura et al. |
| 2019/0306421 A1 | 10/2019 | Takeda et al. |
| 2019/0306458 A1 | 10/2019 | Soneda et al. |
| 2020/0045230 A1 | 2/2020 | Ohmura et al. |
| 2020/0045244 A1 | 2/2020 | Ohmura et al. |
| 2020/0067992 A1 | 2/2020 | Terayama et al. |
| 2020/0186407 A1 | 6/2020 | Morita et al. |
| 2020/0244510 A1 | 7/2020 | Hakata et al. |
| 2020/0177742 A1 | 8/2020 | Homma et al. |
| 2020/0274904 A1 | 8/2020 | Ohmura et al. |
| 2020/0296146 A1 | 9/2020 | Hinohara et al. |
| 2020/0296284 A1 | 9/2020 | Aikawa et al. |
| 2020/0296302 A1 | 9/2020 | Shiro et al. |
| 2021/0026509 A1 | 1/2021 | Homma et al. |
| 2021/0026589 A1 | 1/2021 | Morita et al. |
| 2021/0058521 A1 | 2/2021 | Homma et al. |
| 2021/0090211 A1 | 3/2021 | Takeda et al. |
| 2021/0099669 A1 | 4/2021 | Shiro et al. |
| 2021/0127073 A1* | 4/2021 | Kim ..................... H04N 23/695 |

FOREIGN PATENT DOCUMENTS

| | | |
|---|---|---|
| JP | 2002-077889 | 3/2002 |
| JP | 2017-022587 | 1/2017 |
| JP | 2018-129025 | 8/2018 |
| JP | 2018-129026 | 8/2018 |
| JP | 2021-039468 | 3/2021 |

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 4A
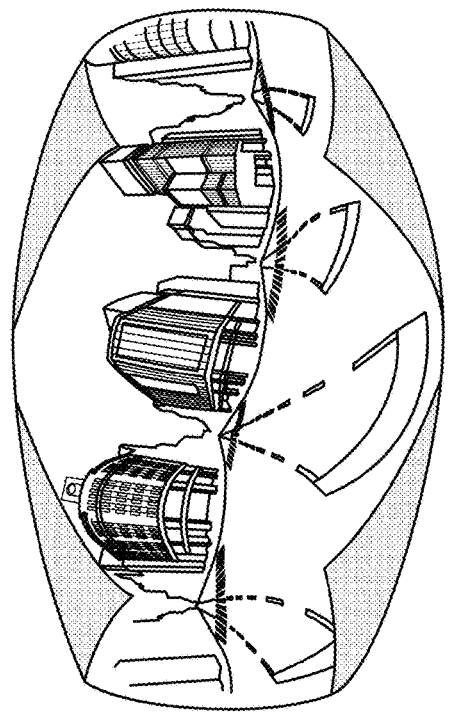
EQUIRECTANGULAR PROJECTION IMAGE EC
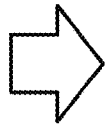
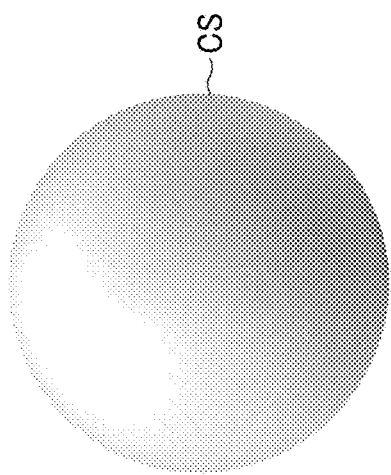
CS
FIG. 4B
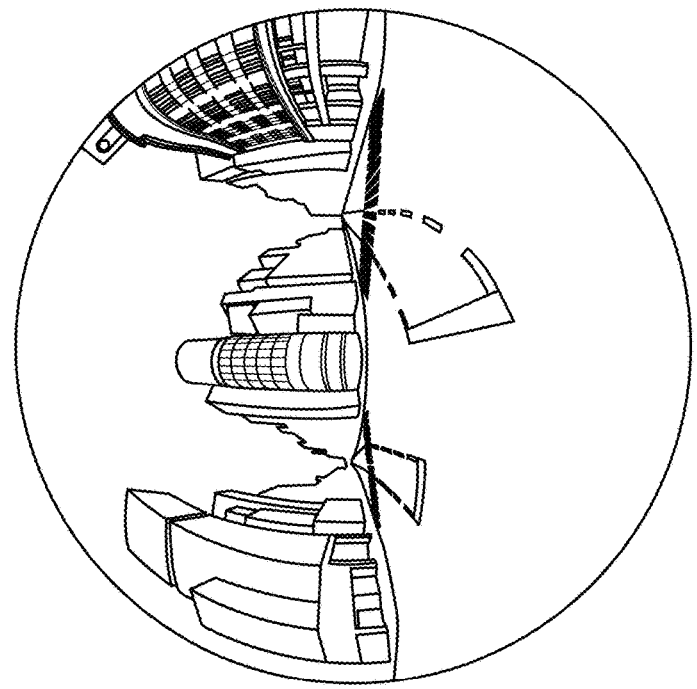
SPHERICAL IMAGE CE

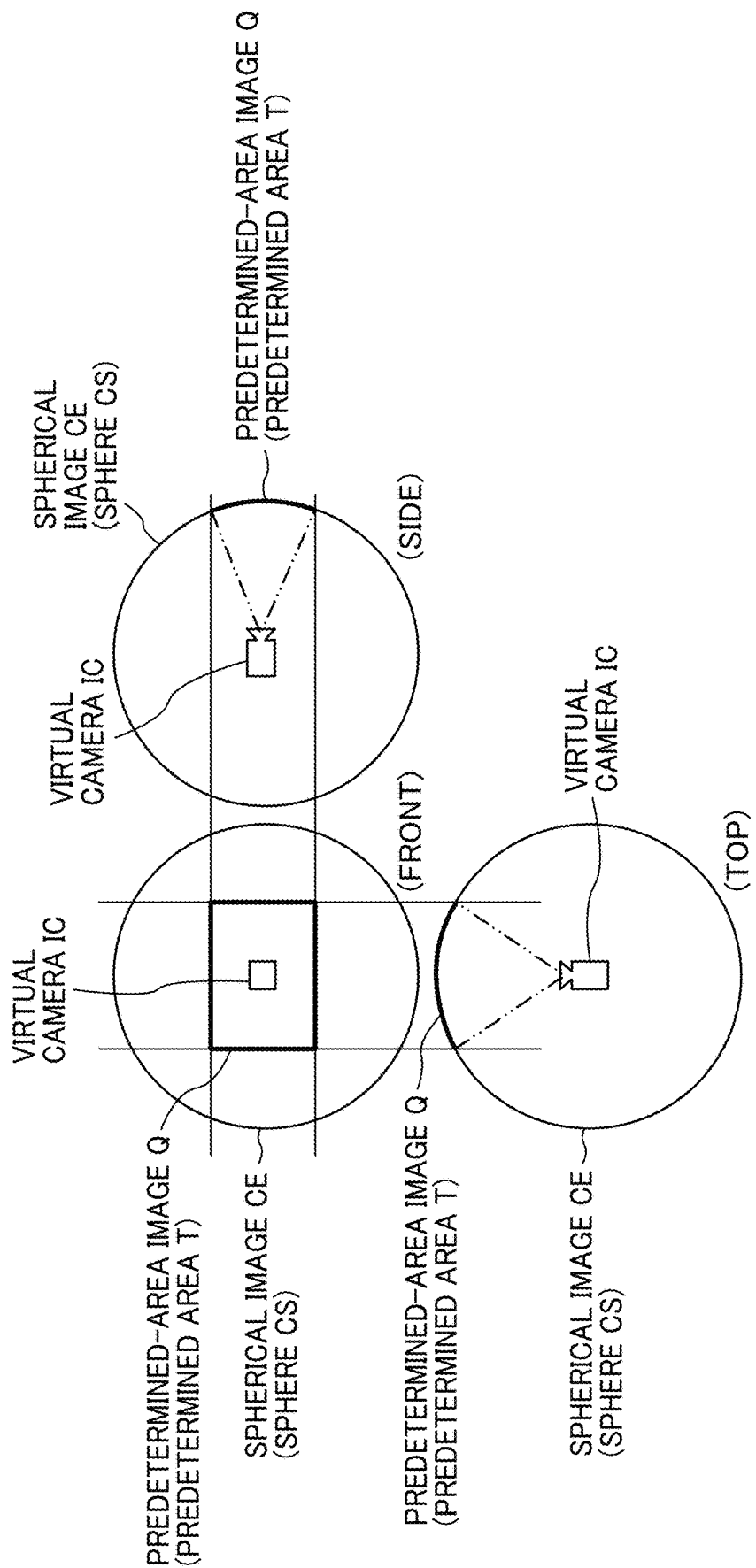

FIG. 15A

IMAGE CAPTURING DEVICE
MANAGEMENT TABLE

| VENDOR ID AND PRODUCT ID IN GUID OF IMAGE CAPTURING DEVICE |
|---|
| vid_05ca&pid_2711 |
| vid_05ca&pid_3822 |
| ... |

FIG. 15B

IMAGE TYPE MANAGEMENT TABLE

| IMAGE DATA ID | IP ADDRESS OF IMAGE CAPTURING DEVICE | SOURCE NAME (IMAGE TYPE INFORMATION) |
|---|---|---|
| RS001 | 2.1.2.3 | Video_Omni |
| RS002 | 2.1.1.5 | Video_Omni |
| RS003 | 2.1.5.4 | Video |
| RS004 | 2.1.5.6 | Video |
| ... | ... | ... |

FIG. 16A

SESSION MANAGEMENT TABLE

| SESSION ID | SITE ID | IP ADDRESS OF PARTICIPANT COMMUNICATION TERMINAL |
|---|---|---|
| se101 | A0001 | 1.2.1.3, 1.2.2.3, 1.2.1.5 |
| se102 | B0001 | 1.2.1.3, 1.2.2.4, 1.2.3.4 |
| ... | ... | ... |

FIG. 16B

IMAGE TYPE MANAGEMENT TABLE

| SESSION ID | IMAGE DATA ID | IP ADDRESSES OF IMAGE CAPTURING DEVICE | SOURCE NAME (IMAGE TYPE INFORMATION) |
|---|---|---|---|
| se101 | RS001 | 2.1.2.3 | Video_Omni |
| se101 | RS002 | 2.1.1.5 | Video_Omni |
| se101 | RS003 | 2.1.5.4 | Video |
| se101 | RS004 | 2.1.5.6 | Video |
| se102 | RS005 | 2.3.2.5 | Video_Omni |
| ... | ... | ... | ... |

FIG. 17

PREDETERMINED-AREA MANAGEMENT TABLE

| IP ADDRESS OF IMAGE CAPTURING DEVICE (IMAGE SOURCE) | POINT-OF-INTEREST COORDINATE VALUES (x, y, z) | IP ADDRESS OF COMMUNICATION TERMINAL (IMAGE DESTINATION) | PREDETERMINED-AREA INFORMATION | | |
|---|---|---|---|---|---|
| | | | RADIAL DISTANCE (r) | POLAR ANGLE (θ) | AZIMUTH ANGLE (φ) |
| 2.1.2.3 | (22,23,0) | 1.2.1.3 | 10 | 20 | 30 |
| 2.1.1.5 | (22,23,0) | 1.2.1.3 | 20 | 30 | 40 |
| 2.1.5.4 | (22,23,0) | 1.2.1.3 | 30 | 40 | 50 |
| 2.1.5.6 | (22,23,0) | 1.2.1.3 | 40 | 70 | 80 |
| 2.1.5.6 | (35,25,0) | 1.2.1.3 | 30 | 90 | 45 |
| 2.1.1.7 | (35,25,0) | 1.2.1.3 | 20 | 25 | 50 |
| 2.1.2.4 | (35,25,0) | 1.2.1.3 | 20 | 50 | 60 |
| 2.1.3.2 | (35,25,0) | 1.2.1.3 | 15 | 40 | 80 |
| ... | ... | ... | ... | ... | ... |
| 2.2.1.5 | (55,45,0) | 1.2.2.4 | 20 | 90 | 45 |
| 2.2.1.6 | (55,45,0) | 1.2.2.4 | 20 | 90 | 90 |
| ... | ... | ... | ... | ... | ... |

FIG. 18

ARRANGEMENT INFORMATION MANAGEMENT TABLE

| SITE ID | IP ADDRESS OF IMAGE CAPTURING DEVICE | COORDINATE VALUES (x, y, z) | ARRANGEMENT DIRECTION OF IMAGE CAPTURING DEVICE |
|---|---|---|---|
| A0001 | 2.1.2.3 | (20,20,0) | 270° |
| A0001 | 2.1.1.5 | (20,30,0) | 180° |
| A0001 | 2.1.5.4 | (30,20,0) | 90° |
| A0001 | 2.1.5.6 | (30,30,0) | 0 |
| A0001 | 2.1.2.6 | (30,40,0) | 0 |
| A0001 | 2.1.1.7 | (40,30,0) | 0 |
| A0001 | 2.1.2.4 | (40,40,0) | 0 |
| ... | ... | ... | ... |
| B0001 | 2.2.1.5 | (50,30,0) | 45° |
| B0001 | 2.2.1.6 | (50,40,0) | 180° |
| B0001 | 2.2.2.7 | (60,30,0) | 60° |
| B0001 | 2.2.3.8 | (60,40,0) | 0 |
| ... | ... | ... | ... |

FIG. 19

DISTRIBUTION-SITE MANAGEMENT TABLE

| SITE ID | SITE NAME | MAP IMAGE DATA AND SITE COORDINATE INFORMATION |
|---------|-----------|------------------------------------------------|
| A0001 | FLOOR A1 | aaa.siteA.com |
| B0001 | FLOOR B1 | bbb.siteB.com |
| ... | ... | ... |

FIG. 20A

IMAGE TYPE MANAGEMENT TABLE

| IMAGE DATA ID | IP ADDRESS OF IMAGE CAPTURING DEVICE | SOURCE NAME (IMAGE TYPE INFORMATION) |
|---|---|---|
| RS001 | 2.1.2.3 | Video_Omni |
| RS002 | 2.1.1.5 | Video_Omni |
| RS008 | 2.1.5.4 | Video_Omni |
| RS009 | 2.1.5.6 | Video_Omni |
| RS009 | 2.1.5.6 | Video_Omni |
| RS011 | 2.1.1.7 | Video_Omni |
| RS013 | 2.1.2.4 | Video_Omni |
| RS015 | 2.1.3.2 | Video_Omni |
| ... | ... | ... |

FIG. 20B

PREDETERMINED-AREA MANAGEMENT TABLE

| IP ADDRESS OF IMAGE CAPTURING DEVICE | POINT-OF-INTEREST COORDINATE VALUES (x, y, z) | PREDETERMINED-AREA INFORMATION | | |
|---|---|---|---|---|
| | | RADIAL DISTANCE (r) | POLAR ANGLE ($\theta$) | AZIMUTH ANGLE ($\phi$) |
| 2.1.2.3 | (22,23,0) | 10 | 20 | 30 |
| 2.1.1.5 | (22,23,0) | 20 | 30 | 40 |
| 2.1.5.4 | (22,23,0) | 30 | 40 | 50 |
| 2.1.5.6 | (22,23,0) | 40 | 70 | 80 |
| 2.1.5.6 | (35,25,0) | 30 | 90 | 45 |
| 2.1.1.7 | (35,25,0) | 20 | 25 | 50 |
| 2.1.2.4 | (35,25,0) | 20 | 50 | 60 |
| 2.1.3.2 | (35,25,0) | 15 | 40 | 80 |
| ... | ... | ... | ... | ... |

COMMUNICATION MANAGEMENT APPARATUS, IMAGE COMMUNICATION SYSTEM, COMMUNICATION MANAGEMENT METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-166241, filed on Sep. 30, 2020, in the Japan Patent Office, the entire disclosure of which is hereby incorporated by reference herein.

BACKGROUND

Technical Field

The present disclosure relates to a communication management apparatus, an image communication system, a communication management method, and a non-transitory recording medium.

Description of the Related Art

An image capturing device capable of capturing an omnidirectional scene using a plurality of wide-angle lenses or fish-eye lenses is known. Also known is a system capable of distributing image data of an image captured using such an image capturing device in real time such that a distribution site where the image capturing device is disposed is viewable at a different site in real time.

For example, there is a system in which images captured by a plurality of cameras at a remote location are displayed on a terminal such that a user can grasp the situation at the remote location.

In the existing method, however, it is difficult to simultaneously provide captured images of a plurality of points of interest using a single image capturing device.

SUMMARY

Example embodiments include a communication management apparatus for communicating with a communication terminal that displays images captured by a plurality of image capturing devices. The communication management apparatus includes circuitry that receives pieces of designated-position information transmitted from the communication terminal, each of the pieces of designated-position information indicating a corresponding one of a plurality of designated positions in an area where the plurality of image capturing devices are provided. The circuitry further transmits, to the communication terminal, identification information of a shareable image capturing device selected from among the plurality of image capturing devices and pieces of predetermined-area information of the shareable image capturing device, the shareable image capturing device being an image capturing device for which distances from any two designated positions among the plurality of designated positions indicated by the pieces of designated-position information that are received are shortest and which is capable of sharing images of the two designated positions, each of the pieces of predetermined-area information of the shareable image capturing device indicating a predetermined area in which a corresponding one of the two designated positions is viewed at the front.

Example embodiments include an image communication system including the communication management apparatus, and the communication terminal.

Example embodiments include a communication management method, performed by a communication management apparatus, the communication management apparatus being configured to communicate with a communication terminal that displays images captured by a plurality of image capturing devices. The communication management method includes: receiving pieces of designated-position information transmitted from the communication terminal, each of the pieces of designated-position information indicating a corresponding one of a plurality of designated positions in an area where the plurality of image capturing devices are provided; and transmitting to the communication terminal identification information of a shareable image capturing device selected from among the plurality of image capturing devices and pieces of predetermined-area information of the shareable image capturing device, the shareable image capturing device being an image capturing device for which distances from any two designated positions among the plurality of designated positions indicated by the received pieces of designated-position information are shortest and which is capable of sharing images of the two designated positions, each of the pieces of predetermined-area information of the shareable image capturing device indicating a predetermined area in which a corresponding one of the two designated positions is viewed at the front.

Example embodiments include a non-transitory recording medium which, when executed by one or more processors, causes the processors to perform the communication management method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4A is a conceptual diagram illustrating how a surface of a sphere is covered with the equirectangular projection image according to an embodiment of the present disclosure;

FIG. 4B is a view illustrating a spherical image according to an embodiment of the present disclosure;

FIG. 5 is a view illustrating positions of a virtual camera and a predetermined area in a case in which the spherical image is of a three-dimensional solid sphere according to an embodiment of the present disclosure;

FIG. 15A is a conceptual diagram illustrating an example image capturing device management table according to an embodiment of the present disclosure;

FIG. 15B is a conceptual diagram illustrating an example image type management table according to an embodiment of the present disclosure;

FIG. 16A is a conceptual diagram illustrating an example session management table according to an embodiment of the present disclosure;

FIG. 16B is a conceptual diagram illustrating an example image type management table according to an embodiment of the present disclosure;

FIG. 17 is a conceptual diagram illustrating an example predetermined-area management table according to an embodiment of the present disclosure;

FIG. 18 is a conceptual diagram illustrating an example arrangement information management table according to an embodiment of the present disclosure;

FIG. 19 is a conceptual diagram illustrating an example distribution-site management table according to an embodiment of the present disclosure;

FIG. 20A is a conceptual diagram illustrating an example image type management table according to an embodiment of the present disclosure;

FIG. 20B is a conceptual diagram illustrating an example predetermined-area management table according to an embodiment of the present disclosure;

Figure 1C:
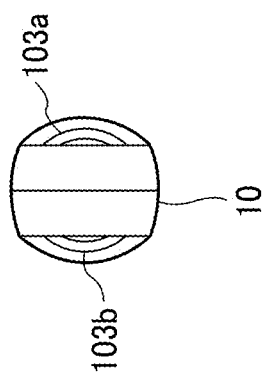
FIGS. 1A, 1B, and 1C are a side view, a front view, and a plan view of an image capturing device according to an embodiment of the present disclosure, respectively.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, one or more embodiments of the present disclosure will be described with reference to the drawings. In the drawings, any redundant descriptions thereof will be omitted.

Image Generation Method

An image generation method according to one or more embodiments will be described with reference to FIGS. 1A to 8.

Figure 1B:
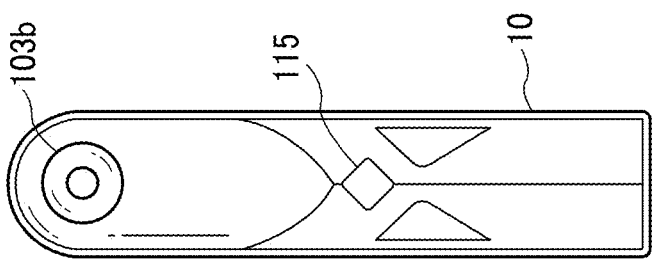
Figure 1A:
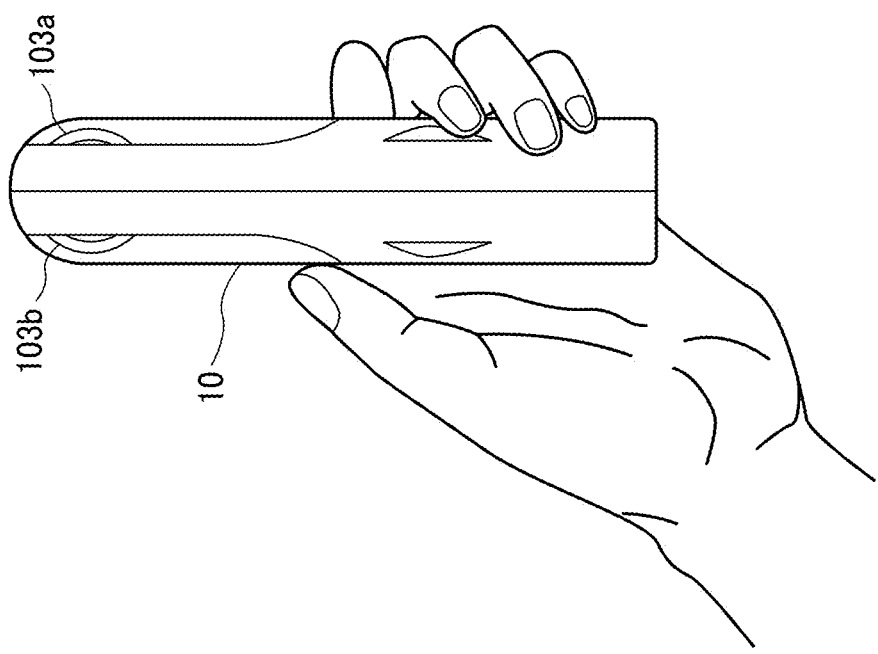

First, the external appearance of an image capturing device 10 will be described with reference to FIGS. 1A to 1C. The image capturing device 10 is a digital camera for capturing images from which a 360-degree spherical image is generated. FIGS. 1A, 1B, and 1C are a side view, a front view, and a plan view of the image capturing device 10, respectively.

As illustrated in FIG. 1A, the image capturing device 10 has a size such that a person can hold the image capturing device 10 with one hand. As illustrated in FIGS. 1A, 1B, and 1C, the image capturing device 10 includes an imaging element 103a and an imaging element 103b in an upper portion thereof such that the imaging element 103a is disposed on the front side and the imaging element 103b is disposed on the back side. The imaging elements (image sensors) 103a and 103b are used together with an optical member (e.g., lenses 102a and 102b described below) capable of capturing a hemispherical image (with an angle of view of 180 degrees or more). As illustrated in FIG. 1B, the image capturing device 10 further includes an operation device 115 such as a shutter button on the back surface of the image capturing device 10.

Figure 2:
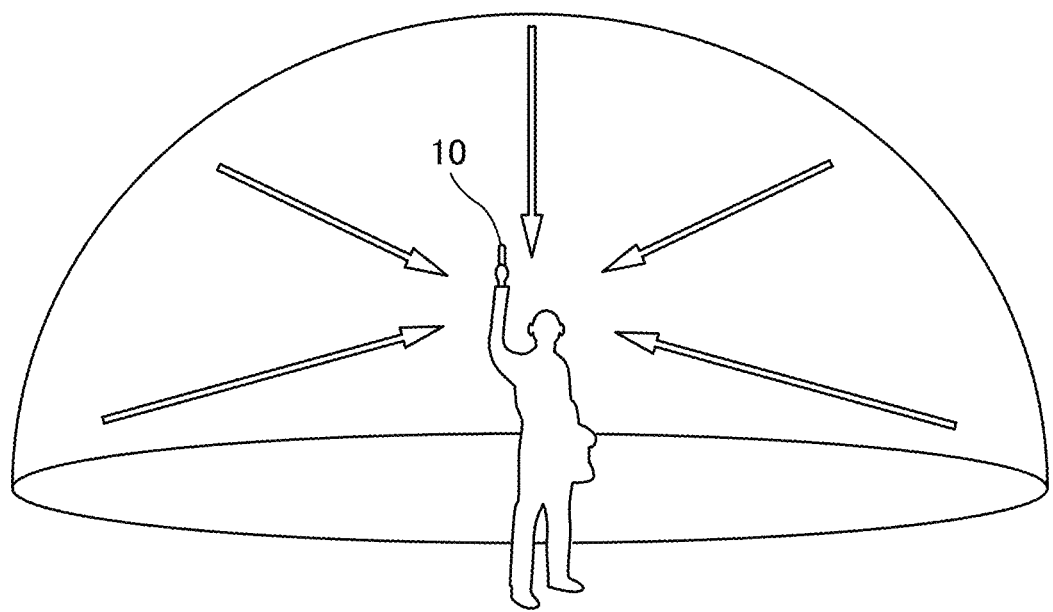
FIG. 2 is an illustration for explaining how a user uses the image capturing device, according to an embodiment of the present disclosure.

Next, a situation in which the image capturing device 10 is used will be described with reference to FIG. 2. FIG. 2 is an illustration for explaining how a user uses the image capturing device 10. As illustrated in FIG. 2, the image capturing device 10 is used to, for example, capture an image of objects around the user when the user holds the image capturing device 10 with one hand. The imaging elements 103a and 103b illustrated in FIGS. 1A to 1C capture the objects surrounding the user to obtain two hemispherical images.

Figure 3A:
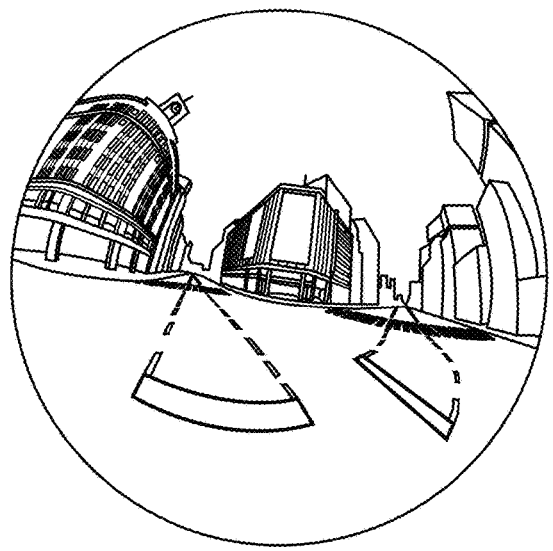
FIGS. 3A, 3B, and 3C are views illustrating a hemispherical image (front side) captured by the image capturing device, a hemispherical image (back side) captured by the image capturing device, and an image in equirectangular projection, respectively, according to an embodiment of the present disclosure.
Figure 3B:
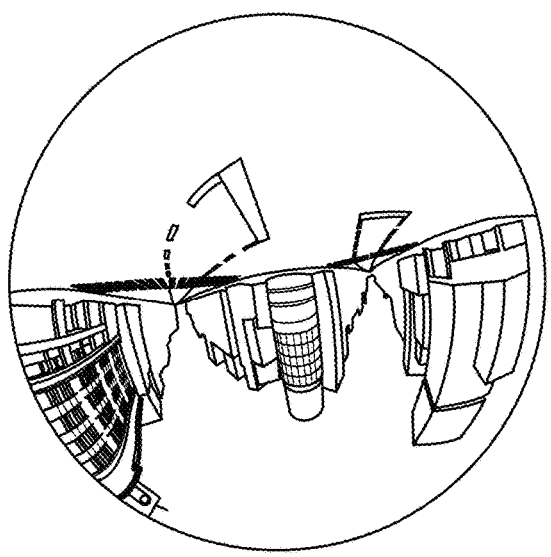
Figure 3C:
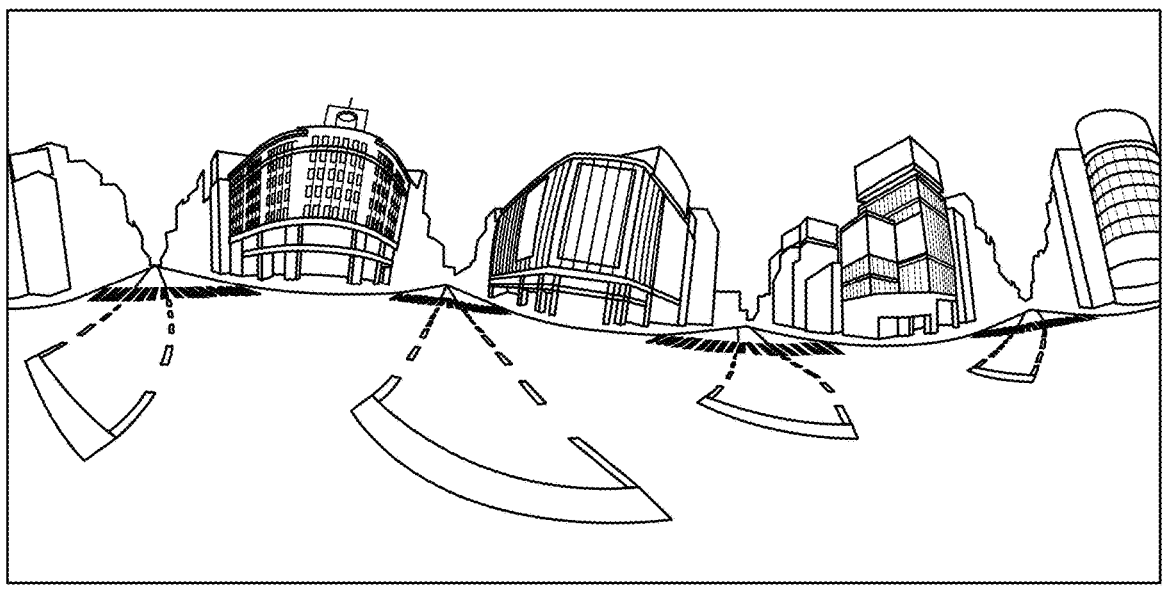

Next, an overview of processing for images captured by the image capturing device will be described with reference to FIGS. 3A to 4B. FIG. 3A is a view illustrating a hemispherical image (front side) captured by the image capturing device 10, FIG. 3B is a view illustrating a hemispherical image (back side) captured by the image capturing device 10, and FIG. 3C is a view illustrating an image in equirectangular projection (hereinafter referred to as "equirectangular projection image"). FIG. 4A is a conceptual diagram illustrating how a surface of a sphere is covered with the equirectangular projection image, and FIG. 4B is a view illustrating a spherical image.

As illustrated in FIG. 3A, an image obtained by the imaging element 103a is a curved hemispherical image (front side) captured through the lens 102a described below. Also, as illustrated in FIG. 3B, an image captured by the imaging element 103b is a curved hemispherical image (back side) captured through the lens 102b described below. The image capturing device 10 combines the hemispherical image (front side) and the hemispherical image (back side), which is flipped by 180 degrees, to create an equirectangular projection image EC illustrated in FIG. 3C.

Then, as illustrated in FIG. 4A, the image capturing device 10 uses Open Graphics Library for Embedded Systems (OpenGL ES) to map the equirectangular projection image EC onto the surface of the sphere so as to cover the surface of the sphere to create a spherical image (spherical panoramic image) CE illustrated in FIG. 4B. In other words, the spherical image CE is represented such that the equirectangular projection image EC corresponds to a surface facing the center of the sphere. OpenGL ES is a graphics library used for visualizing two-dimensional (2D) and three-dimensional (3D) data. The spherical image CE may be either a still image or a moving image.

As described above, the spherical image CE is an image mapped onto a sphere surface so as to cover the sphere surface and may look strange to the human eye. The image capturing device 10 displays the spherical image CE such that a predetermined area T included in the spherical image CE is represented as a flat image having fewer curves. Thus, it is less likely that a person viewing the spherical image CE feels strange. An image of the predetermined area T is hereinafter referred to as "predetermined-area image". The display of the predetermined-area image will be described with reference to FIGS. 5 to 8.

Figure 6A:
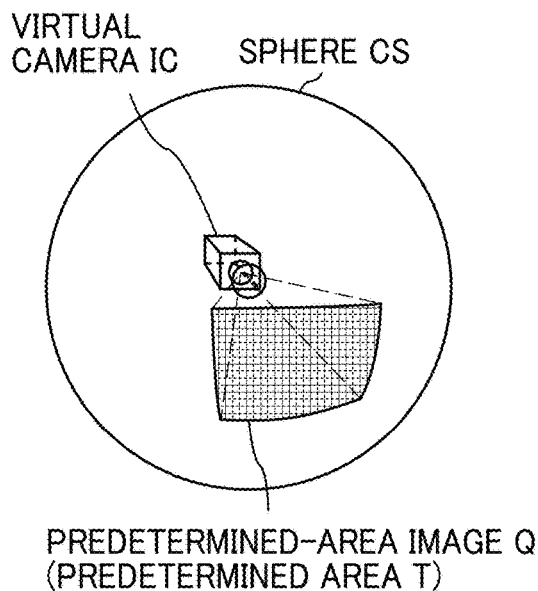
FIG. 6A is a perspective view of the virtual camera and the predetermined area illustrated in FIG. 5 according to an embodiment of the present disclosure.
Figure 6B:
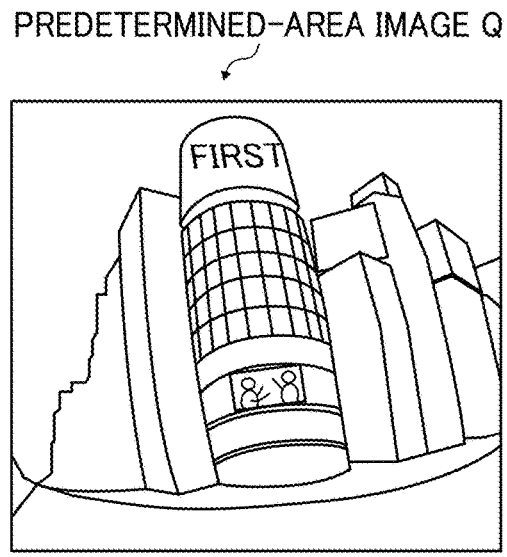
FIG. 6B is a view illustrating an image of the predetermined area displayed on a display according to an embodiment of the present disclosure.

FIG. 5 is a view illustrating positions of a virtual camera IC and the predetermined area T in a case in which the spherical image CE is of a three-dimensional solid sphere. The virtual camera IC is at a position of a point of view of a user who is viewing the spherical image CE displayed on the surface of the three-dimensional solid sphere. FIG. 6A is a perspective view of the virtual camera IC and the predetermined area T illustrated in FIG. 5, and FIG. 6B is a view illustrating an image of the predetermined area T displayed on a display. In FIG. 6A, the spherical image CE illustrated in FIG. 5 is represented by a three-dimensional solid sphere CS. Assuming that the spherical image CE generated in the way described above is represented by the solid sphere CS, the virtual camera IC is located inside the spherical image CE, as illustrated in FIG. 5. The predetermined area T in the spherical image CE is an imaging area of the virtual camera IC and is specified by predetermined-area information indicating an imaging direction and an angle of view of the virtual camera IC in a three-dimensional virtual space including the spherical image CE. Zooming of the predetermined area T may be represented by moving the virtual camera IC toward or away from the spherical image CE. A predetermined-area image Q is an image of the predetermined area T in the spherical image CE. Accordingly, the predetermined area T can be specified by an angle of view α and a distance f from the virtual camera IC to the spherical image CE (see FIG. 7).

The predetermined-area image Q illustrated in FIG. 6A is displayed on a predetermined display as an image of the imaging area of the virtual camera IC, as illustrated in FIG. 6B. The image illustrated in FIG. 6B is a predetermined-area image represented by predetermined-area information that is set by default. In the following, a description will be given using the imaging direction (ea, aa) and the angle of view (α) of the virtual camera IC. The predetermined area T may be indicated by, instead of the angle of view α and the distance f, the imaging area (X, Y, Z) of the virtual camera IC, which is the predetermined area T.

Figure 7:
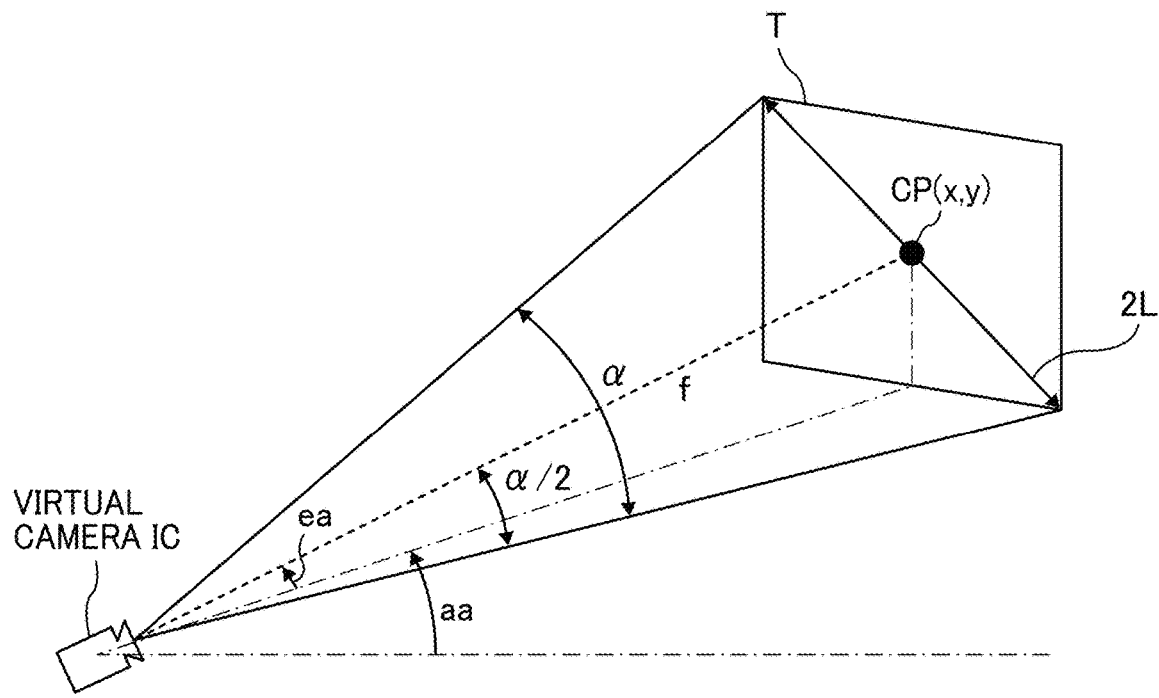
FIG. 7 is a view illustrating a relationship between predetermined-area information and the image of the predetermined area according to an embodiment of the present disclosure.

Next, a relationship between the predetermined-area information and the image of the predetermined area T will be described with reference to FIG. 7. FIG. 7 is a view illustrating a relationship between the predetermined-area information and the image of the predetermined area T. As illustrated in FIG. 7, "ea" denotes an elevation angle, "aa" denotes an azimuth angle, and "α" denotes an angle of view of the virtual camera IC. The position of the virtual camera IC is changed such that the point of gaze of the virtual camera IC, which is indicated by the imaging direction (ea, aa), matches a central point CP(x, y) of the predetermined area T serving as the imaging area of the virtual camera IC. As illustrated in FIG. 7, the central point CP(x, y) of the predetermined area T, whose diagonal angle of view is represented by the angle of view α of the virtual camera IC and is denoted by α, is used as a parameter (x, y) of the predetermined-area information. The predetermined-area image Q is an image of the predetermined area T in the spherical image CE. The distance from the virtual camera IC to the central point CP(x, y) of the predetermined area T is denoted by "f". The distance between the center point CP and a given vertex of the predetermined area T is denoted by "L" (2 L is a diagonal line). In FIG. 7, a trigonometric function equation typically expressed by Equation (1) below is satisfied.

$$L/f = \tan(\alpha/2) \qquad (1)$$

The image capturing device 10 described above is an example of an image capturing device capable of acquiring a wide-angle view image, and the spherical image CE is an example of the wide-angle view image. The wide-angle view image is typically an image captured using a wide-angle lens, such as a lens capable of capturing an image of a wider range than that the human eye can perceive. Further, the wide-angle view image is typically an image taken with a lens having a focal length of 35 mm or less in terms of 35 mm film.

Figure 8:
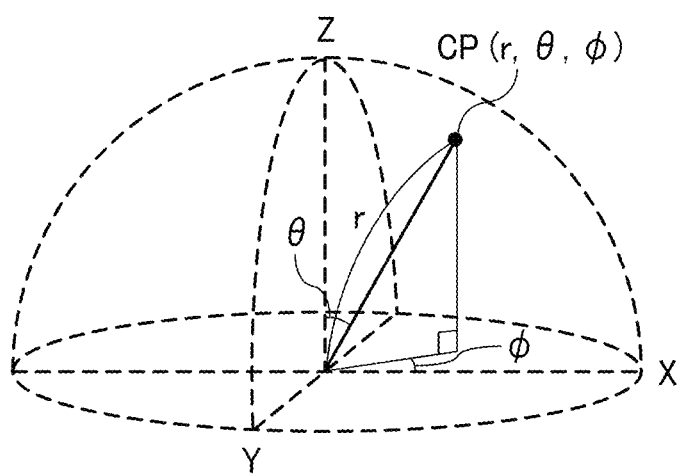
FIG. 8 is a view illustrating a point in a three-dimensional Euclidean space according to spherical coordinates, according to an embodiment of the present disclosure.

FIG. 8 is a view illustrating a point in a three-dimensional Euclidean space according to spherical coordinates. The position coordinates of the central point CP when expressed by the spherical polar coordinate system is defined as (r, θ, φ). The coordinates (r, θ, φ) represent the radial distance, the polar angle, and the azimuth angle, respectively. The radial distance r is a distance from the origin of a three-dimensional virtual space including the spherical image CE to the central point CP and is thus equal to the distance f. FIG. 8 illustrates a relationship among the radial distance r, the polar angle θ, and the azimuth angle φ. In the following, a description will be given using the position coordinates (r, θ, φ) of the virtual camera IC.

Overview of Image Communication System

Figure 9:
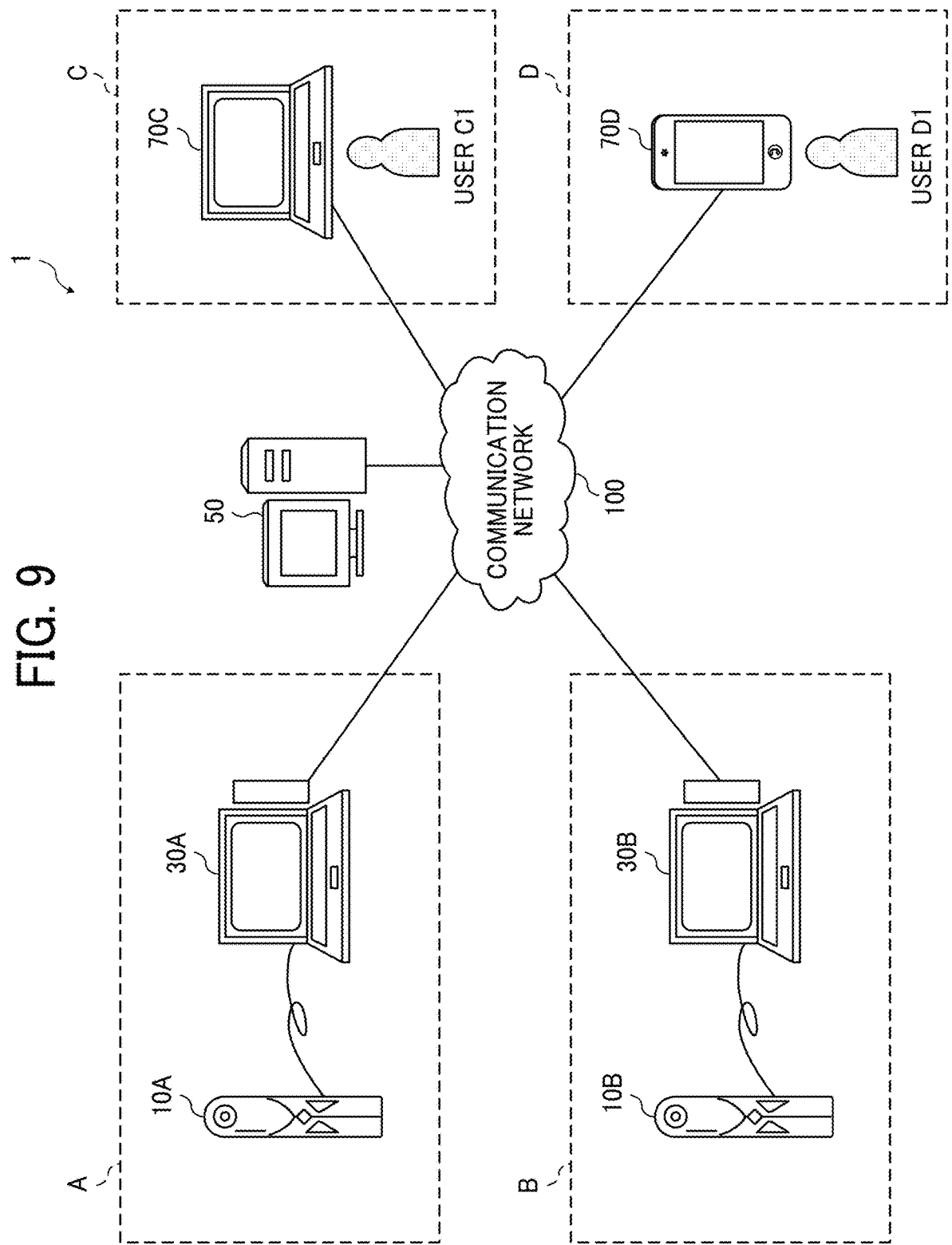
FIG. 9 is a diagram illustrating the general arrangement of an image communication system according to an embodiment of the present disclosure.

Next, an overview of an image communication system according to this embodiment will be described with reference to FIG. 9. FIG. 9 is a diagram illustrating an example of the general arrangement of an image communication system 1. The image communication system 1 illustrated in FIG. 9 is a system in which captured images such as video images distributed from a plurality of distribution sites are displayed at a plurality of viewing sites to provide real-time viewing of wide-range images (e.g., spherical images) obtained by capturing scenes at the distribution sites. In this embodiment, the distribution site is also referred to as "area".

As illustrated in FIG. 9, the image communication system 1 includes image capturing devices 10 (image capturing devices 10A and 10B) and distribution terminals 30 (distribution terminals 30A and 30B) located at a plurality of distribution sites (distribution site A (area A) and distribution site B (area B)), a communication management apparatus 50, and communication terminals 70 (communication terminals 70C and 70D) located at a plurality of viewing sites (viewing sites C and D). The image capturing devices 10A and 10B are hereinafter referred to collectively as "image capturing devices 10" or individually as "image capturing device 10" unless distinguished. The distribution terminals 30A and 30B are hereinafter referred to collectively as "distribution terminals 30" or individually as "distribution terminal 30" unless distinguished. The communication terminals 70C and 70D are hereinafter referred to collectively as "communication terminals 70" or individually as "communication terminal 70" unless distinguished.

The distribution terminals 30, the communication management apparatus 50, and the communication terminals 70 of the image communication system 1 can communicate with each other via a communication network 100. The communication network 100 is constructed by the Internet, a mobile communication network, a local area network (LAN), or the like. The communication network 100 may include, in addition to a wired communication network, a network based on a wireless communication standard such as third generation (3G), fourth generation (4G), fifth generation (5G), Wireless Fidelity (Wi-Fi) (Registered Trademark), Worldwide Interoperability for Microwave Access (WiMAX), or Long Term Evolution (LTE).

As described above, the image capturing device 10 is a special digital camera configured to capture an image of an object or surroundings such as scenery to obtain two hemispherical images, from which a spherical image is generated. The captured image obtained by the image capturing device 10 may be a moving image or a still image or may include both a moving image and a still image. Further, the captured image may include an image and audio. The distribution terminal 30 is configured to acquire an image from the image capturing device 10 via a wired cable such as a Universal Serial Bus (USB) cable and distribute the acquired image to the communication terminal 70 via the communication management apparatus 50. In one example, the image capturing device 10A and the distribution terminal 30A are located at the same site, namely, the distribution site A. The image capturing device 10B and the distribution terminal 30B are located at the same site, namely, the distribution site B. The number of distribution sites used is not limited to two, and one distribution site or three or more distribution sites may be used. In addition, the image capturing device 10 and the distribution terminal 30 may be connected wirelessly using short-range wireless communication or the like, instead of using a wired cable.

The communication management apparatus 50 controls communication between the distribution terminals 30 and the communication terminals 70 and manages types of image data (e.g., general image and special image) to be transmitted and received. In one example, the special image is a spherical image. The communication management apparatus 50 is arranged in a service company or the like that provides image communication services. The communication management apparatus 50 has a server function and provides identification information of image data (image data ID), the IP address of an image capturing device, image type information representing the type of the image data, and the like in response to a request from the communication terminal 70.

The communication management apparatus 50 may be constructed by a single computer or a plurality of computers that are assigned to divided components (functions) as appropriate. All or some of the functions of the communication management apparatus 50 may be implemented by a server computer existing in a cloud environment or a server computer existing in an on-premise environment.

The communication terminal 70 is a computer such as a personal computer (PC), which is used by a user at each viewing site. The communication terminal 70 displays an image (a still image and/or a moving image) distributed from the distribution terminal 30. The communication terminal 70 acquires a spherical image, which is an image captured by the image capturing device 10, via the communication network 100. The communication terminal 70 has installed therein OpenGL ES and is capable of creating predetermined-area information indicating a partial area of a spherical image sent from the distribution terminal or creating a predetermined-area image from the spherical image. In one example, the communication terminal 70C is placed at the viewing site C where a user C1 is located, and the communication terminal 70D is placed at the viewing site D where a user D1 is located.

The arrangement of the terminals and devices (i.e., the communication terminals 70, the image capturing devices 10, and the distribution terminals 30) and the users C1 and D1 illustrated in FIG. 9 is an example, and another example may be used. Each of the communication terminals 70 is not limited to a PC and may be, for example, a tablet terminal, a smartphone, a wearable terminal, a projector (PJ), an Interactive White Board (IWB), which is an electronic whiteboard with mutual communication capability, a telepresence robot, or the like.

Figure 10:
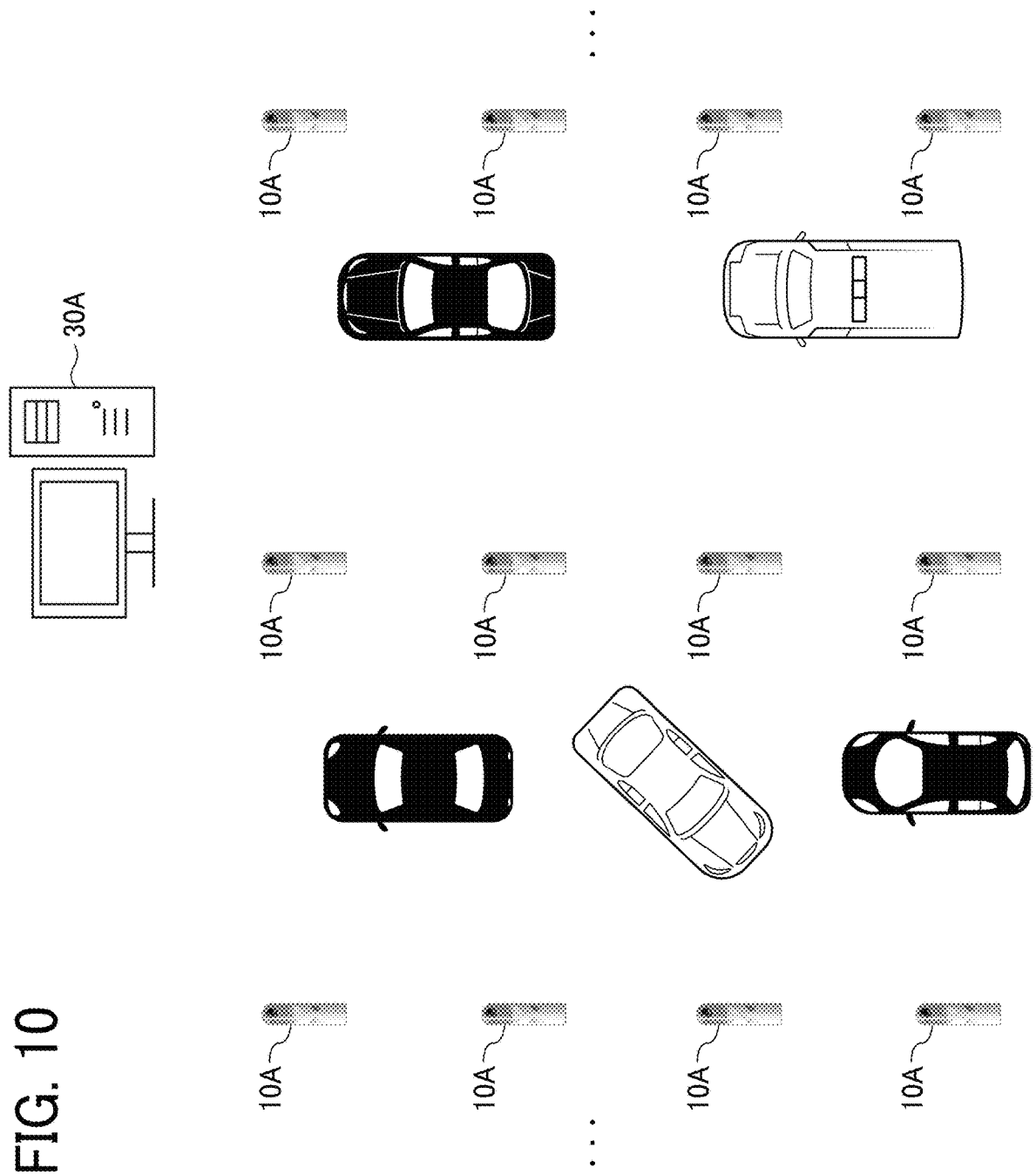
FIG. 10 is a view illustrating an overview of a distribution site in the image communication system according to an embodiment of the present disclosure.

A distribution site in the image communication system 1 will now be schematically described with reference to FIG. 10. FIG. 10 is a view illustrating an overview of a distribution site in the image communication system 1. FIG. 10 illustrates the image capturing devices 10A and the distribution terminal 30A, which are arranged at the distribution site A. In FIG. 10, a plurality of vehicles are arranged between the plurality of image capturing devices 10A, when viewed from above. While FIG. 10 illustrates an example of the distribution site A, the same applies to other distribution sites such as the distribution site B.

The distribution site A illustrated in FIG. 10 is, for example, a space such as an automobile showroom, in which a plurality of image capturing devices 10A and a distribution terminal 30A capable of communicating with the image capturing devices 10A are arranged. The distribution site is not limited to the automobile showroom and may be any space for which a user (or viewer) at a viewing site desires to remotely grasp the situation, and examples of the distribution site include an office floor, a school, a factory, a warehouse, a construction site, a server room, and a store. For example, the image capturing devices 10A are arranged at predetermined intervals on pillars arranged in the showroom or on the top of poles or other objects having a predetermined height. Alternatively, for example, the image capturing devices 10A may be arranged at predetermined intervals hanging from the ceiling of the showroom. The plurality of image capturing devices 10A are used to capture images of the entire distribution site A. The distribution terminal 30A receives captured image data from the image capturing devices 10A and distributes the received captured image data to the communication terminals 70 at viewing sites. The numbers of image capturing devices 10A and distribution terminals 30A arranged at the distribution site A are not limited to those illustrated in FIG. 10. That is, as illustrated in FIG. 9, one image capturing device 10A and one distribution terminal 30A may be arranged at the distribution site A. As illustrated in FIG. 10, many image capturing devices 10A and one distribution terminal 30A may be arranged at the distribution site A. The same applies to the distribution site B.

In an existing system in which images captured by a plurality of image capturing devices arranged at a remote site are viewable at viewing sites, a user who desires to view the situation at a specific portion in the distribution site does not know which of the images captured by the image capturing devices to view. In addition, in a case in which users at different viewing sites desire to view different portions in the distribution site, operations on the image capturing devices (e.g., pan-tilt-zoom (PTZ) operations) may conflict with each other. As a result, it may be difficult to provide an exclusive viewing that allows a plurality of users who view the same distribution site to view different portions. Further, even in a case in which spherical images, as described above, are captured by the image capturing devices, a user performs individual operations on a plurality of spherical images to perform a process for displaying an intended portion, and it is difficult for a user to perform an intuitive operation. To address this inconvenience, the image communication system 1 allows a user to perform an intuitive operation on a display screen such that a plurality of users are able to simultaneously view, with interest, different portions in the distribution site using a captured image acquired from the same image capturing device.

Hardware Configuration of Image Communication System

Next, the hardware configuration of the devices or terminals of the image communication system 1 according to an embodiment will be described with reference to FIGS. 11 and 12. In the hardware configurations illustrated in FIGS. 11 and 12, certain hardware elements may be added or deleted as appropriate.

Hardware Configuration of Image Capturing Device

First, the hardware configuration of the image capturing device 10 will be described with reference to FIG. 11. FIG. 11 is a diagram illustrating an example hardware configuration of the image capturing device 10. In the following description, the image capturing device 10 is a spherical (omnidirectional) image capturing device including two imaging elements. However, the image capturing device 10 may include any suitable number of imaging elements greater than or equal to two imaging elements. In addition, the image capturing device 10 is not necessarily a device dedicated to capturing of an omnidirectional image. Alternatively, a typical digital camera, smartphone, or the like may be equipped with an external omnidirectional image capturing unit to implement an image capturing device having substantially the same functions as those of the image capturing device 10.

Figure 11:
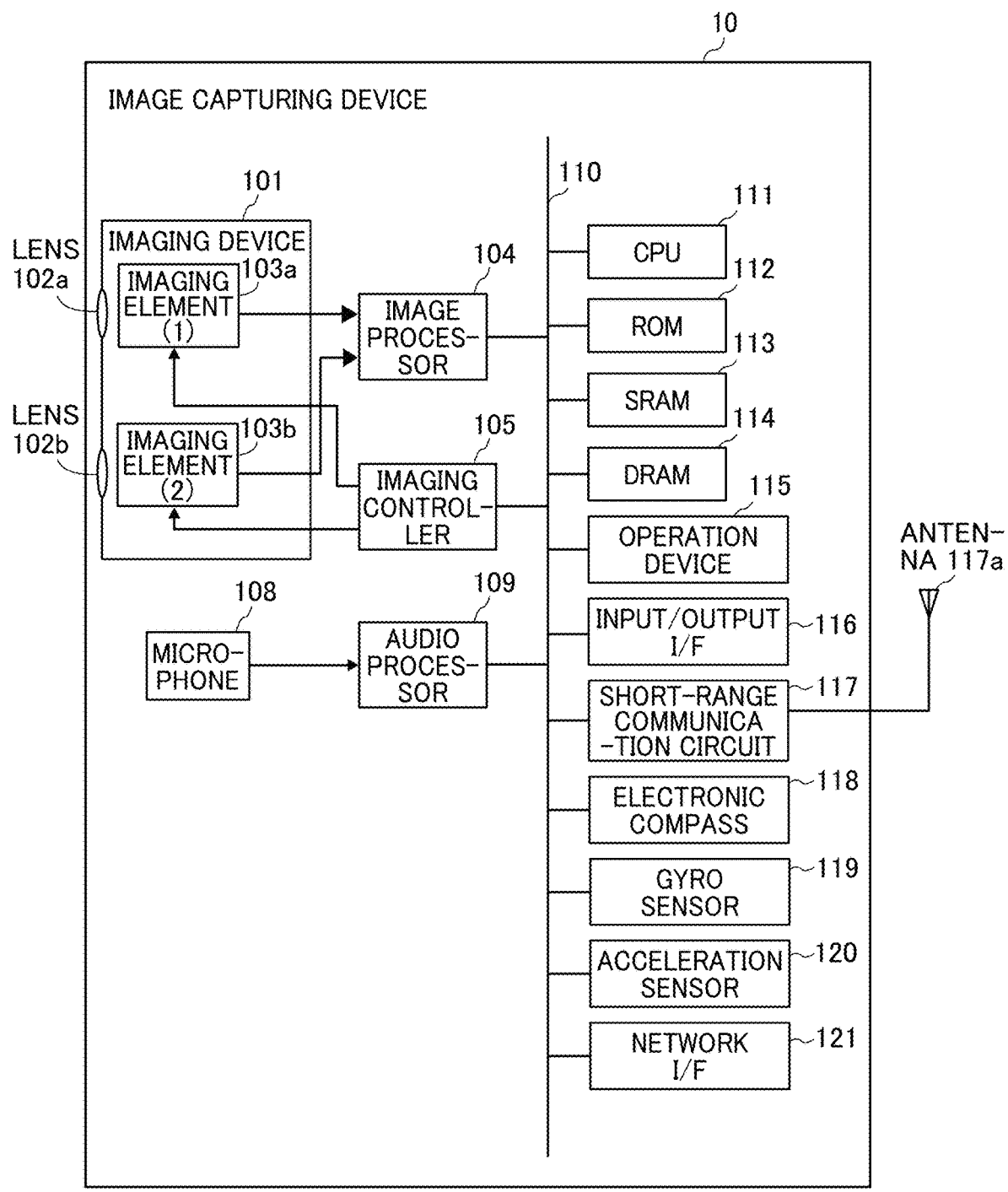
FIG. 11 is a diagram illustrating an example hardware configuration of the image capturing device according to an embodiment of the present disclosure.

As illustrated in FIG. 11, the image capturing device 10 includes an imaging device 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation device 115, an input/output interface (I/F) 116, a short-range communication circuit 117, an antenna 117a of the short-range communication circuit 117, an electronic compass 118, a gyro sensor 119, an acceleration sensor 120, and a network I/F 121.

The imaging device 101 includes wide-angle lenses (so-called fish-eye lenses) 102a and 102b, each having an angle of view greater than or equal to 180 degrees so as to form a hemispherical image. The imaging device 101 further includes the two imaging elements 103a and 103b corresponding to the wide-angle lenses 102a and 102b, respectively. The imaging elements 103a and 103b each include an image sensor such as a complementary metal oxide semiconductor (CMOS) sensor or a charge-coupled device (CCD) sensor, a timing generation circuit, and a group of registers. Each of the image sensors converts an optical image formed by a corresponding one of the wide-angle lenses 102a and 102b into an electric signal to output image data. Each of the timing generation circuits generates a horizontal or vertical synchronization signal, a pixel clock, and the like for a corresponding one of the image sensors. Each of the groups of registers has set therein various commands, parameters, and the like to be used for operations of a corresponding one of the imaging elements 103a and 103b.

The imaging elements 103a and 103b of the imaging device 101 are connected to the image processor 104 via respective parallel I/F buses. In addition, the imaging elements 103a and 103b of the imaging device 101 are connected to the imaging controller 105 via respective serial I/F buses such as inter-integrated circuit (I2C) buses. The image processor 104, the imaging controller 105, and the audio processor 109 are connected to the CPU 111 via a bus 110. The ROM 112, the SRAM 113, the DRAM 114, the operation device 115, the input/output I/F 116, the short-range communication circuit 117, the electronic compass 118, the gyro sensor 119, the acceleration sensor 120, and the network I/F 121 are also connected to the bus 110.

The image processor 104 acquires respective pieces of image data output from the imaging elements 103a and 103b via the parallel I/F buses and performs predetermined processing on the pieces of image data. Thereafter, the image processor 104 combines the pieces of image data, which are subjected to the predetermined processing, to generate data of an equirectangular projection image as illustrated in FIG. 3C.

The imaging controller 105 usually functions as a master device while the imaging elements 103a and 103b usually function as slave devices. The imaging controller 105 sets commands and the like in the groups of registers of the imaging elements 103a and 103b via the respective I2C buses. The imaging controller 105 receives various commands from the CPU 111. Further, the imaging controller 105 acquires status data and the like of the groups of registers of the imaging elements 103a and 103b via the respective I2C buses. The imaging controller 105 sends the acquired status data and the like to the CPU 111.

The imaging controller 105 instructs the imaging elements 103a and 103b to output image data at a time when a shutter button of the operation device 115 is pressed (or tapped). Such a pressing or tapping operation is hereinafter referred to simply as "operation". In some cases, the image capturing device 10 has a function of displaying a preview image on a display (e.g., a display of an external terminal such as a smartphone that performs short-range communication with the image capturing device 10 through the short-range communication circuit 117) or displaying a moving image. In the case of displaying a moving image, the imaging elements 103a and 103b continuously output image data at a predetermined frame rate (frames per minute).

Further, as described below, the imaging controller 105 operates in cooperation with the CPU 111 to also function as a synchronization controller for synchronizing the time when the imaging element 103a outputs image data and the time when the imaging element 103b outputs image data. Although the image capturing device 10 does not include a display in this embodiment, the image capturing device 10 may include a display. The microphone 108 converts sounds into audio data (signal). The audio processor 109 acquires the audio data output from the microphone 108 via an I/F bus and performs predetermined processing on the audio data.

The CPU 111 controls the entire operation of the image capturing device 10 and also performs certain processing. The ROM 112 stores various programs for the CPU 111. The SRAM 113 and the DRAM 114 each operate as a work memory to store programs to be executed by the CPU 111 or data being processed. More specifically, the DRAM 114 stores image data being processed by the image processor 104 or data of the equirectangular projection image on which processing has been performed.

The operation device 115 generally refers to various operation keys, a power switch, a shutter button, a touch panel having both the display and operation functions, and the like. The user operates the operation device 115 to input various image capturing modes, image capturing conditions, or the like.

The input/output I/F 116 generally refers to an interface circuit such as a USB I/F that allows the image capturing device 10 to communicate with an external medium such as a Secure Digital (SD) card or a personal computer. The input/output I/F 116 may be either wired or wireless. The data of the equirectangular projection image, which is stored in the DRAM 114, is stored in an external medium via the input/output I/F 116 or transmitted to an external terminal (or apparatus) via the input/output IF 116, as appropriate.

The short-range communication circuit 117 communicates with an external terminal (or apparatus) via the antenna 117a of the image capturing device 10 using short-range wireless communication technology such as near-field communication (NFC), Bluetooth (registered trademark), or Wi-Fi (registered trademark). The short-range communication circuit 117 is capable of transmitting the data of the equirectangular projection image to an external terminal (or apparatus).

The electronic compass 118 calculates an orientation of the image capturing device from the Earth's magnetism and outputs orientation information. The orientation information is an example of related information (metadata) in compliance with Exchangeable Image File Format (EXIF) and is used for image processing such as image correction of captured images. The related information also includes data such as the date and time when the image is captured, and the data size of the image data. The gyro sensor 119 detects a change in angle of the image capturing device 10 (roll angle, pitch angle, and yaw angle) with movement of the image capturing device 10. The change in angle is an example of related information (metadata) in compliance with EXIF and is used for image processing such as image correction of captured images. The acceleration sensor 120 detects acceleration in three axial directions. The image capturing device 10 calculates the position (an angle with respect to the direction of gravity) of the image capturing device 10, based on the acceleration detected by the acceleration sensor 120. The image capturing device 10 provided with the acceleration sensor 120 improves the accuracy of image correction. The network I/F 121 is an interface for performing data communication using the communication network 100 such as the Internet.

Hardware Configuration of Distribution Terminal

Figure 12:
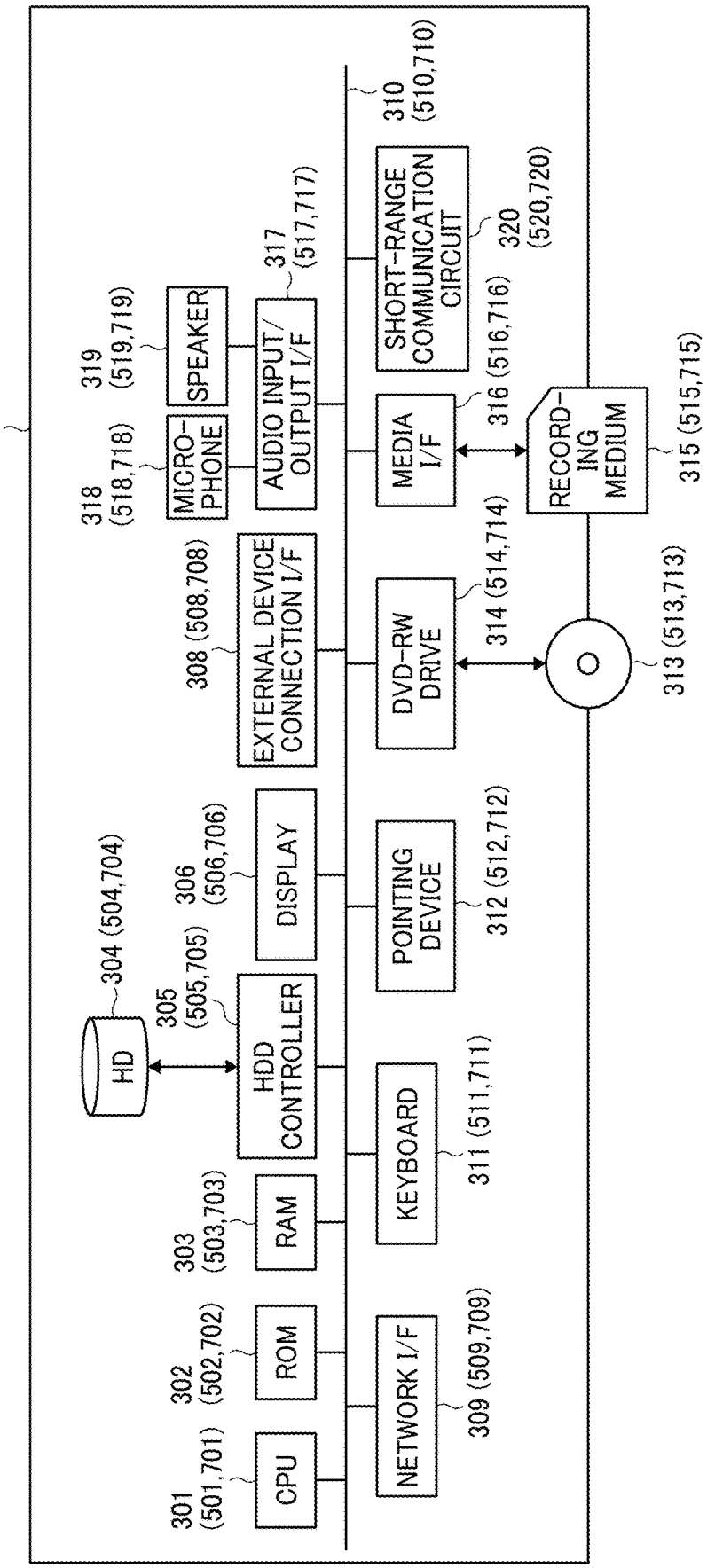
FIG. 12 is a diagram illustrating an example hardware configuration of a distribution terminal, a communication management apparatus, and a communication terminal according to an embodiment of the present disclosure.

FIG. 12 is a diagram illustrating an example hardware configuration of the distribution terminal 30. The hardware components of the distribution terminal 30 are denoted by reference numerals in the 300s. The distribution terminal 30 is constructed by a computer. As illustrated in FIG. 12, the distribution terminal 30 includes a CPU 301, a ROM 302, a random access memory (RAM) 303, a hard disk (HD) 304, a hard disk drive (HDD) controller 305, a display 306, an external device connection I/F 308, a network I/F 309, a bus line 310, a keyboard 311, a pointing device 312, a digital versatile disk rewritable (DVD-RW) drive 314, a media I/F 316, an audio input/output I/F 317, a microphone 318, a speaker 319, and a short-range communication circuit 320.

The CPU 301 controls the entire operation of the distribution terminal 30. The ROM 302 stores a program used for driving the CPU 301, such as an initial program loader (IPL). The RAM 303 is used as a work area for the CPU 301. The HD 304 stores various data such as a program. The HDD controller 305 controls reading or writing of various data from or to the HD 304 under the control of the CPU 301. The display 306 displays various kinds of information such as a cursor, a menu, a window, characters, and an image. The display 306 is an example of a display device. In one example, the display 306 is a touch panel display provided with an input device. The external device connection I/F 308 is an interface for connecting to various external devices. Examples of the external devices include, but are not limited to, a USB memory and a printer. The network I/F 309 is an interface for performing data communication using the communication network 100. The bus line 310 is an address bus, a data bus, or the like for electrically connecting the hardware elements illustrated in FIG. 12, such as the CPU 301.

The keyboard 311 is a type of input device provided with a plurality of keys for inputting characters, numerals, various instructions, or the like. The pointing device 312 is a type of input device for selecting or executing various instructions, selecting a processing target, or moving a cursor being displayed. The input device is not limited to the keyboard 311 and the pointing device 312 and may be a touch panel, a voice input device, or the like. The DVD-RW drive 314 controls reading or writing of various data from or to a DVD-RW 313, which is an example of a removable recording medium. The removable recording medium is not limited to the DVD-RW and may be a digital versatile disk recordable (DVD-R), a Blu-ray Disc (registered trademark), or the like. The media I/F 316 controls reading or writing (storing) of data from or to a recording medium 315 such as a flash memory. The microphone 318 is a type of built-in sound collector for receiving input sounds. The audio input/output I/F 317 is a circuit that processes input and output of an audio signal between the microphone 318 and the speaker 319 under the control of the CPU 301. The short-range communication circuit 320 is a communication circuit for performing communication with an external terminal (or apparatus) using short-range wireless communication technology such as NFC, Bluetooth, or Wi-Fi.

Hardware Configuration of Communication Management Apparatus

FIG. 12 is a diagram illustrating an example hardware configuration of the communication management apparatus 50. The hardware components of the communication management apparatus 50 are denoted by reference numerals in the 500s in parentheses. The communication management apparatus 50 is constructed by a computer. As illustrated in FIG. 12, since the communication management apparatus 50 has a configuration similar to that of the distribution terminal 30, the description of the hardware components will be omitted.

Hardware Configuration of Communication Terminal

FIG. 12 is a diagram illustrating an example hardware configuration of the communication terminal 70. The hardware components of the communication terminal 70 are denoted by reference numerals in the 700s in parentheses. The communication terminal 70 is constructed by a computer. As illustrated in FIG. 12, since the communication terminal 70 has a configuration similar to that of the distribution terminal 30, the description of the hardware components will be omitted.

Further, each of the programs described above may be recorded in a file in an installable or executable format on a computer-readable recording medium for distribution. Examples of the recording medium include a compact disc recordable (CD-R), a digital versatile disk (DVD), a Blu-ray Disc, an SD card, and a USB memory. In addition, the recording medium may be provided in the form of a program product to users within a certain country or outside that country. For example, in the communication management apparatus 50, a program according to an embodiment of the present disclosure is executed to implement a communication management method according to an embodiment of the present disclosure.

Functional Configuration of Image Communication System

Figure 13:
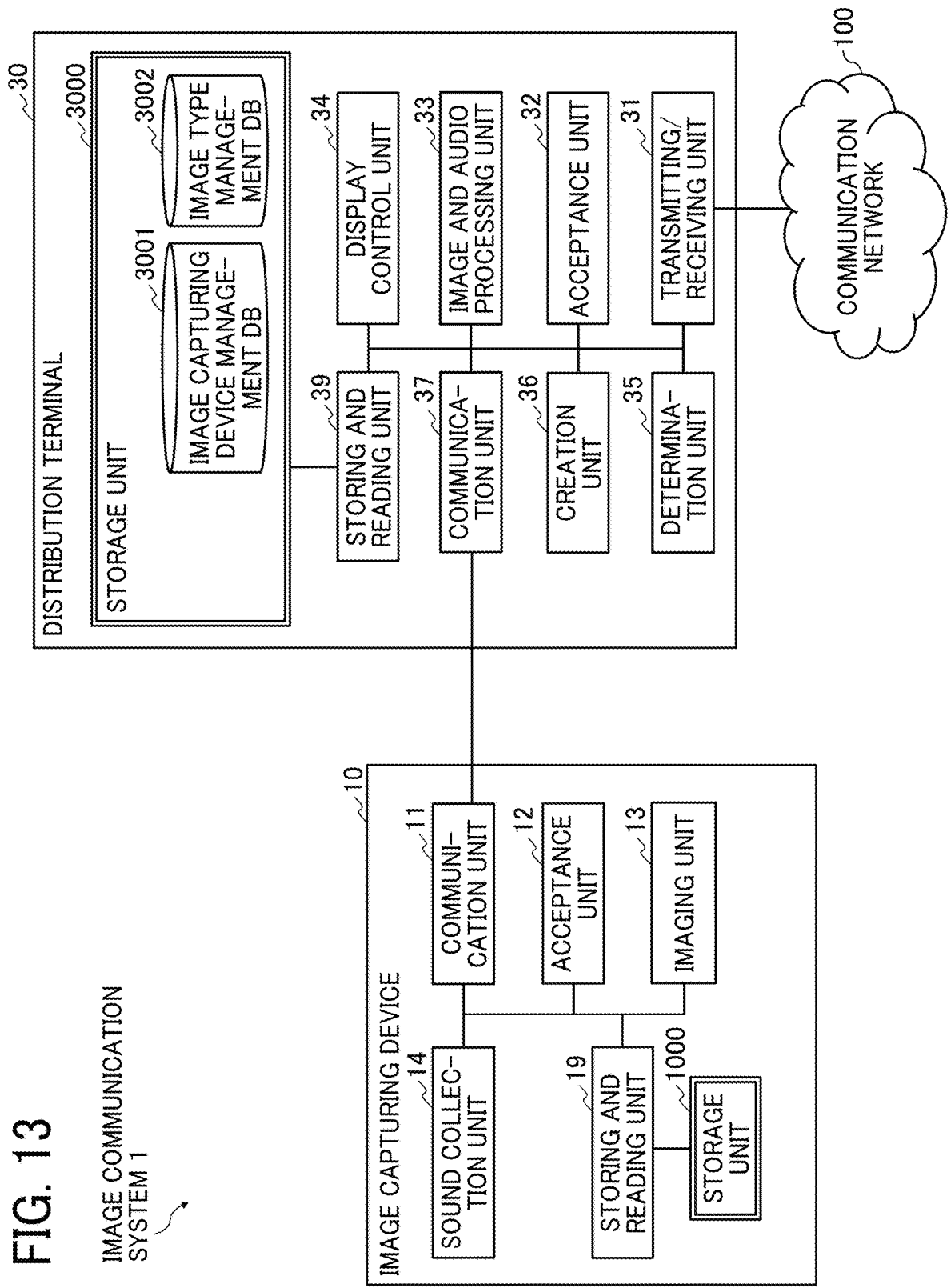
FIG. 13 is a diagram illustrating an example functional configuration of the image communication system according to an embodiment of the present disclosure.
Figure 14:
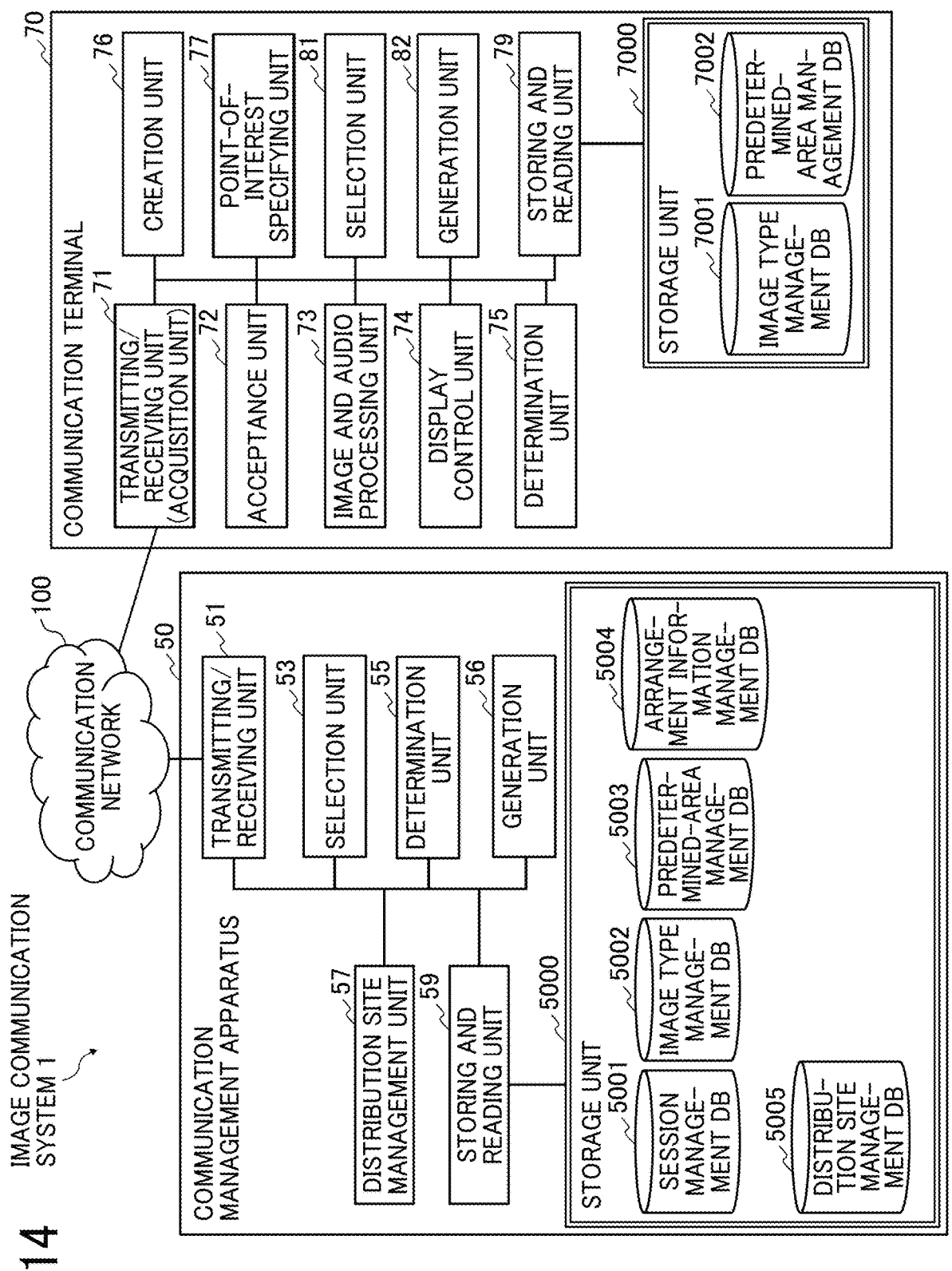
FIG. 14 is a diagram illustrating an example functional configuration of the image communication system according to an embodiment of the present disclosure.

Next, the functional configuration of the image communication system 1 according to an embodiment will be described with reference to FIGS. 13 to 20B. FIGS. 13 and 14 are diagrams illustrating an example functional configuration of the image communication system 1. FIGS. 13 and 14 illustrate devices and terminals related to the processes or operations described below among the devices and terminals illustrated in FIG. 9.

Functional Configuration of Image Capturing Device

First, the functional configuration of the image capturing device 10 will be described with reference to FIG. 13. The image capturing device 10 includes a communication unit 11, an acceptance unit 12, an imaging unit 13, a sound collection unit 14, and a storing and reading unit 19. The communication unit 11, the acceptance unit 12, the imaging unit 13, the sound collection unit 14, and the storing and reading unit 19 are functions implemented by any one of the hardware elements illustrated in FIG. 11 operating in accordance with instructions from the CPU 11 according to an image capturing device program loaded onto the DRAM 114 from the SRAM 113. The image capturing device 10 further includes a storage unit 1000. The storage unit 1000 is constructed by the ROM 112, the SRAM 113, and the DRAM 114 illustrated in FIG. 11. The storage unit 1000 stores the globally unique identifier (GUID) of the image capturing device 10.

The communication unit 11 is mainly implemented by processing performed by the CPU 111 and communicates various data or information to another apparatus or terminal. The communication unit 11 performs, for example, data communication with another apparatus or terminal through the short-range communication circuit 117 using short-range wireless communication technology. Further, the communication unit 11 performs, for example, data communication with another apparatus or terminal through the input/output I/F 116 via various cables or the like. The communication unit 11 further performs data communication with another apparatus or terminal through the network I/F 121 via the communication network 100.

The acceptance unit 12 is mainly implemented by processing performed by the CPU 111 on the operation device 115 and accepts various selections or inputs from a user. The imaging unit 13 is mainly implemented by processing performed by the CPU 111 on the imaging device 101, the image processor 104, and the imaging controller 105 and captures an object such as scenery to acquire captured image data. The sound collection unit 14 is mainly implemented by processing performed by the CPU 111 on the microphone 108 and the audio processor 109 and collects sounds around the image capturing device 10.

The storing and reading unit 19 is mainly implemented by processing performed by the CPU 111 and stores various data (or information) in the storage unit 1000 or reads various data (or information) from the storage unit 1000.

Functional Configuration of Distribution Terminal

Next, the functional configuration of the distribution terminal 30 will be described with reference to FIG. 13. The distribution terminal 30 includes a transmitting/receiving unit 31, an acceptance unit 32, an image and audio processing unit 33, a display control unit 34, a determination unit 35, a creation unit 36, a communication unit 37, and a storing and reading unit 39. The transmitting/receiving unit 31, the acceptance unit 32, the image and audio processing unit 33, the display control unit 34, the determination unit 35, the creation unit 36, the communication unit 37, and the storing and reading unit 39 are functions implemented by any one of the hardware elements illustrated in FIG. 12 operating in accordance with instructions from the CPU 301 according to a distribution terminal program loaded onto the RAM 303 from the HD 304. The distribution terminal 30 further includes a storage unit 3000. The storage unit 3000 is constructed by the ROM 302, the RAM 303, and the HD 304 illustrated in FIG. 12.

The transmitting/receiving unit 31 is mainly implemented by processing performed by the CPU 301 on the network I/F 309 and transmits and receives various data or information to and from another apparatus or terminal via the communication network 100.

The acceptance unit 32 is mainly implemented by processing performed by the CPU 301 on the keyboard 311 or the pointing device 312 and accepts various selections or inputs from a user.

The image and audio processing unit 33 is mainly implemented by processing performed by the CPU 301 and performs image processing on captured image data acquired by the image capturing device 10 capturing an object. The image and audio processing unit 33 further performs audio processing on audio data of a voice signal, which is obtained by converting the voice of the user using the microphone 318. For example, the image and audio processing unit 33 performs image processing on captured image data received from the image capturing device 10, based on image type information such as the source name so that the display control unit 34 causes the display 306 to display an image. Specifically, when the image type information indicates the special image, the image and audio processing unit 33 converts the captured image data (e.g., data of hemispherical images as illustrated in FIGS. 3A and 3B) into spherical image data as illustrated in FIG. 4B to create spherical image data. Further, the image and audio processing unit 33 outputs a voice signal of audio data distributed from another terminal via the communication management apparatus 50 to the speaker 319 and outputs a voice from the speaker 319.

The display control unit 34 is mainly implemented by processing performed by the CPU 301 and causes the display 306 to display various images, characters, or the like. The determination unit 35 is implemented by processing performed by the CPU 301 and performs various determinations. For example, the determination unit 35 determines the image type of captured image data received from the image capturing device 10.

The creation unit 36 is mainly implemented by processing performed by the CPU 301 and creates a source name, which is an example of the image type information, in accordance with a naming rule, based on the general image or special image (that is, the spherical image) determined by the determination unit 35. For example, if the determination unit 35 determines that the image type is the general image, the creation unit 36 creates the source name "Video" indicating the general image. By contrast, if the determination unit 35 determines that the image type is the special image, the creation unit 36 creates the source name "Video_Omni" indicating the special image.

The communication unit 37 is mainly implemented by processing performed by the CPU 301 on the short-range communication circuit 320 and communicates with the communication unit 11 of the image capturing device 10 using short-range wireless communication technology such as NFC, Bluetooth, or WiFi. In the foregoing description, the communication unit 37 and the transmitting/receiving unit 31 are configured as separate communication units. In another example, the communication unit 37 and the transmitting/receiving unit 31 may share a single communication unit.

The storing and reading unit 39 is mainly implemented by processing performed by the CPU 301 and stores various data (or information) in the storage unit 3000 or reads various data (or information) from the storage unit 3000.

Image Capturing Device Management Table

FIG. 15A is a conceptual diagram illustrating an example image capturing device management table. The storage unit 3000 includes an image capturing device management database (DB) 3001. The image capturing device management DB 3001 is made up of an image capturing device management table illustrated in FIG. 15A. The image capturing device management table stores and manages a vendor ID and a product ID in the GUID of an image capturing device capable of obtaining two hemispherical images from which a spherical image is generated. Examples of the GUID include a vendor ID (VID) and a product ID (PID), which are used by a USB device. The vendor ID and the product ID may be stored when the distribution terminal 30 is shipped from the factory or may be additionally stored after the distribution terminal 30 is shipped from the factory, for example.

Image Type Management Table

FIG. 15B is a conceptual diagram illustrating an example image type management table. The storage unit 3000 includes an image type management DB 3002. The image type management DB 3002 is made up of an image type management table illustrated in FIG. 15B. The image type management table stores, for each image data ID, an Internet Protocol (IP) address of an image capturing device, which is an example of an address of an image capturing device, and a source name (image type information) in association with each other. The image data ID is an example of image data identification information for identifying image data of an image to be distributed. The IP address of the image capturing device indicates the IP address of the image capturing device 10 that has captured the image data indicated by the associated image data ID. The source name is a name for specifying the image capturing device 10 that has captured the image data indicated by the associated image data ID, and is an example of image type information. The source name is a name created by the distribution terminal 30 in accordance with a predetermined naming rule.

The illustrated example indicates that four image capturing devices having the IP addresses "2.1.2.3", "2.1.1.5", "2.1.5.4", and "2.1.5.6" have transmitted image data indicated by image data IDs "RS001", "RS002", "RS003", and "RS004", respectively. It is also indicated that the image types indicated by the source names of the four image capturing devices are "Video_Omni", "Video_Omni", "Video", and "Video", which indicate the image types "special image", "special image", "general image", and "general image", respectively. In this embodiment, the special image is the spherical image. The IP address is an example of address information, and the address information may be a Media Access Control (MAC) address, a terminal identification (ID), or the like. While the IP address is a simplified representation of the Internet Protocol version 4 (IPv4) address, the IP address may be an Internet Protocol version 6 (IPv6) address. In addition, data other than image data may be managed in association with the image data ID. Examples of the data other than image data include audio data, and document data to be used to share the screen between the distribution site and the viewing sites.

Functional Configuration of Communication Management Apparatus

Next, the functional configuration of the communication management apparatus 50 will be described with reference to FIG. 14. The communication management apparatus 50 includes a transmitting/receiving unit 51, a selection unit 53, a determination unit 55, a generation unit 56, a distribution site management unit 57, and a storing and reading unit 59. The transmitting/receiving unit 51, the selection unit 53, the determination unit 55, the generation unit 56, the distribution site management unit 57, and the storing and reading unit 59 are functions implemented by any one of the hardware elements illustrated in FIG. 12 operating in accordance with instructions from the CPU 501 according to a communication management apparatus program loaded onto the RAM 503 from the HD 504. The communication management apparatus 50 further includes a storage unit 5000. The storage unit 5000 is constructed by the ROM 502, the RAM 503, and the HD 504 illustrated in FIG. 12.

The transmitting/receiving unit 51 is mainly implemented by processing performed by the CPU 501 on the network I/F 509 and transmits and receives various data or information to and from another apparatus via the communication network 100.

The selection unit 53 is mainly implemented by processing performed by the CPU 501 and selects a specific image capturing device 10 among a plurality of image capturing devices 10. The selection unit 53 selects a specific image capturing device 10 among the plurality of image capturing devices 10, based on, for example, coordinate values indicating each of a plurality of points of interest Pn accepted by the communication terminal 70, where n is a natural number greater than or equal to 2, and arrangement position information (coordinate values) indicating arrangement positions of the plurality of image capturing devices 10. The plurality of points of interest Pn are hereinafter sometimes referred to simply as "points of interest Pn" or "points of interest P". In this embodiment, the points of interest Pn indicate designated positions in an area where a plurality of image capturing devices are arranged. That is, each point of interest indicates a designated position. In this embodiment, the selection unit 53 functions as an example of selection means. In this embodiment, coordinate values are also referred to as "coordinate information".

The determination unit 55 is mainly implemented by processing performed by the CPU 501 and performs various determinations. The selection unit 53 is mainly implemented by processing performed by the CPU 501 and selects an image capturing device 10 in response to a request from the communication terminal 70. In this embodiment, the determination unit 55 functions as an example of a determiner.

The generation unit 56 is mainly implemented by processing performed by the CPU 501 and generates an image data ID and predetermined-area information. The generation unit 56 generates, for example, predetermined-area information. The predetermined-area information indicates a predetermined area (e.g., the predetermined area T illustrated in FIG. and the like) in an image captured by the image capturing device 10 selected by the selection unit 53. An image in which the entire captured image is displayed (e.g., the spherical image CE illustrated in FIG. 5 and the like) is also referred to as "entire image". In this embodiment, the generation unit 56 functions as an example of generation means. Specifically, the generation unit 56 generates identification information of the image capturing device 10 closest to each of the plurality of points of interest Pn, designated-position coordinate information (coordinate values) indicating the coordinates of a corresponding one of the plurality of points of interest Pn, and predetermined-area information indicating a predetermined area in which the designated position (i.e., the corresponding one of the plurality of points of interest Pn) is viewed at the front. The generation unit 56 generates identification information of the image capturing devices 10 closest to each of the plurality of points of interest Pn in a plurality of sub-areas obtained by dividing an area where the plurality of image capturing devices 10 are arranged into a predetermined number by one or more lines passing through a corresponding one of the plurality of points of interest Pn. Further, the generation unit 56 calculates predetermined-area information indicating a predetermined area in which a predetermined point of interest among the plurality of points of interest Pn designated by the user appears at the front (or center), in association with the coordinate values of the predetermined point of interest.

The distribution site management unit 57 is mainly implemented by processing performed by the CPU 501 and manages distribution site information indicating the state of the distribution site.

The storing and reading unit 59 is mainly implemented by processing performed by the CPU 501 and stores various data (or information) in the storage unit 5000 or reads various data (or information) from the storage unit 5000.

Session Management Table

FIG. 16A is a conceptual diagram illustrating an example session management table. The storage unit 5000 includes a session management DB 5001. The session management DB 5001 is made up of a session management table illustrated in FIG. 16A. The session management table stores, for each session ID, a site ID and an IP address of a participant communication terminal in association with each other. The session ID is an example of session identification information for identifying a communication session for implementing image communication. The session ID is generated for each virtual floor. The session ID is also managed by the communication terminals 70 and is used when each of the communication terminals 70 selects a communication session. The site ID is an example of site identification information for identifying a distribution site. The IP address of the participant communication terminal indicates the IP address of a communication terminal 70 participating in a virtual floor indicated by the associated session ID.

Image Type Management Table

FIG. 16B is a conceptual diagram illustrating an example image type management table. The storage unit 5000 includes an image type management DB 5002. The image type management DB 5002 is made up of an image type management table illustrated in FIG. 16B. The image type management table stores the information managed by the image type management table illustrated in FIG. 15B and the same session ID as the session ID managed in the session management table illustrated in FIG. 16A in association with each other. The communication management apparatus 50 stores an image data ID, an IP address of an image capturing device, and image type information, which are the same as those stores in the distribution terminal 30 and the communication terminal 70, because, for example, when a new communication terminal 70 enters a virtual floor, the communication management apparatus 50 transmits information including the image type information to a communication terminal 70 that is already in video communication and the new communication terminal 70, which has newly participated in the video communication. As a result, the communication terminal 70 that is already in the video communication and the communication terminal 70 that has newly participated in the video communication do not have to transmit and receive such information including the image type information.

Predetermined-Area Management Table

FIG. 17 is a conceptual diagram illustrating an example predetermined-area management table. The storage unit 5000 includes a predetermined-area management DB 5003. The predetermined-area management DB 5003 is made up of a predetermined-area management table illustrated in FIG. 17. The predetermined-area management table stores, for the IP address of each image capturing device (image source) from which captured image data is transmitted, point-of-interest coordinate values (x, y, z) indicating the position of a point of interest, an IP address of a communication terminal (image destination) to which the captured image data is transmitted, and predetermined-area information in association with each other. The predetermined-area information indicates a parameter of a predetermined-area image currently displayed on the communication terminal to which the captured image data is transmitted. As illustrated in FIGS. 6A, 6B, and 7, the predetermined-area information is a conversion parameter for converting the captured image into the image of the predetermined area T (the predetermined-area image Q) in the captured image.

For example, the information managed in the first row of the predetermined-area management table illustrated in FIG. 17 indicates that after the distribution terminal 30 receives captured image data obtained by the image capturing device 10 having the IP address "2.1.2.3", the captured image data is transmitted from the distribution terminal 30 to the communication terminal 70 having the IP address "1.2.1.3" via the communication management apparatus 50.

When predetermined-area information including IP addresses in the same set as an already managed set of the IP address of an image capturing device from which captured image data is transmitted and the IP address of a communication terminal to which the captured image data is transmitted is newly received by the transmitting/receiving unit 51, the storing and reading unit 59 rewrites the already managed predetermined-area information to the newly received predetermined-area information Arrangement Information Management Table FIG. 18 is a conceptual diagram illustrating an example arrangement information management table. The storage unit 5000 includes an arrangement information management DB 5004. The arrangement information management DB 5004 is made up of an arrangement information management table illustrated in FIG. 18. The arrangement information management table stores, for each site ID for identifying a distribution site, an IP address of an image capturing device 10 arranged in the distribution site, coordinate values indicating the position at which the image capturing device 10 is arranged, and the arrangement direction of the image capturing device 10 in association with each other. The coordinate values are coordinate values on the map of the distribution site where the image capturing device 10 is arranged. The arrangement direction of the image capturing device 10 indicates the direction (angle) on the map in which the front surface of the image capturing device 10 faces. The arrangement direction is set to a desired direction (angle) by the administrator of the distribution terminal 30 or the distribution site.

Distribution-Site Management Table

FIG. 19 is a conceptual diagram illustrating an example distribution-site management table. The storage unit 5000 includes a distribution site management DB 5005. The distribution site management DB 5005 is made up of a distribution-site management table illustrated in FIG. 19. The distribution-site management table stores, for each site ID for identifying a distribution site, a site name and distribution site information in association with each other. The distribution site information indicates the state of the distribution site. The distribution site information includes a uniform resource locator (URL) for accessing map image data indicating a map of the distribution site and site coordinate information (coordinate values) indicating the coordinate values of the distribution site. The communication terminal 70 accesses the URL transmitted from the communication management apparatus 50 to acquire the map image data and the site coordinate information of the distribution site. The URL is an example of storage destination information. The storage destination information is not limited to the URL and may be a uniform resource identifier (URI) or the like.

Functional Configuration of Communication Terminal

Next, the functional configuration of the communication terminal 70 will be described with reference to FIG. 14. The communication terminal 70 includes a transmitting/receiving unit (acquisition unit) 71, an acceptance unit 72, an image and audio processing unit 73, a display control unit 74, a determination unit 75, a creation unit 76, a point-of-interest specifying unit 77, a selection unit 81, a generation unit 82, and a storing and reading unit 79. The transmitting/receiving unit 71, the acceptance unit 72, the image and audio processing unit 73, the display control unit 74, the determination unit 75, the creation unit 76, the point-of-interest specifying unit 77, the selection unit 81, the generation unit 82, and the storing and reading unit 79 are functions implemented by any one of the hardware elements illustrated in FIG. 12 operating in accordance with instructions from the CPU 701 according to a communication terminal program loaded onto the RAM 703 from the HD 704. The communication terminal 70 further includes a storage unit 7000. The storage unit 7000 is constructed by the ROM 702, the RAM 703, and the HD 704 illustrated in FIG. 12.

The transmitting/receiving unit (acquisition unit) 71 is mainly implemented by processing performed by the CPU 701 on the network I/F 709 and transmits and receives various data or information to and from another apparatus or terminal via the communication network 100. The transmitting/receiving unit (acquisition unit) 71 receives, for example, captured image data distributed from the distribution terminal 30 via the communication management apparatus 50. Further, the transmitting/receiving unit (acquisition unit) 71 functions as, for example, an acquisition unit and acquires identification information of a shareable image capturing device capable of sharing images of any two points of interest among the plurality of points of interest Pn. The transmitting/receiving unit (acquisition unit) 71 further acquires pieces of predetermined-area information of the shareable image capturing device, each indicating a predetermined area in which a corresponding one of the two points of interest is viewed at the front.

The acceptance unit 72 is mainly implemented by processing performed by the CPU 701 on the keyboard 711 or the pointing device 712 and accepts various selections or inputs from a user. For example, the acceptance unit 72 accepts input of a plurality of points of interest Pn, which are designated by the user, in a distribution site. In this embodiment, the acceptance unit 72 functions as an example of acceptance means.

The image and audio processing unit 73 is mainly implemented by processing performed by the CPU 701 and performs image processing on captured image data distributed from the distribution terminal 30. The image and audio processing unit 73 further performs audio processing on audio data distributed from the distribution terminal 30. For example, to display on the display 706 an image of a predetermined area corresponding to predetermined-area information received by the transmitting/receiving unit (acquisition unit) 71, the image and audio processing unit 73 applies perspective projection conversion to the captured image (spherical image) using the predetermined-area information to generate a predetermined-area image corresponding to the predetermined-area information. Further, the image and audio processing unit 73 outputs a voice signal of audio data distributed from the distribution terminal 30 via the communication management apparatus 50 to the speaker 719 and outputs a voice from the speaker 719.

The display control unit 74 is mainly implemented by processing performed by the CPU 701 and causes the display 706 to display various images, characters, or the like. For example, the display control unit 74 causes the display 706 to display the predetermined-area image generated by the image and audio processing unit 73.

The determination unit 75 is implemented by processing performed by the CPU 701 and performs various determinations. In this embodiment, the display control unit 74 functions as an example of display control means.

The creation unit 76 is mainly implemented by processing performed by the CPU 701 and implements functions similar to those of the creation unit 36. The point-of-interest specifying unit 77 is mainly implemented by processing performed by the CPU 701 and specifies a point of interest P in the distribution site where the image capturing devices 10 are arranged. For example, the point-of-interest specifying unit 77 specifies the coordinate information of each of a plurality of points of interest Pn designated by the user on the map image of the distribution site.

The selection unit 81 is mainly implemented by processing performed by the CPU 701 and implements functions similar to those of the selection unit 53. The generation unit 82 is mainly implemented by processing performed by the CPU 701 and generates predetermined-area information. For example, the generation unit 82 generates predetermined-area information indicating a predetermined area in an image captured by an image capturing device 10 selected by the selection unit 81. Further, the generation unit 82 functions as, for example, an acquisition unit and acquires predetermined-area information. The predetermined-area information indicates a predetermined area including each of the plurality of points of interest Pn in an image captured by a specific image capturing device 10 selected based on the coordinate information of the plurality of points of interest Pn, which are accepted by the acceptance unit 72, and the arrangement positions of the image capturing devices 10.

The storing and reading unit 79 is mainly implemented by processing performed by the CPU 701 and stores various data (or information) in the storage unit 7000 or reads various data (or information) from the storage unit 7000.

Image Type Management Table

FIG. 20A is a conceptual diagram illustrating an example image type management table. The storage unit 7000 includes an image type management DB 7001. The image type management DB 7001 is made up of an image type management table illustrated in FIG. 20A. Since the image type management table has substantially the same data configuration as that of the image type management table illustrated in FIG. 15B, the description thereof will be omitted.

Predetermined-Area Management Table

FIG. 20B is a conceptual diagram illustrating an example predetermined-area management table. The storage unit 7000 includes a predetermined-area management DB 7002. The predetermined-area management DB 7002 is made up of a predetermined-area management table illustrated in FIG. 20B. The predetermined-area management table stores, for the IP address of each image capturing device that has obtained captured image data, point-of-interest coordinate values (x, y, z) indicating the position of a point of interest, and predetermined-area information in association with each other. The predetermined-area information indicates a currently displayed predetermined-area image. As illustrated in FIGS. 6A, 6B, and 7, the predetermined-area information is a conversion parameter for converting the captured image into the image of the predetermined area T (the predetermined-area image Q) in the captured image.

The relationship between a point of interest P and a plurality of image capturing devices 10 arranged at the distribution site A will now be described with reference to FIGS. 21 to 27.

Case in which Two Points of Interest P are Set

Figure 21:
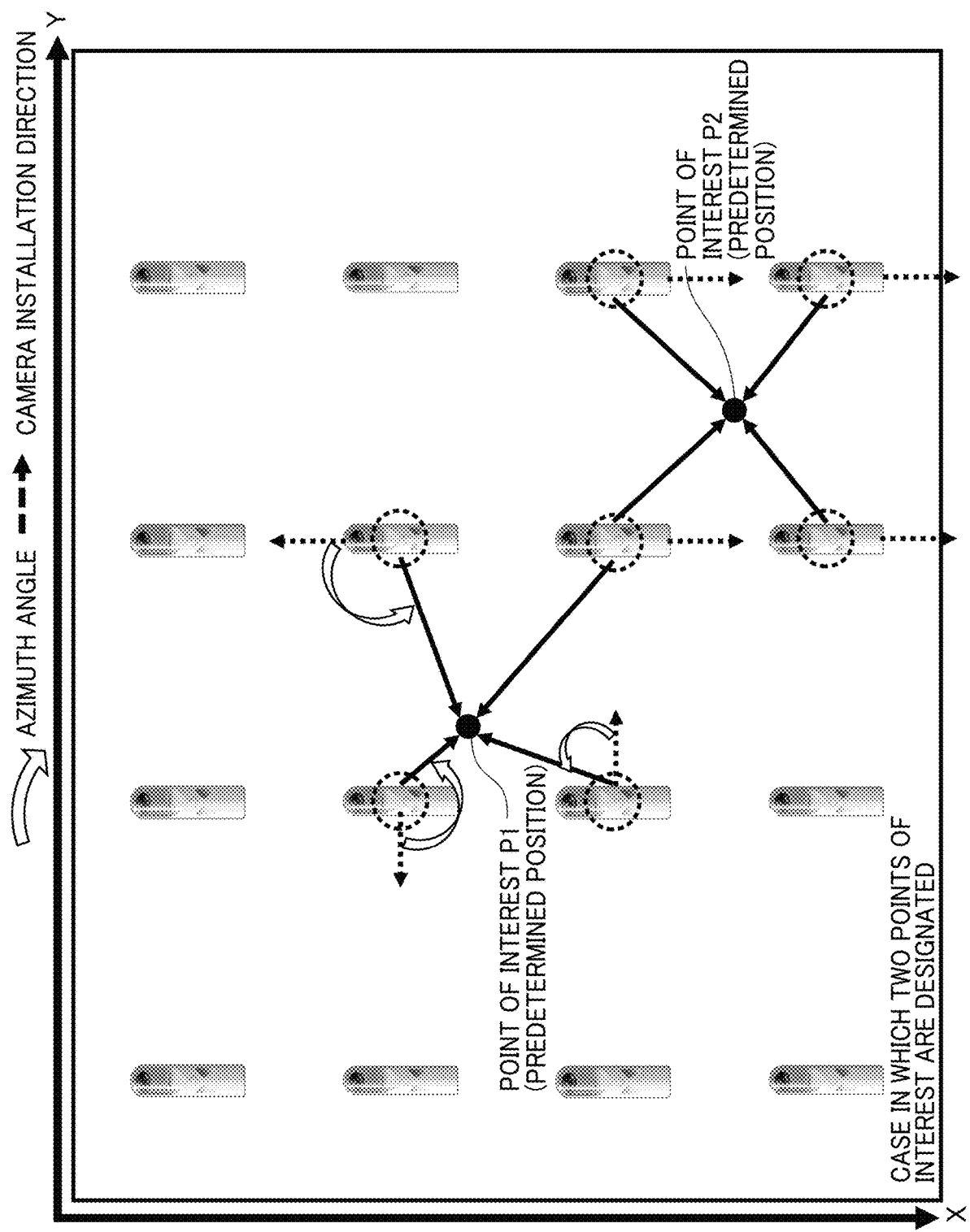
FIG. 21 is a view schematically describing an example relationship between two points of interest and image capturing devices, according to an embodiment of the present disclosure.

FIG. 21 is a view schematically describing an example relationship between two points of interest P and the image capturing devices 10. For example, at the distribution site A (area A), such as a showroom, in the image communication system 1 illustrated in FIG. 10, the plurality of image capturing devices 10A are arranged regularly in a grid pattern, as illustrated in FIG. 21. Based on the arrangement of the plurality of image capturing devices 10A, the generation unit 56 generates a two-dimensional arrangement image (map image) based on the coordinate values of each of the image capturing devices 10A, for example. The user who uses the communication terminal 70 can operate a "point of interest" button 860 while referring to a tour image 830 corresponding to a two-dimensional arrangement image displayed in a site display screen 820 on the display 706 of the communication terminal 70, which will be described below. In FIG. 21, points of interest P1 and P2 are set in the distribution site A. The points of interest P1 and P2 are an example of a plurality of designated positions.

Process for Selecting Image Capturing Devices near Point of Interest P1

Figure 22:
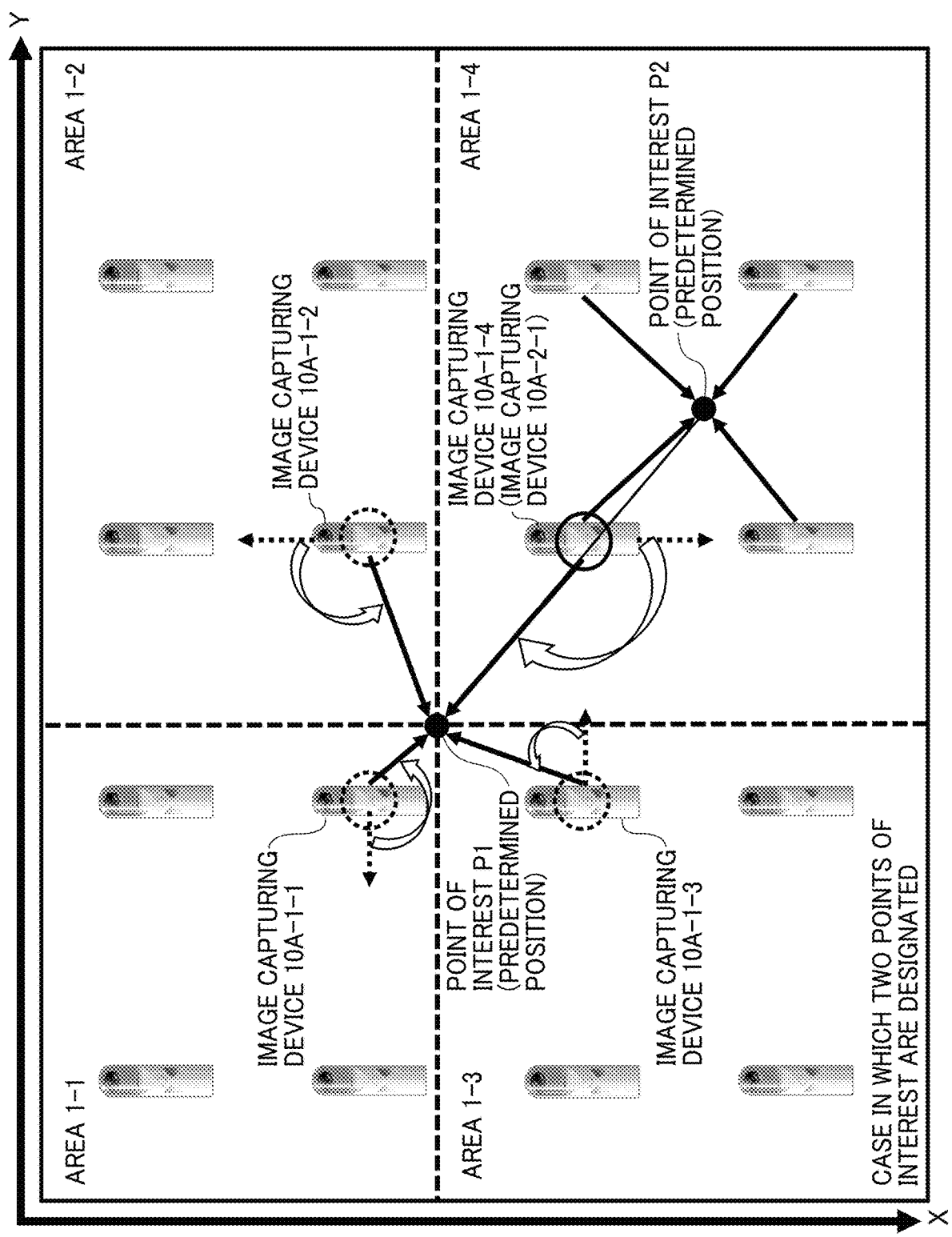
FIG. 22 is a view schematically describing an example of installation directions and azimuth angles of image capturing devices near a first point of interest, according to an embodiment of the present disclosure.

FIG. 22 is a view schematically describing an example of installation directions and azimuth angles of image capturing devices 10A near the point of interest P1. As in the example illustrated in FIG. 22, the selection unit 53 of the communication management apparatus 50 divides the area of the distribution site A into four areas, as indicated by broken lines, from the point of interest P1 indicated by a black circle in a two-dimensional arrangement image (map image) generated in the communication management apparatus 50. The four areas are areas 1-1, 1-2, 1-4, and 1-3, which are illustrated clockwise from top left in the two-dimensional arrangement image. The selection unit 53 selects image capturing devices 10A-1-1, 10A-1-2, 10A-1-3, and 10A-1-4, which are arranged at positions closest to the point of interest P1, from within the areas 1-1, 1-2, 1-3, and 1-4, respectively. The selection unit 53 can select the image capturing devices 10A-1-1, 10A-1-2, 10A-1-3, and 10A-1-4, which are arranged at positions closest to the point of interest P1, from within the respective areas by using a known technique, for example, a formula for determining a distance between two points.

Process for Selecting Image Capturing Devices Near Point of Interest P2

Figure 23:
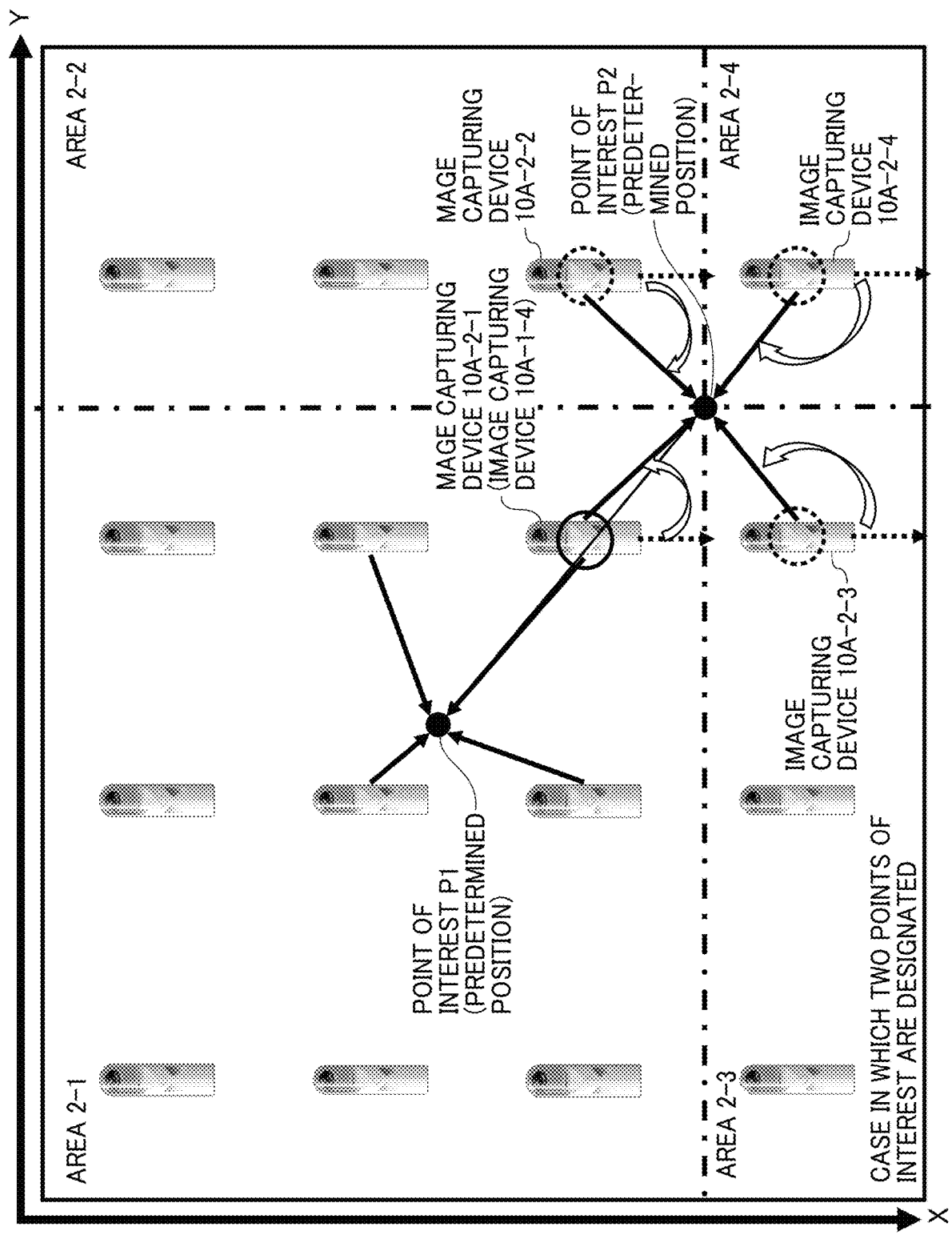
FIG. 23 is a view schematically describing an example of installation directions and azimuth angles of image capturing devices near a second point of interest, according to an embodiment of the present disclosure.

FIG. 23 is a view schematically describing an example of installation directions and azimuth angles of image capturing devices 10A near the point of interest P2. Also in FIG. 23, the selection unit 22 can use the method illustrated in the example in FIG. 22 to select image capturing devices 10A-2-1, 10A-2-2, 10A-2-3, and 10A-2-4, which are arranged at positions closest to the point of interest P2, from within respective areas. As illustrated in the example in FIG. 23, the selection unit 53 of the communication management apparatus 50 divides the area of the distribution site A into four areas, as indicated by dot-and-dash lines, from the point of interest P2 indicated by another black circle in the two-dimensional arrangement image (map image) generated in the communication management apparatus 50. The four areas are areas 2-1, 2-2, 2-4, and 2-3, which are illustrated clockwise from top left in the two-dimensional arrangement image. As in the case of the point of interest P1, the selection unit 53 selects the image capturing devices 10A-2-1, 10A-2-2, 10A-2-3, and 10A-2-4, which are arranged at positions closest to the point of interest P2, from within the areas 2-1, 2-2, 2-3, and 2-4, respectively.

Case in which Three Points of Interest P are Set

Figure 24:
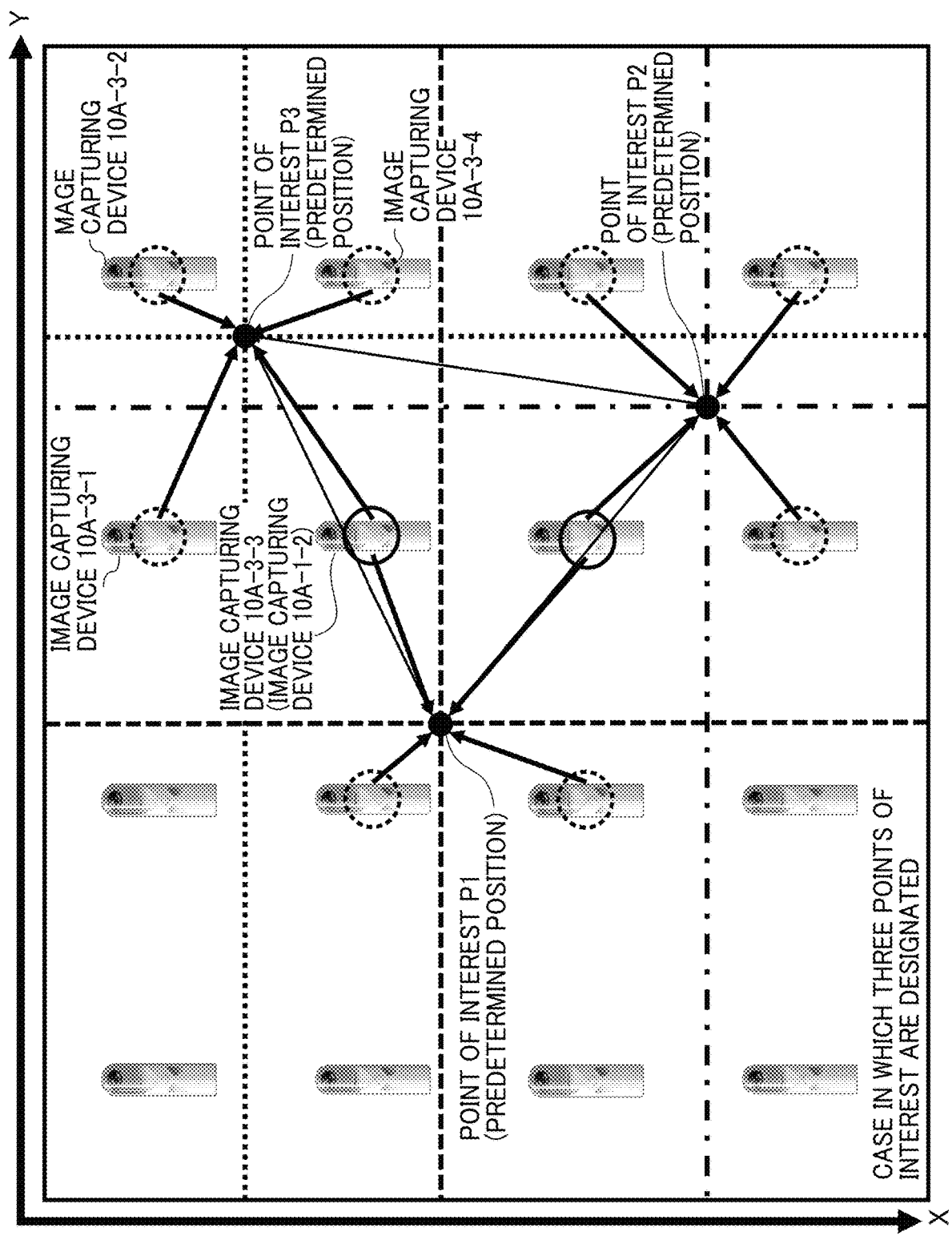
FIG. 24 is a view schematically describing an example relationship between three points of interest and image capturing devices, according to an embodiment of the present disclosure.

FIG. 24 is a view schematically describing an example relationship between three points of interest P and the image capturing devices 10. Also in FIG. 24, the selection unit 23 can use the method illustrated in the example in FIGS. 22 and 23 to select image capturing devices 10A-3-1, 10A-3-2, 10A-3-3, and 10A-3-4, which are arranged at positions closest to a point of interest P3, from within respective areas. As in the example illustrated in FIG. 24, the selection unit 53 of the communication management apparatus 50 divides the area of the distribution site A into four areas, as indicated by finer dotted lines than those for the point of interest P1, from the point of interest P3 indicated by another black circle in the two-dimensional arrangement image (map image) generated in the communication management apparatus 50. The four areas are areas 3-1, 3-2, 3-4, and 3-3, which are illustrated clockwise from top left in the two-dimensional arrangement image. As in the case of the points of interest P1 and P2, the selection unit 53 selects the image capturing devices 10A-3-1, 10A-3-2, 10A-3-3, and 10A-3-4, which are arranged at positions closest to the point of interest P3, from within the areas 3-1, 3-2, 3-3, and 3-4, respectively.

Figure 25:
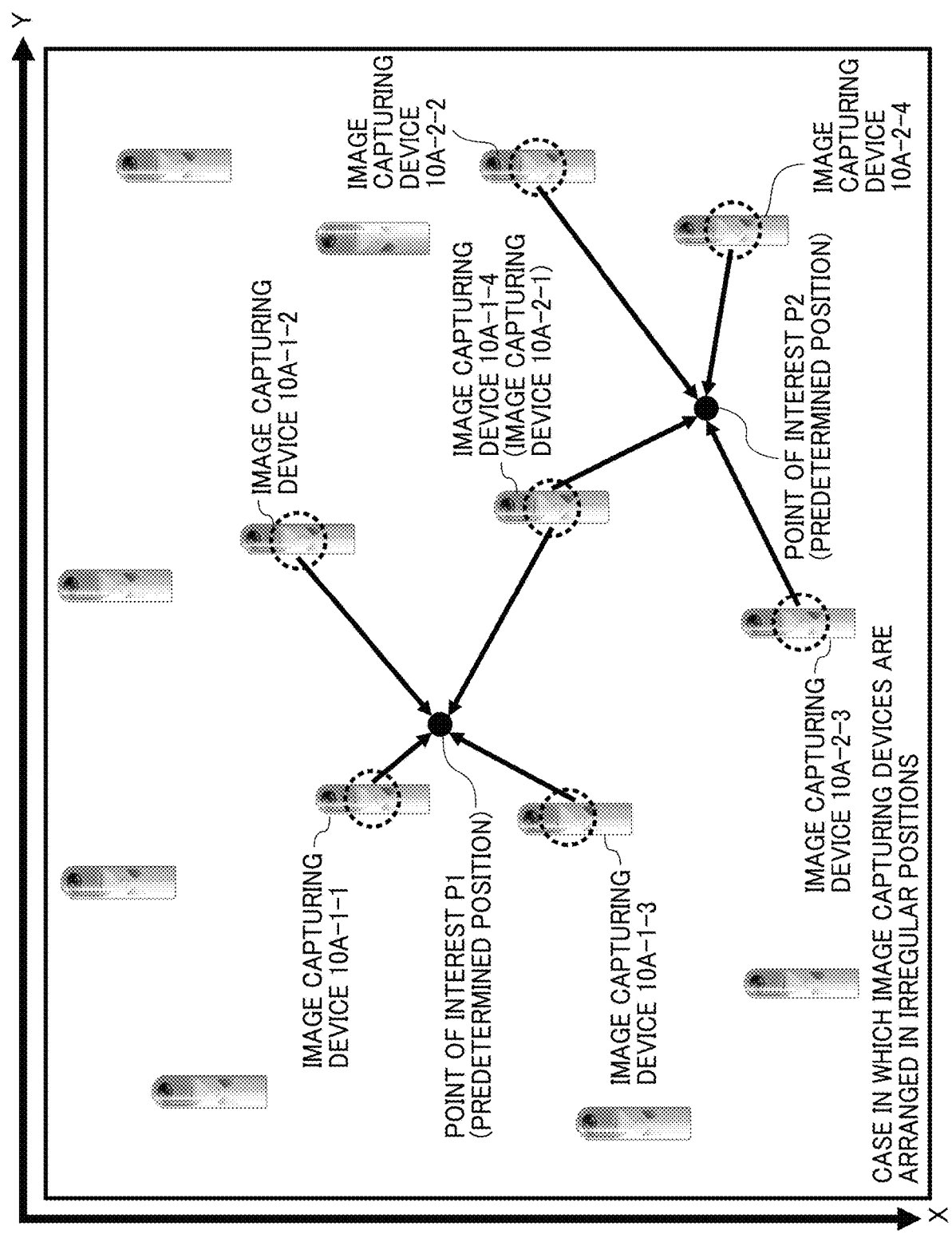
FIG. 25 is a view schematically describing an example relationship between points of interest and image capturing devices arranged in irregular positions, according to an embodiment of the present disclosure.

By contrast, FIG. 25 is a view schematically describing an example relationship between the points of interest P1 and P2 and the image capturing devices 10 arranged in irregular positions. As illustrated in FIG. 25, the image capturing devices 10 may be arranged in irregular positions at the distribution site A. The selection unit 53 can select image capturing devices 10A arranged at positions closest to each of the points of interest P1 and P2, from within respective areas in the way described above with reference to FIGS. 21 to 24.

Process or Operation According to Embodiment

Session Participation Process

Figure 26:
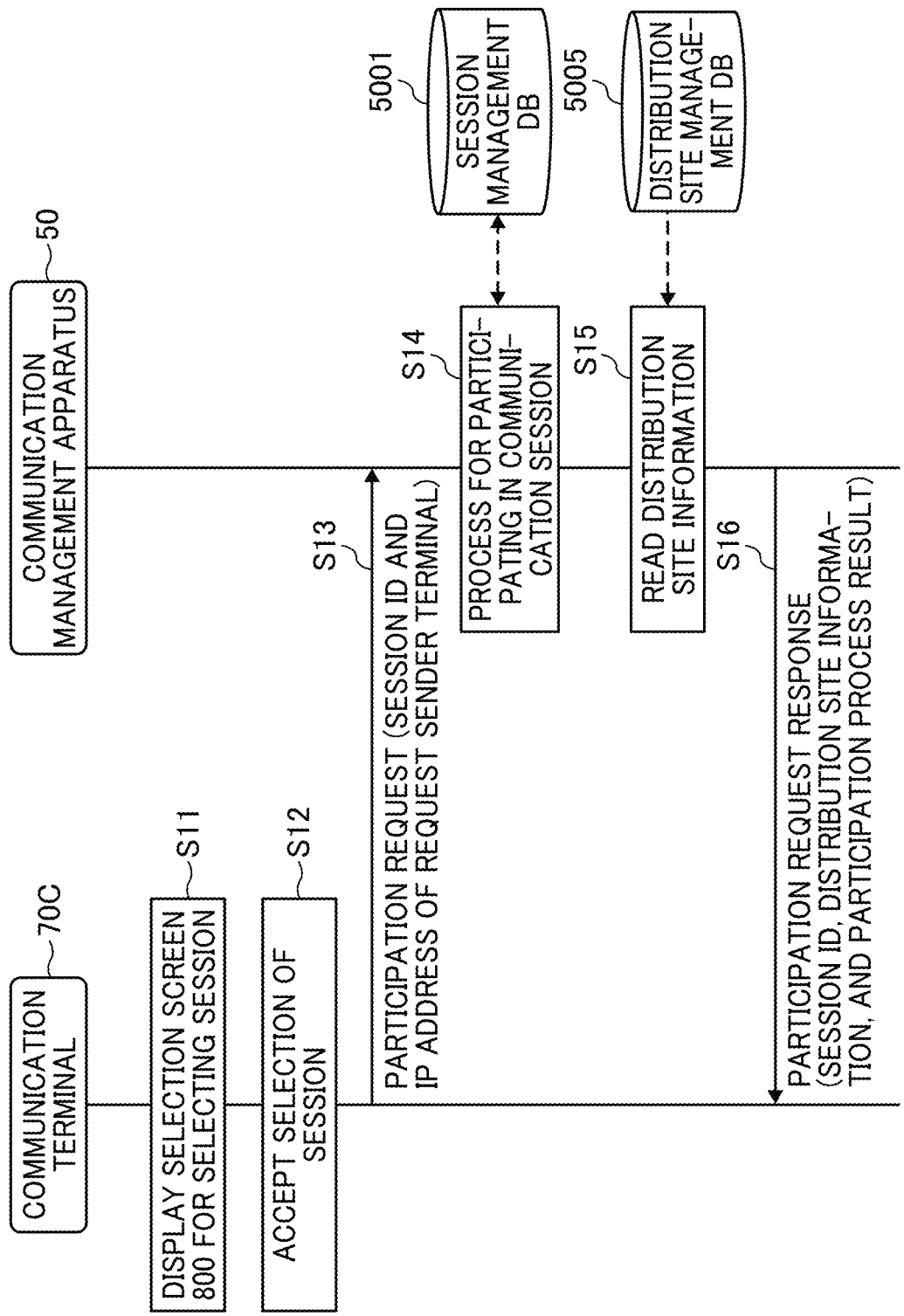
FIG. 26 is a sequence diagram illustrating an example process for participating in a specific communication session in the image communication system according to an embodiment of the present disclosure.
Figure 27:
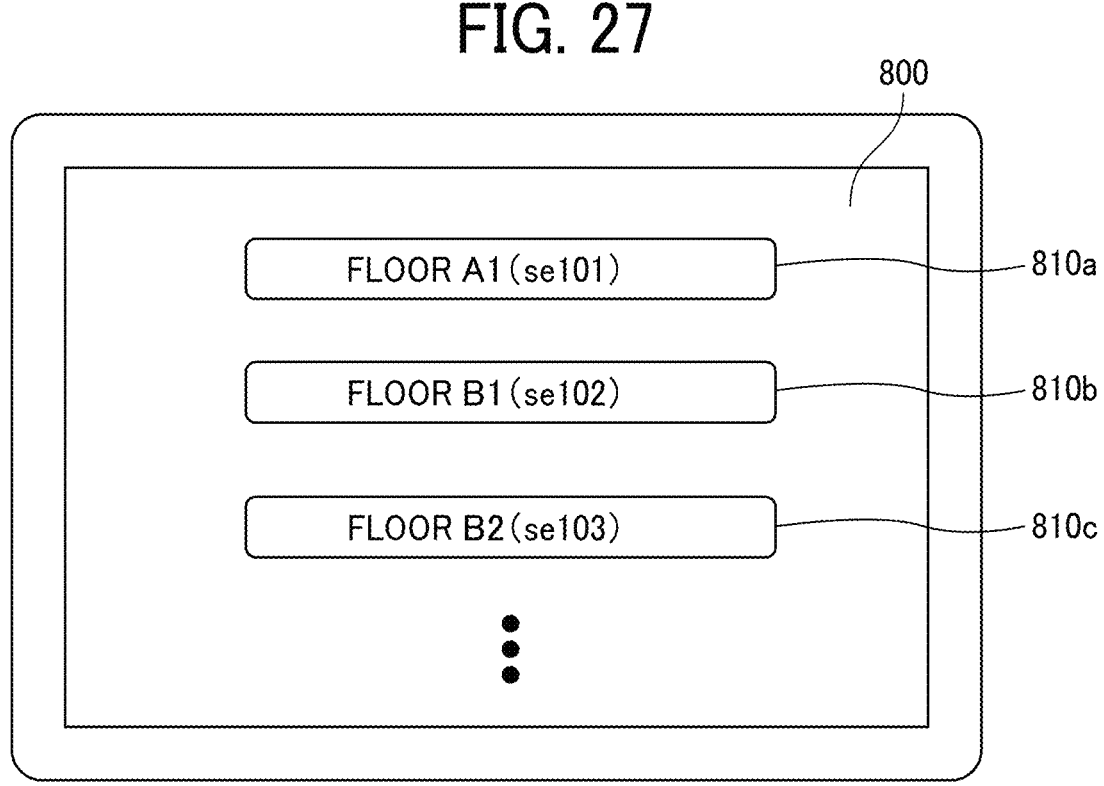
FIG. 27 is a view illustrating an example screen for selecting a communication session according to an embodiment of the present disclosure.

Next, a process or operation of the image communication system 1 according to an embodiment will be described with reference to FIGS. 26 to 42. In the following description, a captured image of the distribution site A is distributed to the communication terminal 70, by way of example. However, similar processing is performed for distribution of an image from any other distribution site such as the distribution site B. First, a process for participating in a specific communication session will be described with reference to FIGS. 26 and 27. FIG. 26 is a sequence diagram illustrating an example process for participating in a specific communication session in the image communication system 1. FIG. 27 is a view illustrating an example screen for selecting a communication session.

First, a user (e.g., the user C1) at the viewing site C performs an operation of displaying a selection screen for selecting a communication session. In response to the acceptance unit 72 accepting the operation of displaying the selection screen, the display control unit 74 of the communication terminal 70C causes the display 706 to display a selection screen 800 illustrated in FIG. 27 (step S11). The selection screen 800 illustrated in FIG. 27 displays selection buttons 810*a*, 810*b*, 810*c*, etc. indicating floors A1, B1, B2, etc. to be selected, respectively. The selection button 810*a* and the other selection buttons are associated with respective session IDs.

When the user C1 selects a selection button for the desired virtual floor that is a distribution site (here, the selection button 810*a*), the acceptance unit 72 accepts selection of a communication session (step S12). Then, the transmitting/receiving unit (acquisition unit) 71 transmits to the communication management apparatus 50 a participation request to participate in the communication session with the distribution site (step S13). Thus, the transmitting/receiving unit 51 of the communication management apparatus 50 receives the participation request. The participation request includes a session ID indicating the communication session for which selection is accepted in step S12, and the IP address of the communication terminal 70C, which is the request sender terminal.

Then, the storing and reading unit 59 of the communication management apparatus 50 adds, in the session management table (the session management DB 5001, see FIG. 16A), the IP address received in step S13 to the "IP address of participant terminal" field for the record of the same session ID as the session ID received in step S13 to perform a process for participating in the communication session (step S14). Further, the storing and reading unit 59 reads, from the session management DB 5001, the site ID associated with the session ID of the communication session for which the participation process is performed. Then, the storing and reading unit 59 searches the distribution-site management table (the distribution site management DB 5005, see FIG. 19) using the site ID read in step S14 as a search key to read the distribution site information associated with the same site ID as the read site ID (step S15). Then, the transmitting/receiving unit 51 transmits a participation request response to the communication terminal 70C (step S16). Thus, the transmitting/receiving unit (acquisition unit) 71 of the communication terminal 70C receives the participation request response. The participation request response includes the session ID received in step S13, the distribution site information read in step S15, and a participation process result. The participation process result includes the site ID read in step S14. In the following, a description will be given of a case in which the participation process is successful. Through a process similar to the process illustrated in FIG. 26, the communication terminal 70D at the viewing site D performs a process for participating in a communication session.

Process for Managing Image Type Information

Figure 28:
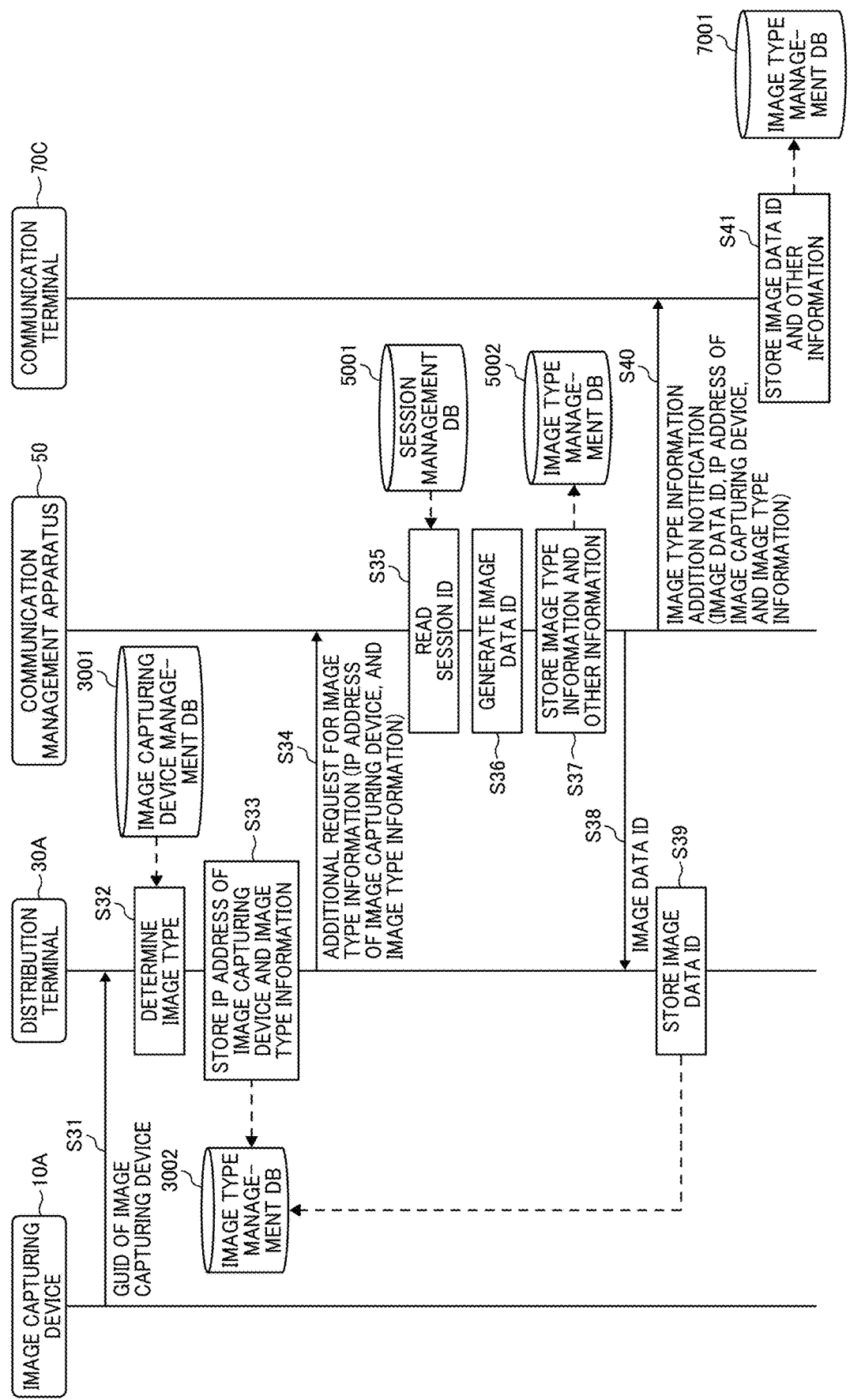
FIG. 28 is a sequence diagram illustrating an example process for managing image type information in the image communication system according to an embodiment of the present disclosure.

Next, a process for managing the image type information will be described with reference to FIG. 28. FIG. 28 is a sequence diagram illustrating a process for managing image type information in the image communication system 1.

First, when a user at the distribution site A connects the image capturing device 10A to the distribution terminal 30A, the storing and reading unit 19 of the image capturing device 10A reads the GUID of the image capturing device 10A from the storage unit 1000. Then, the communication unit 11 of the image capturing device 10A transmits the GUID of the image capturing device 10A to the distribution terminal 30A (step S31). Thus, the communication unit 37 of the distribution terminal 30A receives the GUID of the image capturing device 10A.

Then, the determination unit 35 of the distribution terminal 30A determines whether the same vendor ID and product ID as the vendor ID and product ID in the GUID received in step S31 are managed in the image capturing device management table (the image capturing device management DB 3001, see FIG. 15A) to determine the image type (step S32). Specifically, if the same vendor ID and product ID are managed in the image capturing device management DB 3001, the determination unit 35 determines that the image capturing device 10A is configured to capture a special image (here, a spherical image). By contrast, if the same vendor ID and product ID are not managed in the image capturing device management table (the image capturing device management DB 3001, see FIG. 15A), the determination unit 35 determines that the image capturing device 10A is configured to capture a general image.

Then, the storing and reading unit 39 stores, in the image type management table (the image type management DB 3002, see FIG. 15B), the IP address of the image capturing device 10A and image type information indicating the determination result obtained in step S32 in association with each other (step S33). In this state, no image data ID is associated with the IP address of the image capturing device 10A and the image type information. The image type information is, for example, a source name determined in accordance with a predetermined naming rule or an image type (general image or special image).

Then, the transmitting/receiving unit 31 transmits to the communication management apparatus 50 an additional request for the image type information (step S34). The additional request for the image type information includes the IP address of the image capturing device 10A and the image type information, which are stored in step S33, and the site ID of the distribution site A. Thus, the transmitting/receiving unit 51 of the communication management apparatus 50 receives the additional request for the image type information.

Then, the storing and reading unit 59 of the communication management apparatus 50 searches the session management table (the session management DB 5001, see FIG. 16A) using the site ID received in step S34 as a search key to read the corresponding session ID (step S35).

Then, the generation unit 56 generates a unique image data ID (step S36). Then, the storing and reading unit 59 stores, in the image type management table (the image type management DB 5002, see FIG. 16B), the session ID read in step S35, the image data ID generated in step S36, and the IP address of the image capturing device 10A and the image type information received in step S34 in association with each other as a new record (step S37). Then, the transmitting/receiving unit 51 transmits the image data ID generated in step S36 to the distribution terminal 30A (step S38). Thus, the transmitting/receiving unit 31 of the distribution terminal 30A receives the image data ID.

Then, the storing and reading unit 39 of the distribution terminal 30A stores, in the image type management table (the image type management DB 3002, see FIG. 15B), the image data ID received in step S38 in association with the IP address of the image capturing device 10A and the image type information stored in step S33 (step S39).

On the other hand, the transmitting/receiving unit 51 of the communication management apparatus 50 transmits an image type information addition notification to the communication terminal 70C (step S40). Thus, the transmitting/receiving unit (acquisition unit) 71 of the communication terminal 70C receives the image type information addition notification. The image type information addition notification includes the image data ID generated in step S36, and the IP address of the image capturing device 10A and the image type information stored in step S37.

Then, the storing and reading unit 79 of the communication terminal 70C stores, in the image type management table (the image type management DB 7001, see FIG. 20A), the image data ID, the IP address of the image capturing device 10A, and the image type information, which are received in step S40, in association with each other as a new record (step S41). Accordingly, the distribution terminal 30A and the communication terminal 70C can share the same information in the image type management DBs 3002 and 7001, respectively. The image type information addition notification is also transmitted to another communication terminal, namely, the communication terminal 70D, and is stored in the image type management DB 7001 of the communication terminal 70D.

Process for Communicating Captured Image Data

Figure 29:
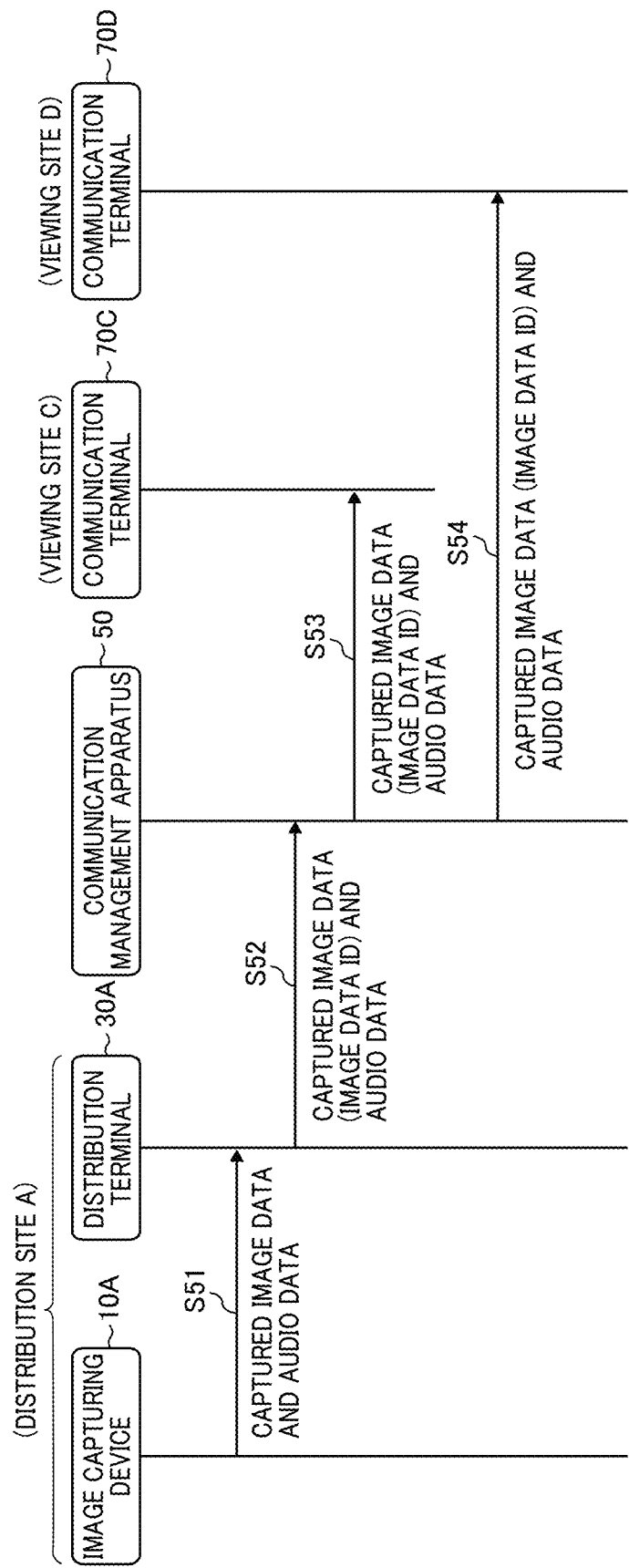
FIG. 29 is a sequence diagram illustrating an example process for communicating captured image data and audio data in the image communication system according to an embodiment of the present disclosure.

Next, a process for transmitting the captured image data and audio data obtained at the distribution site A to the communication terminals 70 (i.e., the communication terminals 70C and 70D) via the communication management apparatus 50 will be described with reference to FIG. 29. FIG. 29 is a sequence diagram illustrating an example process for communicating captured image data and audio data in the image communication system 1. FIG. 29 illustrates an example in which captured image data acquired by one image capturing device 10 is distributed to the communication terminals 70. However, similar processing is performed when a plurality of pieces of captured image data acquired by other image capturing devices 10 arranged in the distribution site are distributed.

First, the communication unit 11 of the image capturing device 10A transmits to the distribution terminal 30A captured image data acquired by capturing an object or surroundings such as scenery and audio data acquired by collecting sounds (step S51). Thus, the communication unit 37 of the distribution terminal 30A receives the captured image data and the audio data. In this case, since the image capturing device 10A is capable of obtaining two hemispherical images from which a spherical image is generated, as illustrated in FIGS. 3A and 3B, the captured image data includes data of two hemispherical images.

Then, the transmitting/receiving unit 31 of the distribution terminal 30A transmits to the communication management apparatus 50 the captured image data and the audio data sent from the image capturing device 10A (step S52). Thus, the transmitting/receiving unit 51 of the communication management apparatus 50 receives the captured image data, the audio data, and the image data ID. An image data ID for identifying the captured image data to be transmitted and received is also transmitted and received.

Then, the transmitting/receiving unit 51 of the communication management apparatus 50 transmits the captured image data and the audio data to the communication terminals (the communication terminals 70C and 70D) participating in the same session as the session in which the distribution terminal 30A is participating (steps S53 and S54). Thus, the transmitting/receiving unit (acquisition unit) 71 of each of the communication terminals 70C and 70D receives the captured image data and the audio data. The image data ID for identifying the captured image data to be transmitted and received is also transmitted and received.

Process for Displaying Points of Interest P

Figure 30:
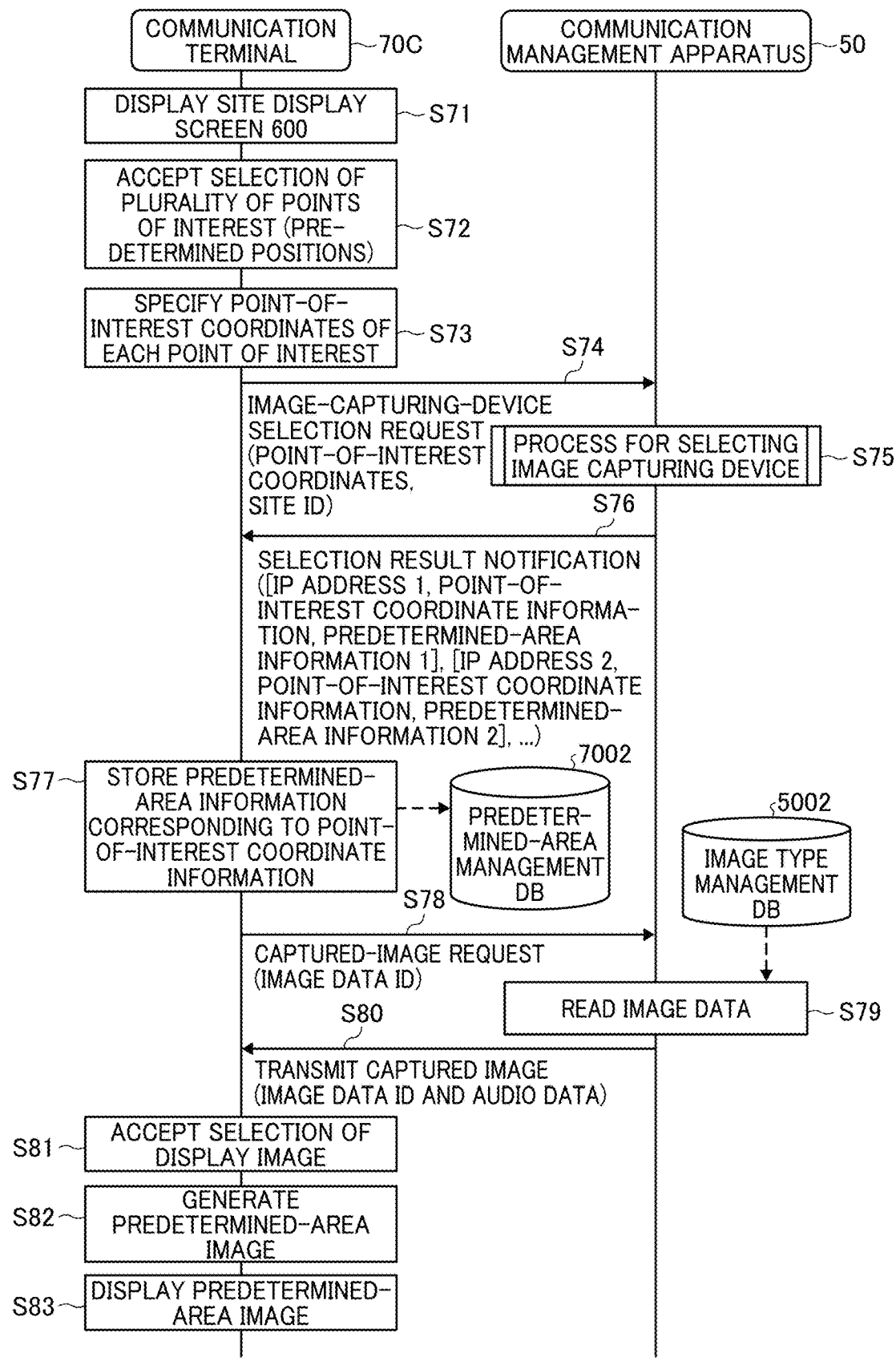
FIG. 30 is a sequence diagram illustrating an example process for displaying points of interest in the image communication system according to an embodiment of the present disclosure.

Next, a process for displaying an image of a plurality of points of interest Pn in a distribution site, which are designated by a user at a viewing site, will be described with reference to FIGS. 30 to 42. FIG. 30 is a sequence diagram illustrating an example process for displaying points of interest P in the image communication system 1. FIG. 30 illustrates an example in which the communication terminal 70C at the viewing site C displays a captured image distributed from the distribution terminal 30A. Similar processing is performed when the captured image is displayed on the communication terminal 70D at the viewing site D, which is another viewing site.

Figure 33:
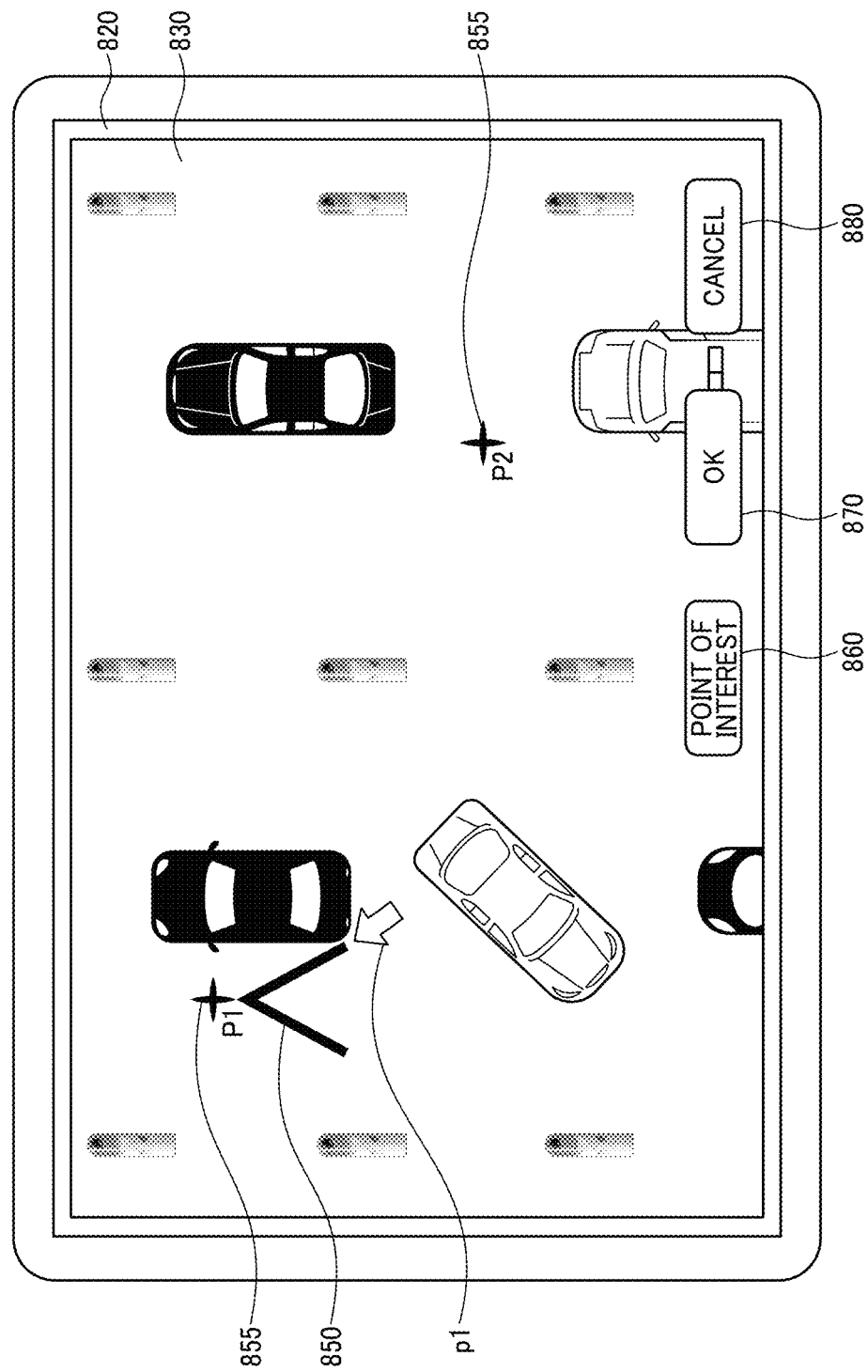
FIG. 33 is a view illustrating an example point-of-interest designation screen displayed on the communication terminal according to an embodiment of the present disclosure.

First, the display control unit 74 of the communication terminal 70C uses the distribution site information received in step S16 to cause the display 706 to display a site display screen 820 indicating the situation of the distribution site A (step S71). FIG. 33 is a view illustrating an example point-of-interest designation screen displayed on the communication terminal 70. The site display screen 820 illustrated in FIG. 33 displays a tour image 830 indicating the situation of a distribution site.

The site display screen 820 illustrated in FIG. 33 includes the tour image 830 for viewing a spherical image of the distribution site to enable remote viewers to see the distribution site, a point-of-view change icon 850 for changing the point of view to a predetermined image capturing point in the tour image 830, a cross (or a star or any other suitable mark) 855 indicating each point of interest P, a "point of interest" button 860, an "OK" button 870, and a "cancel" button 880. The "point of interest" button 860 is operated to display each point of interest P in the distribution site. The "OK" button 870 is operated to set selection of the points of interest P1, P2, etc. The "cancel" button 880 is operated to terminate the viewing of the distribution site.

The tour image 830 is displayed using the map image data included in the distribution site information received in step S16. The tour image 830 is an image of the distribution site, which is captured by the image capturing device 10 in advance. The user C1 can operate the point-of-view change icon 850 to understand the general arrangement and the like of the distribution site. Specifically, for example, the user C1 operates the point-of-view change icon 850 using a pointer p1 while viewing the tour image 830. As a result, the user C1 is able to view a desired portion in the distribution site. The tour image 830 is described herein as being displayed using the map image data included in the distribution site information received in step S16. However, the tour image 830 may be configured to display captured image data of the distribution site, which is received in real time.

Then, the user C1 operates the "point of interest" button 860 and operates the point-of-view change icon 850 using the pointer p1 such that the display control unit 74 accepts the designation (input) of the point of interest P1. Then, the user C1 operates the point-of-view change icon 850 in a place different from the point of interest P1 using the pointer p1 such that the acceptance unit 72 accepts the designation (input) of the point of interest P2. As described above, in response to the user C1 inputting the plurality of points of interest P1, P2, etc. and operating the "OK" button 870, the acceptance unit 72 accepts the selection of the plurality of points of interest Pn by the user C1 (step S72). The acceptance unit 72 may accept the designation of the plurality of points of interest Pn in response to a click or double-click operation of the user C1 using a mouse, which is an example of an input device.

Then, the point-of-interest specifying unit 77 specifies point-of-interest coordinates, which are the coordinates of each of the plurality of points of interest Pn for which the designation is accepted in step S72 (step S73). The point-of-interest coordinates specified by the point-of-interest specifying unit 77 are the coordinates of the central point of the tour image 830 being displayed when the designation of the plurality of points of interest Pn is accepted in step S72. The point-of-interest coordinates may be coordinates indicating the position of the pointer p1 in the tour image 830.

The transmitting/receiving unit (acquisition unit) 71 transmits to the communication management apparatus 50 an image-capturing-device selection request indicating a request for selecting an image capturing device 10 (step S74). Thus, the transmitting/receiving unit 51 of the communication management apparatus 50 receives the image-capturing-device selection request transmitted from the communication terminal 70C. The image-capturing-device selection request includes the point-of-interest coordinates specified in step S73 and the site ID received in step S16.

In the image communication system 1 according to this embodiment, when the processing of step S74 described above is executed, another apparatus or the like may be present between the communication terminal 70C (communication terminal) and the communication management apparatus 50 (communication management apparatus). That is, information may be transmitted and received between the communication terminal 70C and the communication management apparatus 50 via another apparatus or the like.

Process for Selecting Image Capturing Device

Figure 31:
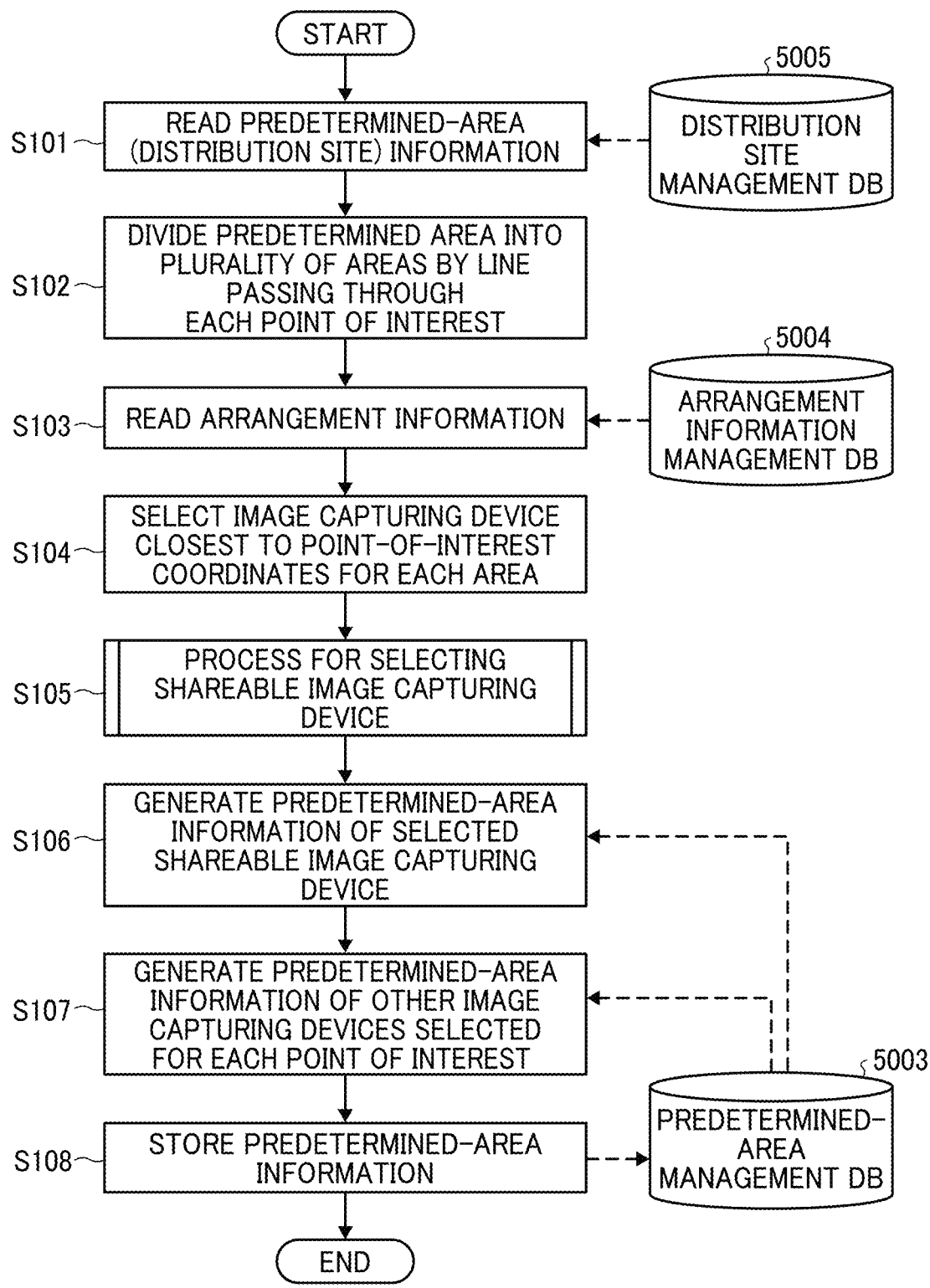
FIG. 31 is a flowchart illustrating an example process for selecting an image capturing device according to an embodiment of the present disclosure.

Then, the communication management apparatus 50 executes a process for selecting an image capturing device 10 in response to the image-capturing-device selection request received in step S74 (step S75). The process in step S75 will be described in detail with reference to FIGS. 31 and 21 to 24. FIG. 31 is a flowchart illustrating an example process for selecting an image capturing device.

First, the storing and reading unit 59 searches the distribution-site management table (the distribution site management DB 5005, see FIG. 19) using the site ID received in step S74 as a search key to read the distribution site information associated with the same site ID as the received site ID (step S101).

Then, the selection unit 53 divides, based on the point-of-interest coordinates indicating each of the plurality of points of interest Pn received in step S74, the area of the distribution site A into a plurality of areas by a line passing through the point of interest P, which indicates a predetermined position (step S102). In the example illustrated in FIG. 22, the point of interest P1 designated by the user C1 is indicated by a black circle. In this case, the selection unit 53 can select the image capturing devices 10A-1-1, 10A-1-2, 10A-1-3, and 10A-1-4, which are arranged at positions closest to the point of interest P1, from within the respective areas. The same applies to the point of interest P2.

Then, the storing and reading unit 59 searches the arrangement information management table (the arrangement information management DB 5004, see FIG. 18) using the site ID received in step S74 as a search key to read the arrangement information associated with the same site ID as the received site ID (step S103).

Then, the selection unit 53 selects the image capturing device 10 closest to the point-of-interest coordinates for each area obtained as a result of the division in step S102, based on the coordinate values indicated by the arrangement information read in step S103 (step S104). Specifically, the selection unit 53 sequentially performs processing on the image capturing devices 10 indicated in the arrangement information one by one.

First, for example, the selection unit 53 refers to the coordinate values indicated in the read arrangement information and determines in which of the areas (e.g., areas 1 to 4) the image capturing device 10 is located. Thereafter, the selection unit 53 calculates the distance between the coordinate values of the image capturing device 10 and the point-of-interest coordinates of each point of interest. If the image capturing device 10 is the first image capturing device 10 in the determined area or if the image capturing device 10 has a shorter distance than the image capturing device 10, which has been determined to have "the shortest distance at present" in the determined area, the selection unit 53 determines that the image capturing device 10 is the image capturing device 10 having "the shortest distance at present" in the determined area, and holds the identification information of the image capturing device 10 (e.g., the IP address of the image capturing device 10) and the calculated distance.

The selection unit 53 performs the process described above on all of the image capturing devices 10 indicated in the arrangement information to select the image capturing device 10 having "the shortest distance" in each of the areas obtained as a result of the division. The selection unit 53 selects a number of image capturing devices 10 equal to the number of areas obtained as a result of the division. In the example illustrated in FIG. 22, the selection unit 53 selects the image capturing devices 10A-1-1, 10A-1-2, 10A-1-3, and 10A-1-4 as the image capturing devices 10 closest to the point-of-interest coordinates of the point of interest P1 in the areas 1-1, 1-2, 1-3, and 1-4, respectively. Likewise, in the example illustrated in FIG. 23, the selection unit 53 selects the image capturing devices 10A-2-1, 10A-2-2, 10A-1-3, and 10A-2-4 as the image capturing devices 10 closest to the point-of-interest coordinates of the point of interest P2 in the areas 2-1, 2-2, 2-3, and 2-4, respectively. The process described above is also performed in the case illustrated in FIG. 24 in which three points of interest are set.

Then, the selection unit 53 selects a shareable image capturing device, based on the coordinate values indicated by the arrangement information read in step S103 (step S105).

Process for Selecting Shareable Image Capturing Device

Figure 32:
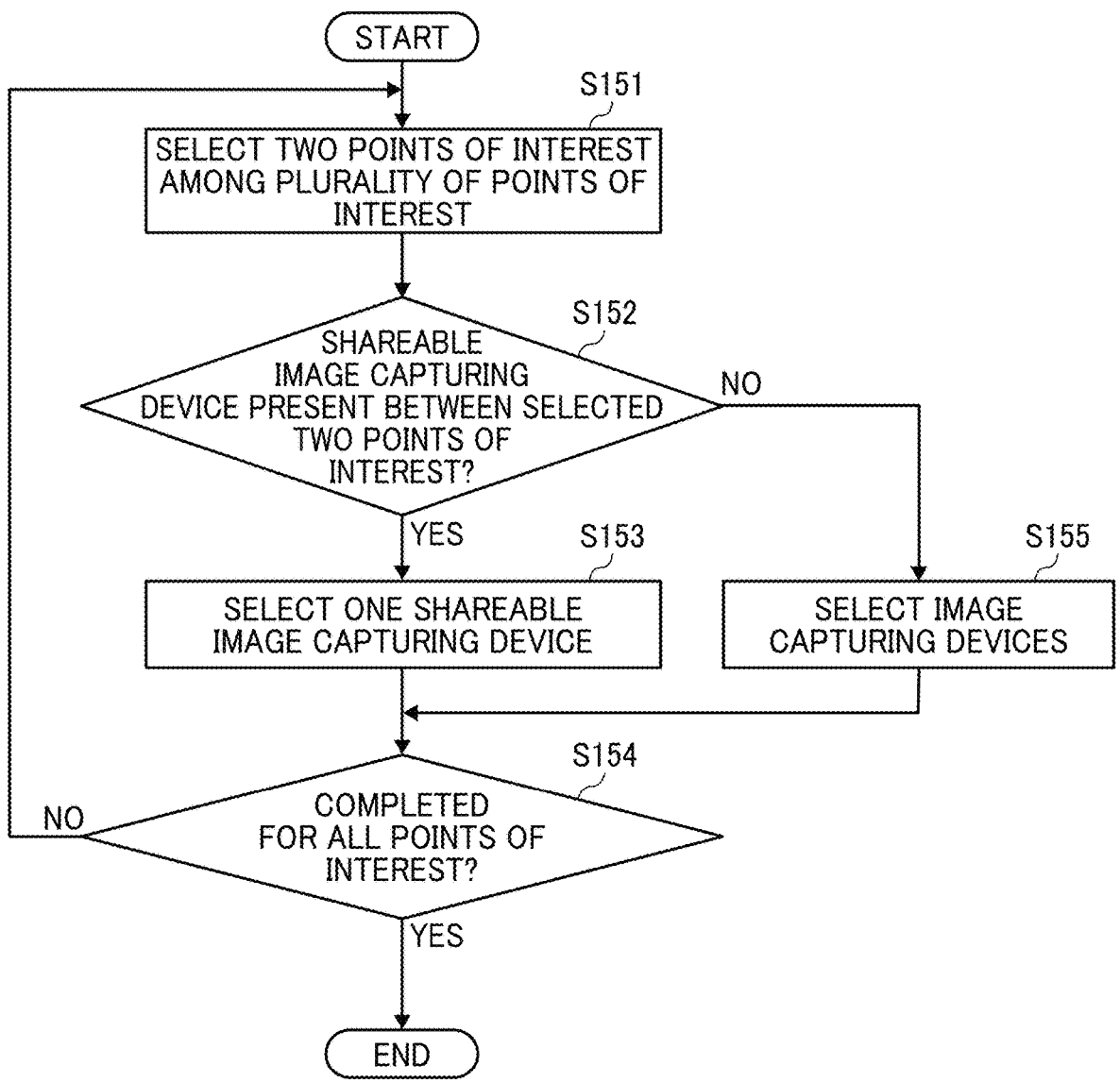
FIG. 32 is a flowchart illustrating an example process for selecting a shareable image capturing device according to an embodiment of the present disclosure.

FIG. 32 is a flowchart illustrating an example process for selecting a shareable image capturing device. First, the selection unit 53 selects two points of interest among the plurality of points of interest Pn designated by the user C1 (step S151). In FIGS. 22 and 23, two points of interest, namely, the points of interest P1 and P2, are illustrated.

Then, the determination unit 55 determines whether a shareable image capturing device is present between the selected two points of interest P1 and P2 (step S152). The determination of whether a shareable image capturing device is present in step S152 is to determine whether an image capturing device is available that is capable of providing predetermined-area information indicating a predetermined area in which each of the two designated positions (the points of interest P1 and P2) is viewed at the front. Specifically, the selection unit 53 reads from the predetermined-area management table (the predetermined-area management DB 5003, see FIG. 17) coordinate values indicating the position of each of the points of interest P1 and P2 designated by the user C1. Then, the selection unit 53 searches the respective coordinate values of the image capturing devices 10, which are managed in the arrangement information management table (the arrangement information management DB 5004, see FIG. 18), and selects an image 10 for which the distances from the coordinate values of the two points of interest (designated positions) are shortest and which is capable of sharing the images of the two points of interest (designated positions). That is, an image capturing device 10 for which the distance from the point of interest P1 and the distance from the point of interest P2 are shortest is a shareable image capturing device.

If a shareable image capturing device is present between the selected two points of interest (P1 and P2) (YES in step S152), the selection unit 53 selects one shareable image capturing device. In the example illustrated in FIGS. 22 and 23, the selection unit 53 selects the image capturing device 10A-1-4 (the image capturing device 10A-2-1) as a shareable image capturing device for the points of interest P1 and P2 (step S153). Since the calculation formula for determining shortest distances from the coordinate values of two points of interest (designated positions) described above can be obtained using known computation, the description thereof will be omitted.

Then, the determination unit 55 determines whether the determination of whether a shareable image capturing device is present is completed for all of the points of interest (step S154). The processing of step S154 is performed because three or more points of interest may be designated by the user C1. FIG. 24 is a view schematically describing an example relationship between three points of interest P and the image capturing devices 10. In the example illustrated in FIG. 24, three points of interest, further including the point of interest P3, are designated by the user C1. In a case in which two points of interest are designated, the determination of whether a shareable image capturing device is present is performed once. In a case in which three points of interest are designated, however, three combinations of two points of interest are generated, and the determination is performed three times accordingly. For example, the determination unit 55 first determines whether a shareable image capturing device is present between the points of interest P1 and P2. Also, the determination unit 55 determines whether a shareable image capturing device is present between the points of interest P1 and P3, and further determines whether a shareable image capturing device is present between the points of interest P2 and P3. Also in a case in which the user C1 designates four or more points of interest, the determination unit 55 performs the determination a plurality of times.

As in FIG. 24, if three points of interest P are designated and the determination unit 55 determines that the determination of whether a shareable image capturing device is present is not performed on all of the points of interest (NO in step S154), the process returns to step S151. On the other hand, if two points of interest are designated or if three points of interest are designated and the determination of whether a shareable image capturing device is present is completed for all of the combinations of two points of interest (YES in step S154), the process exits. That is, if the determination unit 55 determines that there is a plurality of combinations of point-of-interest coordinates of two points of interest among the point-of-interest coordinates indicating the plurality of points of interest Pn received by the transmitting/receiving unit 51, the generation unit 56 generates identification information of a shareable image capturing device obtained for each of the plurality of combinations, and pieces of predetermined-area information of the shareable image capturing device, each indicating a predetermined area in which a corresponding one of the two designated positions in each combination is viewed at the front.

If there is no shareable image capturing device between the selected two points of interest (P1 and P2) (NO in step S152), the selection unit 53 does not select a shareable image capturing device, but selects the image capturing devices 10 closest to the point-of-interest coordinates for the respective areas obtained as a result of the division in step S102 (step S155). In the example illustrated in FIG. 24, the selection unit 53 selects the image capturing devices 10A-2-1, 10A-2-2, 10A-2-3, and 10A-2-4 arranged at positions closest to the point of interest P2 from within the respective areas, and selects the image capturing devices 10A-3-1, 10A-3-2, 10A-3-3, and 10A-3-4 arranged at positions closest to the point of interest P3 from within the respective areas. Then, the process proceeds to step S154.

FIG. 25 is a view schematically describing an example relationship between the points of interest P1 and P2 and the image capturing devices 10 arranged in irregular positions. The process for selecting a shareable image capturing device is also applicable to a condition, as illustrated in FIG. 25, in which the image capturing devices 10 are arranged at irregular (or discrete) intervals in the distribution site.

Referring back to FIG. 31, the generation unit 56 generates predetermined-area information of the selected shareable image capturing device (step S106). In the processing of step S106, the generation unit 56 generates predetermined-area information, based on the relationship between predetermined-area information and the image of the predetermined area T illustrated in FIG. 7. As described above, the generation unit 56 calculates predetermined-area information indicating a predetermined area in which each point of interest is displayed at the front (or center), based on the following information: the point-of-interest coordinate values and the predetermined-area information (the radial distance (r), the polar angle ($\theta$), and the azimuth angle ($\phi$)) corresponding to the point-of-interest coordinate values, which are managed in the predetermined-area management table (the predetermined-area management DB 5003, see FIG. 17); and the coordinate values (x, y, z) corresponding to the IP address of the shareable image capturing device and the arrangement direction (the angle relative to the x axis) of the shareable image capturing device, which are managed in the arrangement information management table (the arrangement information management DB 5004, see FIG. 18). Specifically, the generation unit 56 generates predetermined-area information for displaying a predetermined-area image (an image in perspective projection) such that the point of interest indicated by the point-of-interest coordinates is located at the center of a spherical image captured by the selected shareable image capturing device 10. It is assumed here that the radial distance (r) and the polar angle ($\theta$) have predetermined values set in advance. The use of the predetermined values indicates that the image in perspective projection is processed with the angle of view and the elevation angle thereof being constant. As illustrated in FIG. 21, the azimuth angle ($\phi$) can be calculated as a relative value between the installation direction of the shareable image capturing device 10 indicated in the installation information and the direction from the shareable image capturing device 10 to the point of interest indicated by the point-of-interest coordinates. Then, the generation unit 56 generates, based on the calculated results, predetermined-area information for displaying a predetermined-area image (displaying an image in perspective projection) centered on the point-of-interest coordinates from a spherical image acquired by the shareable image capturing device 10.

Then, the generation unit 56 generates predetermined-area information of the other image capturing devices selected for each point of interest (step S107). That is, the generation unit 56 generates pieces of predetermined-area information, each indicating a predetermined area in which a corresponding one of the plurality of points of interest Pn is viewed at the front, based on identification information of image capturing devices 10 closest to the corresponding one of the plurality of points of interest Pn in a plurality of sub-areas obtained by dividing the area where the plurality of image capturing devices 10 are arranged into a predetermined number by one or more lines passing through the corresponding one of the plurality of points of interest Pn, and point-of-interest coordinate information indicating the coordinates of the corresponding one of the plurality of points of interest Pn. Specifically, the generation unit 56 generates predetermined-area information for displaying a predetermined-area image (an image in perspective projection) such that the point of interest indicated by the point-of-interest coordinates is located at the front of a spherical image captured by each of the selected image capturing devices 10A. The predetermined-area information of the other image capturing devices is generated using a method similar to that in step S106 described above. The generation unit 56 executes the process described above on each of the image capturing devices 10A selected in step S104. The arrangement positions indicating the coordinate values of the image capturing devices 10A and the arrangement directions of the image capturing devices 10A indicating the directions in which the front surfaces of the image capturing devices 10A face are set in advance in the arrangement information management DB 5004 by the administrator or the like. In the processing of step S106 described above, to obtain a combination of the IP address of an image capturing device and predetermined-area information, the storing and reading unit 59 and the selection unit 53 use the predetermined-area management table (the predetermined-area management DB 5003, see FIG. 17) and the arrangement information management table (the arrangement information management DB 5004, see FIG. 18), which are managed by the communication management apparatus 50, to generate corresponding predetermined-area information.

Then, the storing and reading unit 59 stores the predetermined-area information generated in steps S106 and S107 in the predetermined-area management table (the predetermined-area management DB 5003, see FIG. 17) in association with the IP addresses of the corresponding image capturing devices 10A (step S108).

As described above, the communication management apparatus 50 can select a shareable image capturing device 10 capable of providing predetermined-area information for the plurality of points of interest Pn, based on the respective point-of-interest coordinate values of the plurality of points of interest Pn transmitted from the communication terminal 70C and the arrangement information (coordinate values) of the plurality of image capturing devices 10.

In this embodiment, the generation unit 56 functions as an example of generation means. Further, the generation unit 56 that generates predetermined-area information may be included in, instead of the communication management apparatus 50, another apparatus disposed between the communication management apparatus 50 and the communication terminal 70.

Referring back to FIG. 30, the transmitting/receiving unit 51 of the communication management apparatus 50 transmits to the communication terminal 70C a selection result notification that is a result of the process in step S75 (step S76). Thus, the transmitting/receiving unit (acquisition unit) 71 of the communication terminal 70C receives the selection result notification transmitted from the communication management apparatus 50. The selection result notification includes identification information of the image capturing devices closest to each of the points of interest Pn, including the shareable image capturing device, which are selected in step S104, the pieces of predetermined-area information generated in steps S106 and S107 such that, for each of the image capturing devices closest to each of the points of interest Pn, the point of interest appears at the front, and respective pieces of predetermined-area information for the image capturing devices closest to each of the points of interest Pn. That is, the transmitting/receiving unit 51 transmits to the communication terminal 70C identification information (IP addresses) of image capturing devices 10 closest to each of the plurality of points of interest Pn, which is generated by the generation unit 56, coordinate information (coordinate values) indicating the coordinates of each of the plurality of points of interest Pn, and pieces of predetermined-area information, each indicating a predetermined area in which a corresponding one of the plurality of points of interest Pn is viewed at the front. As described above, the transmitting/receiving unit (acquisition unit) 71 of the communication terminal 70C acquires pieces of predetermined-area information, each indicating a predetermined area including a corresponding one of the plurality of points of interest Pn for which the selection is accepted in step S72.

As described above, the transmitting/receiving unit 51 transmits to the communication terminal 70C identification information (IP address) of a shareable image capturing device (the image capturing device 10A-1-4 (10A-2-1)), selected from among a plurality of image capturing devices, for which distances from any two designated positions (the points of interest P1 and P2) among the designated positions (coordinate values) indicating the plurality of pieces of designated-position information (points of interest Pn) received by the transmitting/receiving unit 51 are shortest and which is capable of sharing images of the two designated positions, and pieces of predetermined-area information of the shareable image capturing device (the image capturing device 10A-1-4 (10A-2-1)), each indicating a predetermined area in which a corresponding one of the two designated positions is viewed at the front.

The transmitting/receiving unit 51 of the communication management apparatus 50 can transmit the pieces of predetermined-area information to the communication terminal 70 at the same time or different times. When the transmitting/receiving unit 51 transmits the pieces of predetermined-area information to the communication terminal 70 at different times, the pieces of predetermined-area information may be transmitted in any order.

Then, the storing and reading unit 79 of the communication terminal 70C stores the predetermined-area information received in step S76 in the predetermined-area management table (the predetermined-area management DB 7002, see FIG. 20B) in association with the IP addresses of the image capturing devices 10 (step S77).

Then, the transmitting/receiving unit (acquisition unit) 71 transmits a captured-image request to the communication management apparatus 50 to acquire an image captured by the selected image capturing device 10 (step S78). Thus, the transmitting/receiving unit 51 of the communication management apparatus 50 receives the captured-image request transmitted from the communication terminal 70. The captured-image request includes the image data ID acquired in step S40.

Upon receipt of the captured-image request, the storing and reading unit 59 of the communication management apparatus 50 searches the image type management table (the image type management DB 5002, see FIG. 16B) using the image data ID as a search key to read the corresponding source name (image type information) (step S79). As a result, image data representing the captured image corresponding to the image data ID is specified.

The transmitting/receiving unit 51 transmits to the communication terminal 70C the image data representing the captured image that is read (step S80). Thus, the transmitting/receiving unit 71 of the communication terminal 70C receives the image data transmitted from the communication management apparatus 50. The image data includes the image data ID of the captured image and audio data.

Then, in response to a predetermined input operation of the user C1, the acceptance unit 72 accepts selection of a display image to be displayed on the communication terminal 70C within the captured image data received in step S53 (step S81). In a case in which the communication terminal 70C is capable of simultaneously displaying a plurality of captured images or in a case in which fewer captured images than the number of images simultaneously displayable on the communication terminal 70C are received, the processing of step S78 may be omitted.

Then, to display an image of a predetermined area specified in the predetermined-area information corresponding to the display image for which selection is accepted in step S81, the image and audio processing unit 73 applies perspective projection conversion using the predetermined-area information received in step S76 to generate a predetermined-area image (step S82). As a result, the communication terminal 70C can generate a predetermined-area image including the point of interest P designated by the user in an image (spherical image) captured by the image capturing device 10 selected by the communication management apparatus 50.

Then, the display control unit 74 causes the display 706 to display the predetermined-area image generated in step S82 (step S83).

Example Predetermined-Area Images Displayed on Screen

Figure 34:
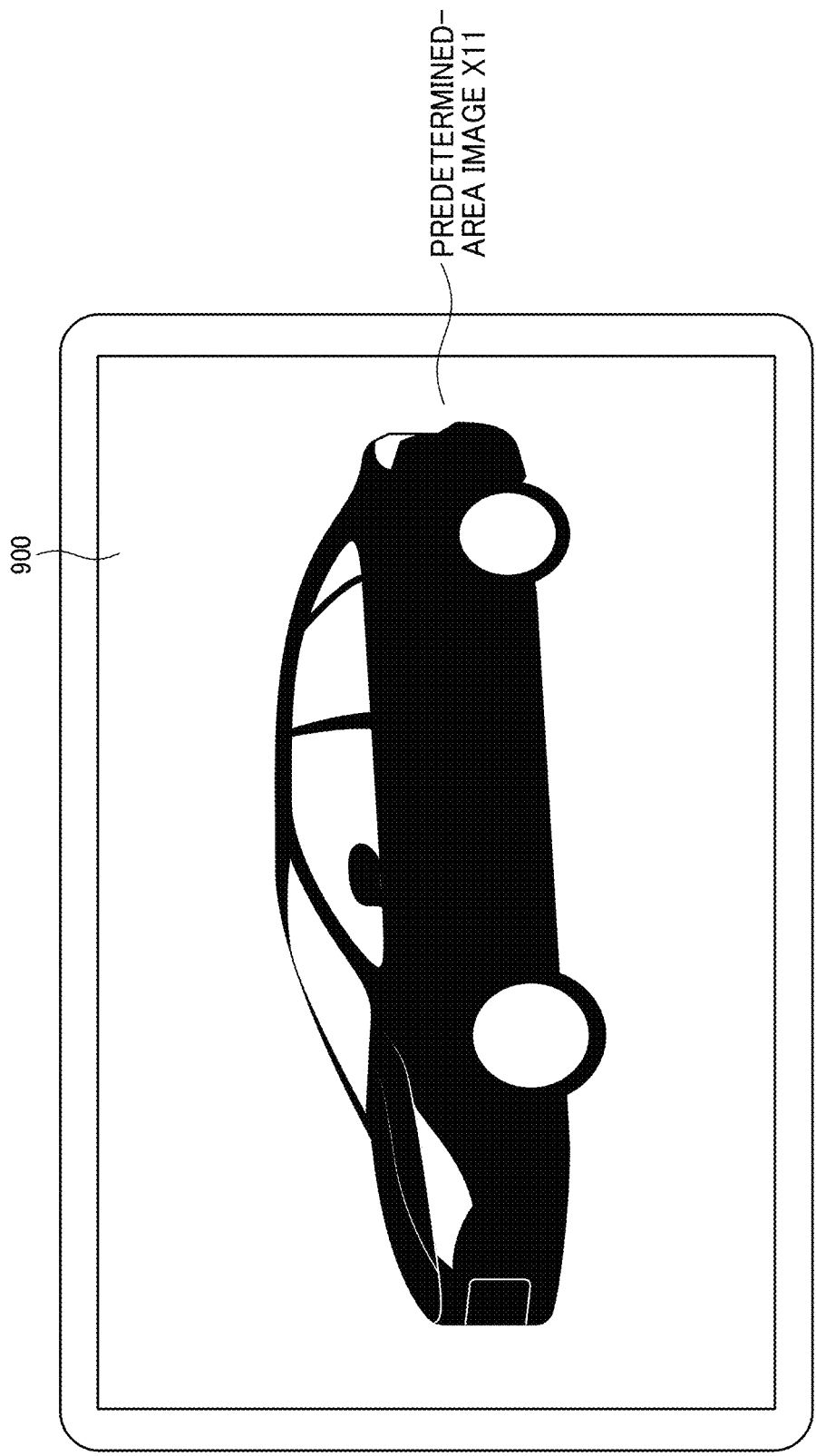
FIG. 34 is a view illustrating an example display screen on which an image captured by an image capturing device near the first point of interest is displayed, according to an embodiment of the present disclosure.
Figure 35:
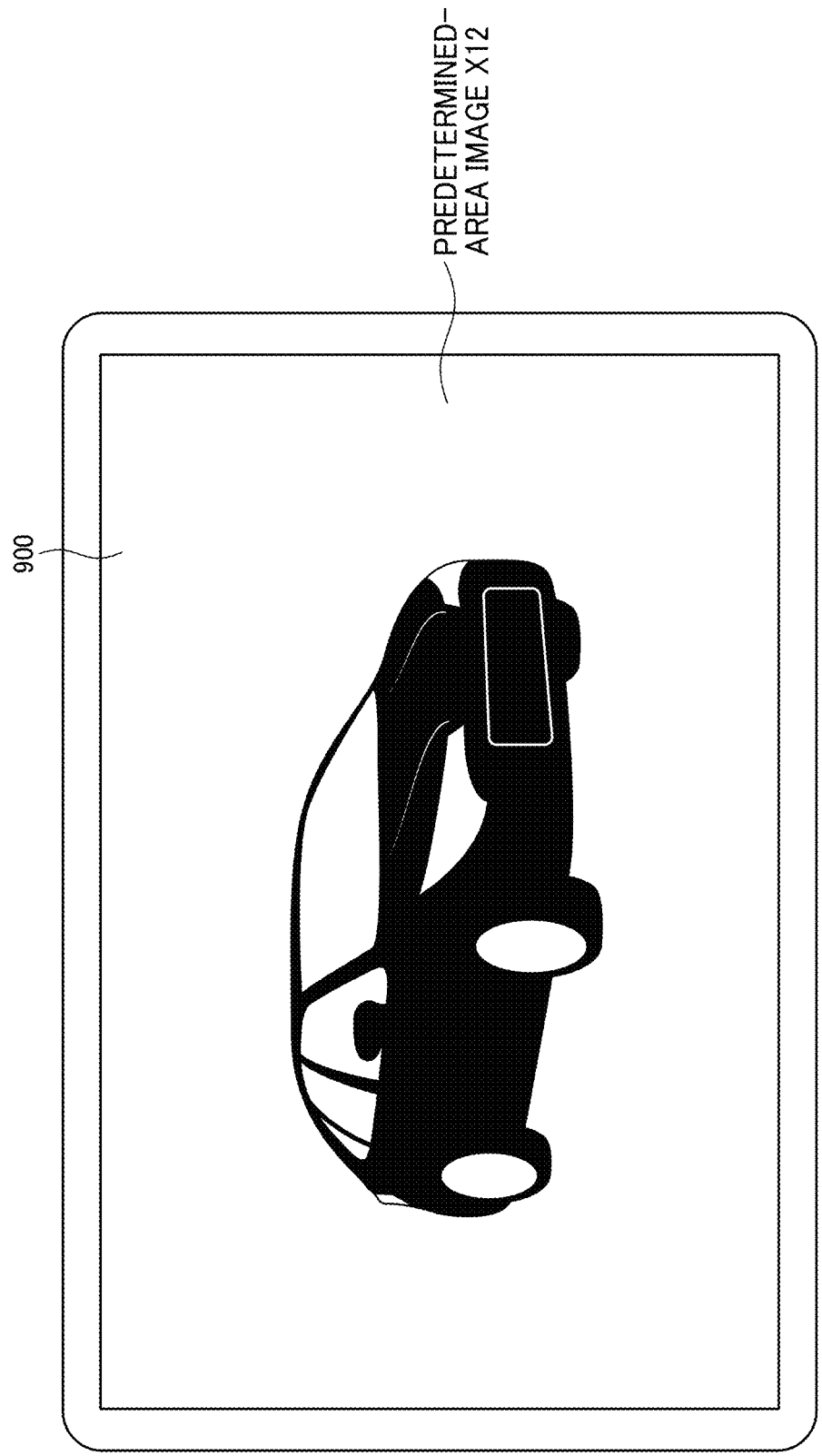
FIG. 35 is a view illustrating an example display screen on which an image captured by an image capturing device near the first point of interest is displayed, according to an embodiment of the present disclosure.
Figure 36:
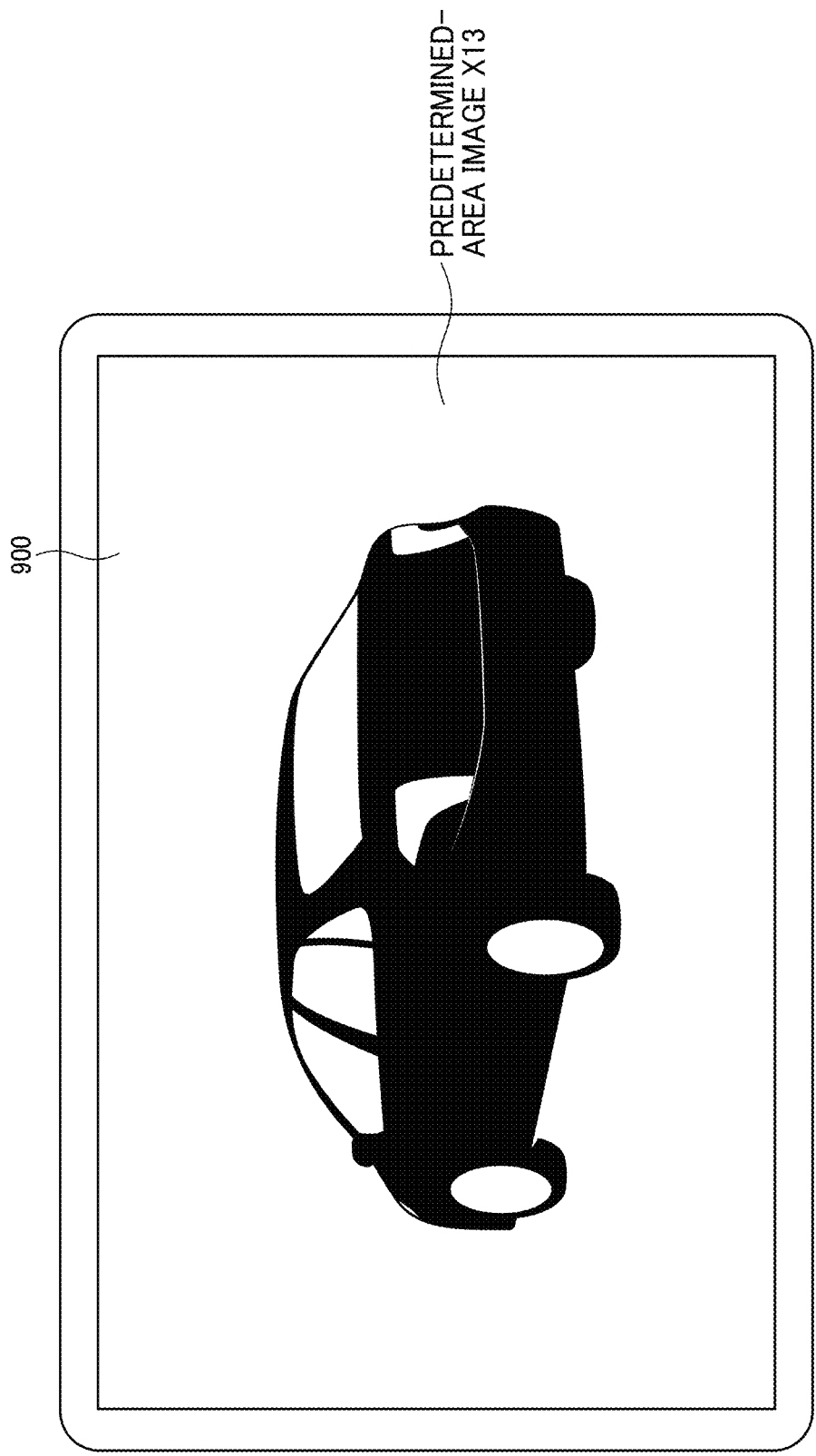
FIG. 36 is a view illustrating an example display screen on which an image captured by an image capturing device near the first point of interest is displayed, according to an embodiment of the present disclosure.
Figure 37:
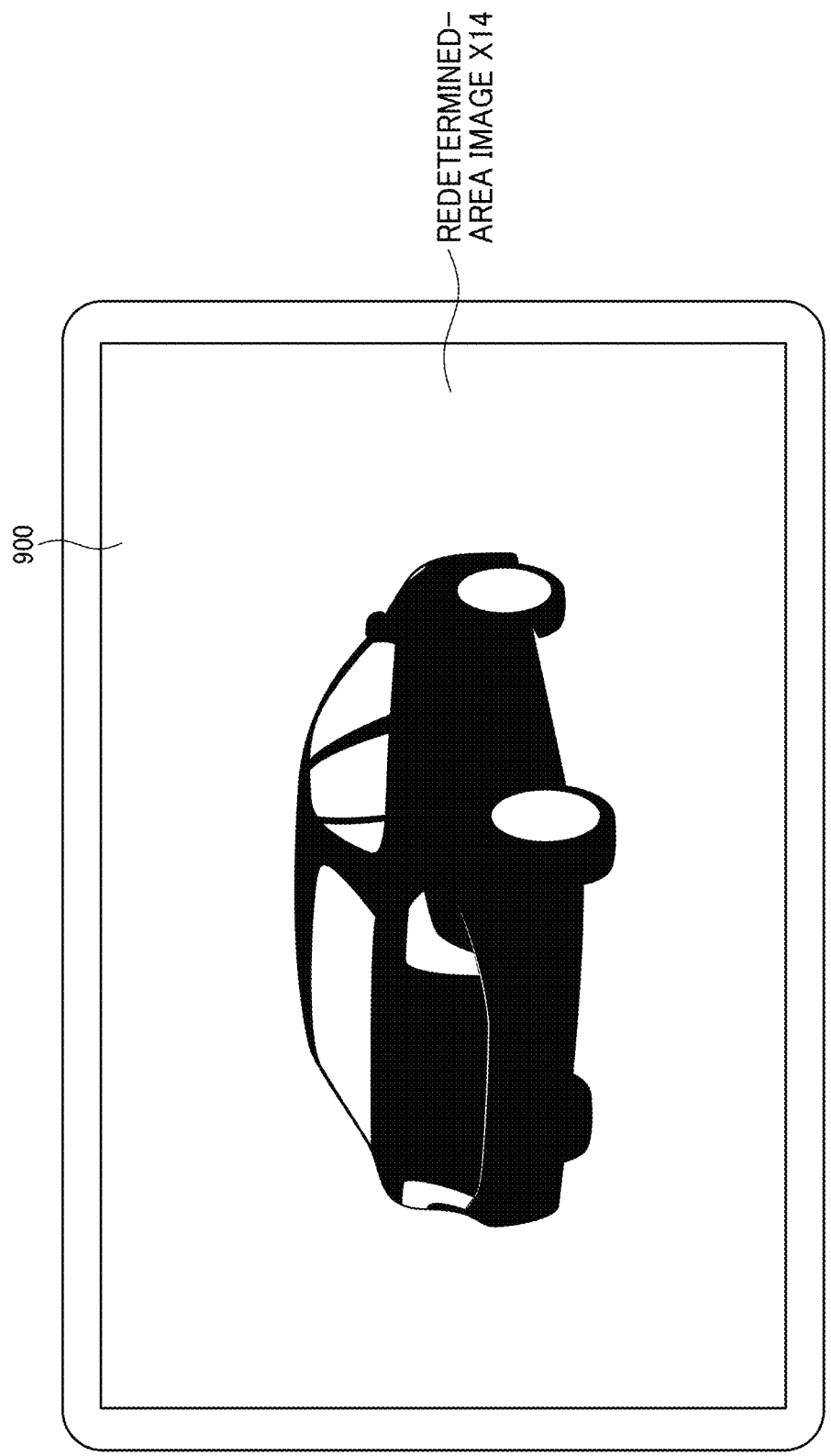
FIG. 37 is a view illustrating an example display screen on which an image captured by an image capturing device near the first point of interest is displayed, according to an embodiment of the present disclosure.

Example screens displayed on the communication terminal 70 according to this embodiment will now be described. FIGS. 34 to 37 are views illustrating example display screens on which images captured by image capturing devices near the point of interest P1 are displayed. In the captured images, an object (vehicle) is inclined by an angle (azimuth angle) between lines connecting the respective image capturing devices and the point of interest P1 in FIG. 34, which is, for example, about 45 degrees relative to the x axis. In the example illustrated in FIG. 34, a predetermined-area image X11 is displayed on the communication terminal 70. In FIG. 34, the predetermined-area image X11 in which one vehicle appears in the background, which is captured when the image capturing device 10A-1-1 sees the point of interest P1 at the center while inclined about 45 degrees counterclockwise from the x axis, is displayed on the communication terminal 70. Also in FIGS. 35, 36, and 37, predetermined-area images X12, X13, and X14 are displayed on the communication terminal 70, respectively.

Figure 38:
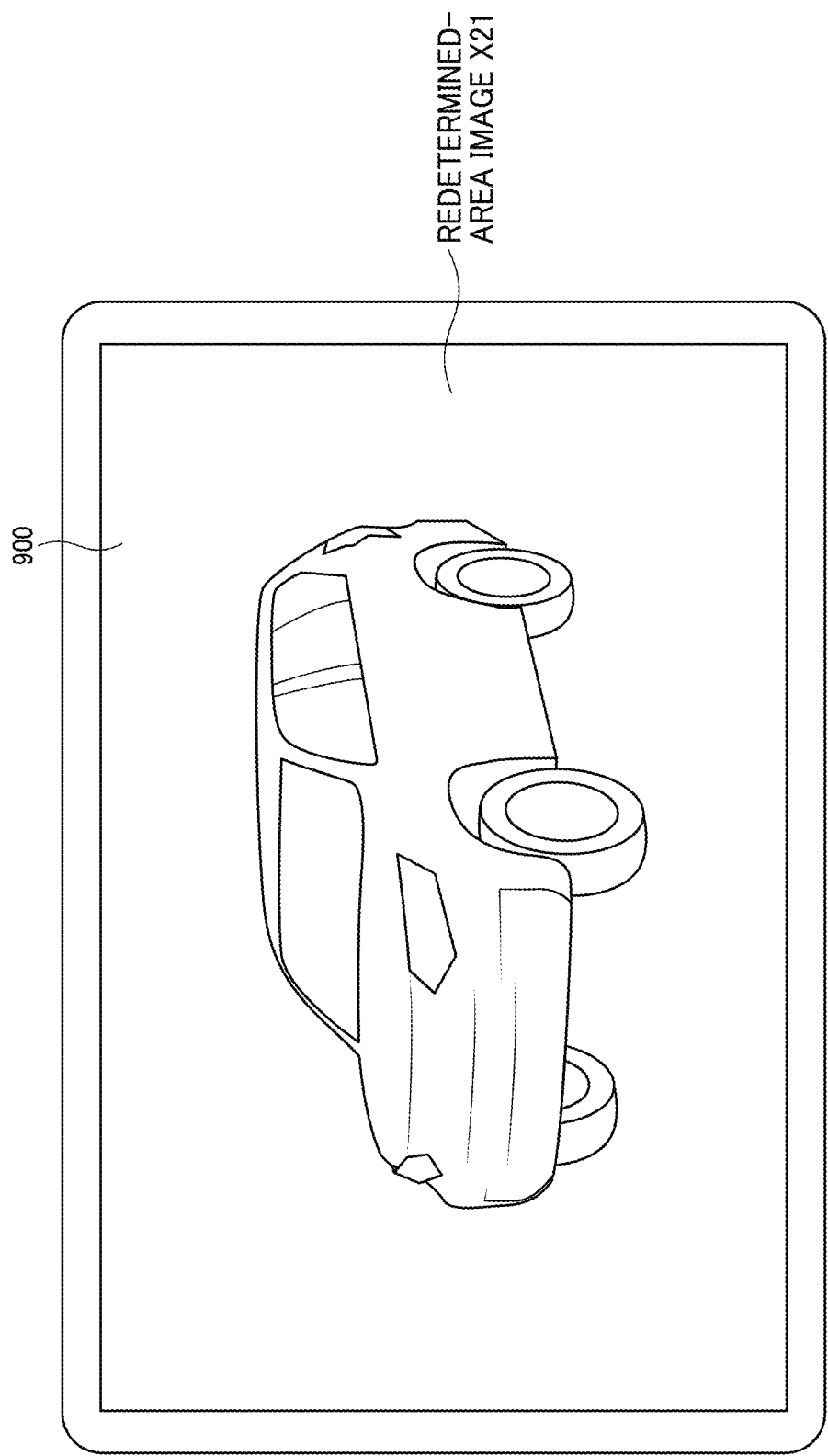
FIG. 38 is a view illustrating an example display screen on which an image captured by an image capturing device near the second point of interest is displayed, according to an embodiment of the present disclosure.
Figure 39:
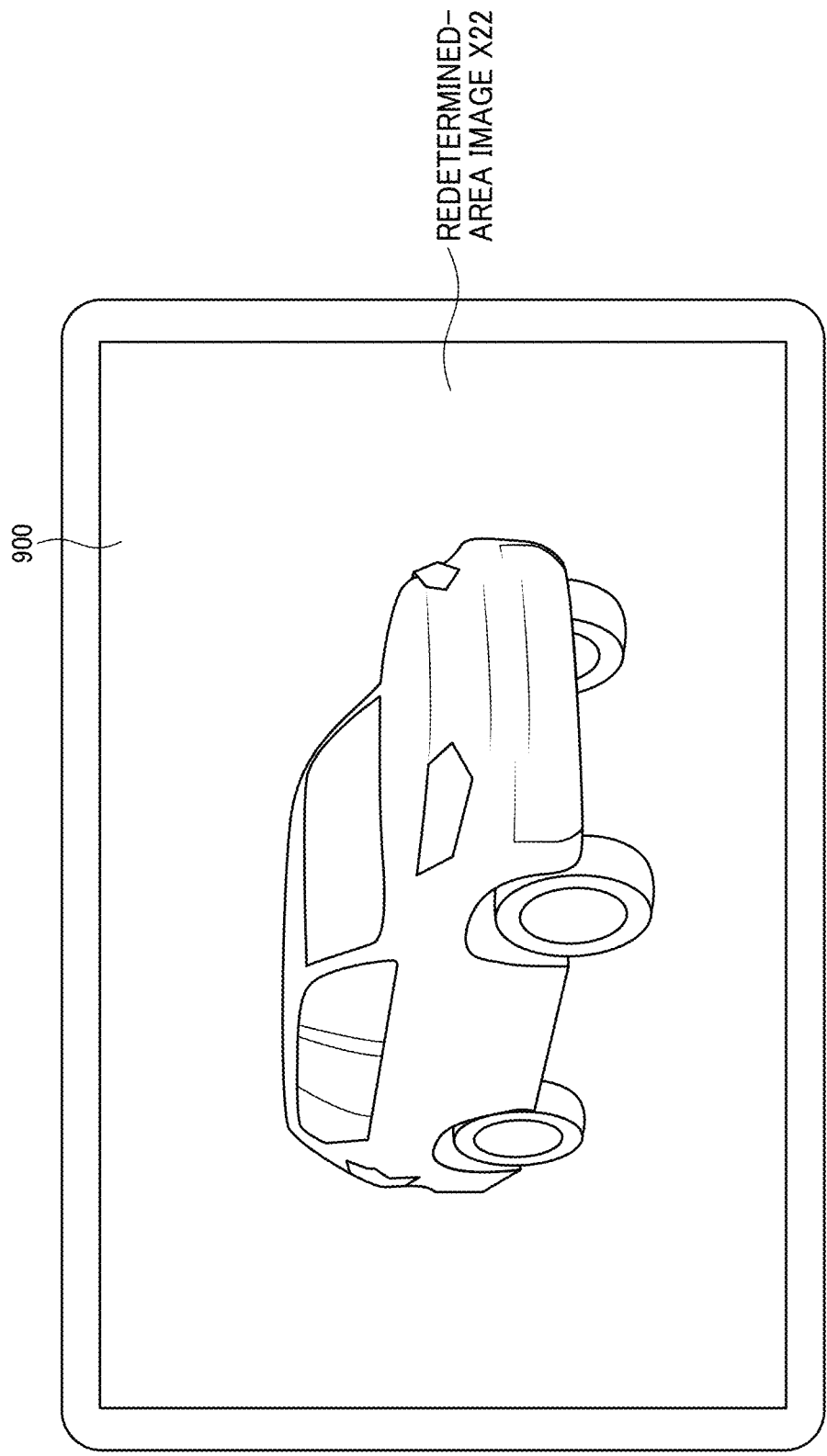
FIG. 39 is a view illustrating an example display screen on which an image captured by an image capturing device near the second point of interest is displayed, according to an embodiment of the present disclosure.
Figure 40:
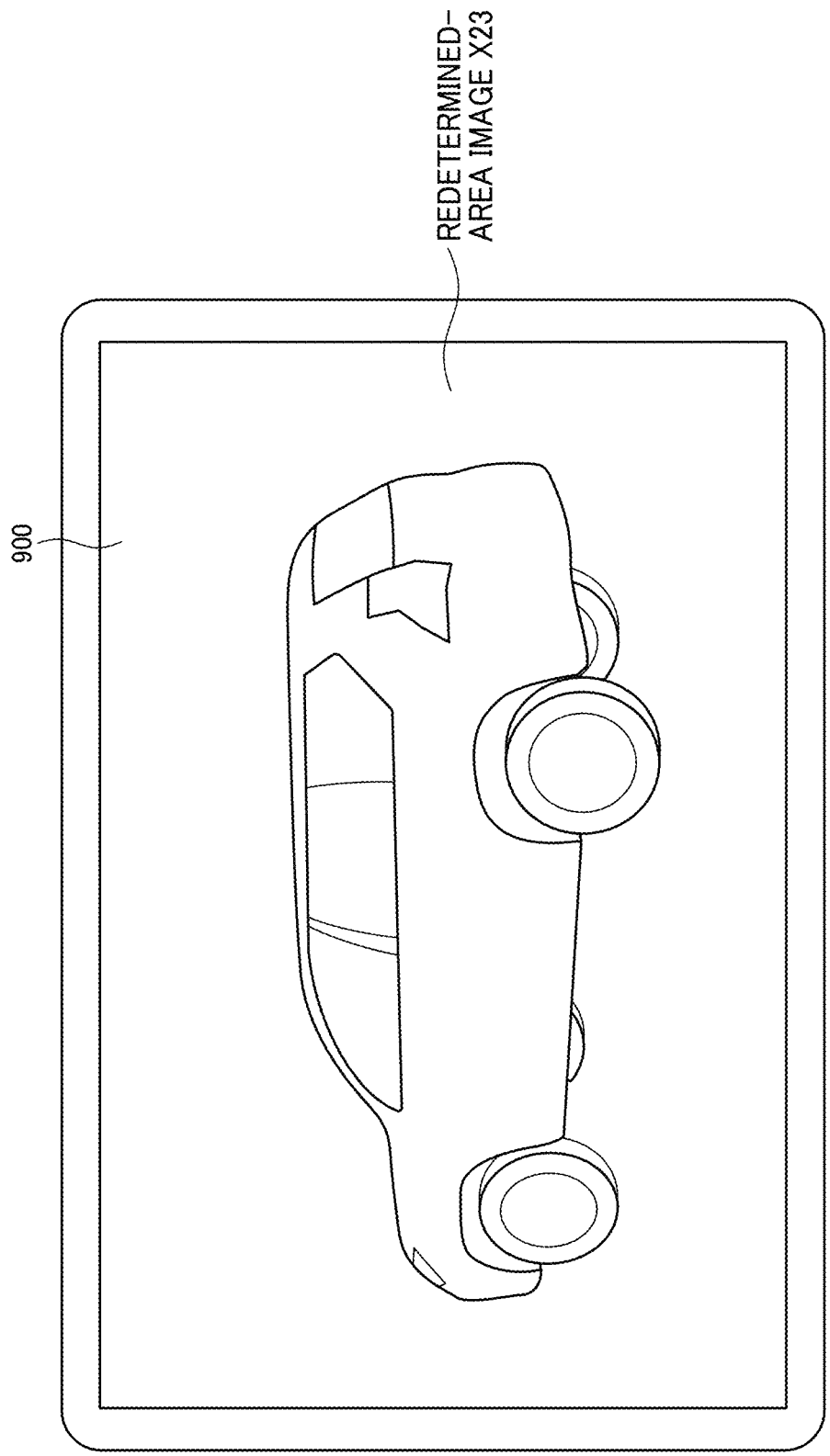
FIG. 40 is a view illustrating an example display screen on which an image captured by an image capturing device near the second point of interest is displayed, according to an embodiment of the present disclosure.
Figure 41:
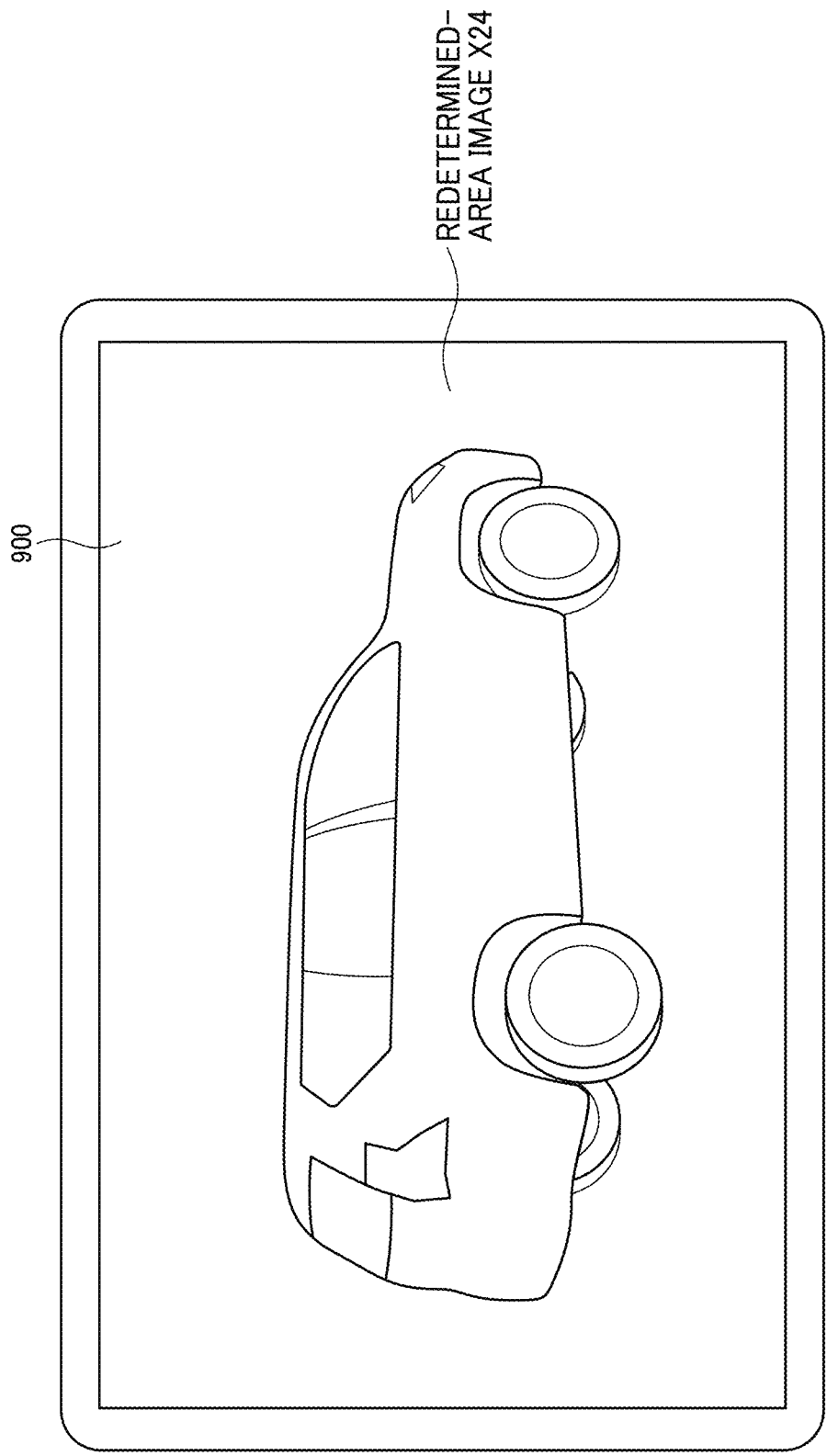
FIG. 41 is a view illustrating an example display screen on which an image captured by an image capturing device near the second point of interest is displayed, according to an embodiment of the present disclosure.

FIGS. 38 to 41 are views illustrating example display screens on which images captured by image capturing devices near the point of interest P2 are displayed. In the captured images, an object (vehicle) is inclined by an angle (azimuth angle) between lines connecting the respective image capturing devices and the point of interest P2 in FIG. 38, which is, for example, about 60 degrees relative to the x axis. In the example illustrated in FIG. 38, a predetermined-area image X21 is displayed on the communication terminal 70. In FIG. 38, the predetermined-area image X21 in which another vehicle appears in the background, which is captured when the image capturing device 10A-2-1 sees the point of interest P2 at the center while inclined about 60 degrees counterclockwise from the x axis, is displayed on the communication terminal 70. Also in FIGS. 39, 40, and 41, predetermined-area images X22, X23, and X24 are displayed on the communication terminal 70, respectively.

Example Screen Displayed on Communication Terminal

Figure 42:
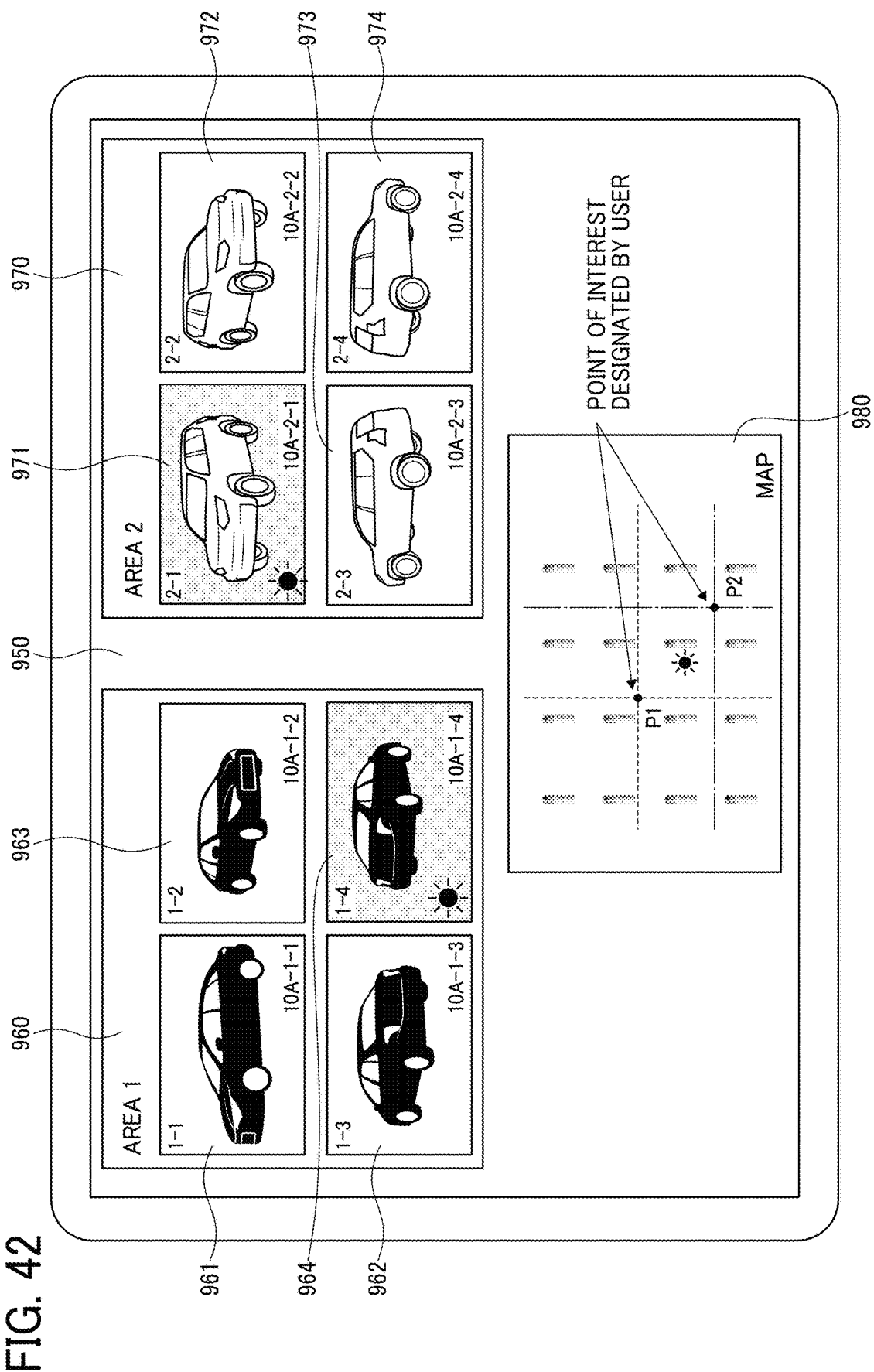
FIG. 42 is a view illustrating an example display screen on the communication terminal in response to selection of a plurality of points of interest, according to an embodiment of the present disclosure.

FIG. 42 is a view illustrating an example display screen on the communication terminal 70 in response to selection of a plurality of points of interest. First, the user of the communication terminal 70 operates the point-of-view change icon 850, the pointer p1, the "point of interest" button 860, and the like in the tour image 830 (see FIG. 33) displayed on the display 706 to designate the points of interest P1 and P2 at two different positions. In response to receipt of the designation of the points of interest P1 and P2 by the user, the display control unit 74 of the communication terminal 70 displays a display screen 950 illustrated in FIG. 42. For example, the display screen 950 presents an area-1 screen 960 including images captured by image capturing devices in area 1 provided by the point of interest P1 designated by the user. The area-1 screen 960 includes screens 961, 962, 963, and 964, each displaying a predetermined-area image in which the point of interest P1 is viewed at the center. The screens 961, 962, 963, and 964 are displayed in the display screen 950 such that the screens 961, 962, 963, and 964 display predetermined-area images in which the point of interest P1 is viewed at the center in spherical images captured by the image capturing devices 10A-1-1, 10A-1-2, 10A-1-3, and 10A-1-4 closest to the point of interest P1, respectively. As described above, the image capturing devices 10A-1-1, 10A-1-2, 10A-1-3, and 10A-1-4 closest to the point of interest P1 are selected by the selection unit 53 from within the areas 1-1, 1-2, 1-3, and 1-4, which are obtained by dividing the area into four from the point of interest P1, respectively.

The display screen 950 also presents an area-2 screen 970 including images captured by image capturing devices in area 2 provided by the point of interest P2 designated by the user. The area-2 screen 970 includes screens 971, 972, 973, and 974, each displaying a predetermined-area image in which the point of interest P2 is viewed at the center. The screens 971, 972, 973, and 974 are displayed in the display screen 950 such that the screens 971, 972, 973, and 974 display predetermined-area images in which the point of interest P2 is viewed at the center in spherical images captured by the image capturing devices 10A-2-1, 10A-2-2, 10A-2-3, and 10A-2-4 closest to the point of interest P2, respectively. As described above, the image capturing devices 10A-2-1, 10A-2-2, 10A-2-3, and 10A-2-4 closest to the point of interest P2 are selected by the selection unit 53 from within the areas 2-1, 2-2, 2-3, and 2-4, which are obtained by dividing the area into four from the point of interest P2, respectively.

In this case, the predetermined-area image in which the point of interest P1 is viewed at the center in the area 1-4 in the area-1 screen 960 and the predetermined-area image in which the point of interest P2 is viewed at the center in the area 2-1 in the area-2 screen 970 are two predetermined-area images in the spherical image captured by the same image capturing device 10A-1-4 (or 10A-2-1). That is, as illustrated in FIG. 42, the user is able to simultaneously view different predetermined-area images in the spherical image captured by the same image capturing device 10A-1-4 (or 10A-2-1) arranged at the distribution site. At this time, the display control unit 74 of the communication terminal 70 may change the content displayed in at least one of the sub-screen 1-4 in the area-1 screen 960 and the sub-screen 2-1 in the area-2 screen 970 to distinguish them from the sub-screens displaying the other predetermined-area images and indicate that the sub-screens 1-4 and 2-1 display predetermined-area images captured by the same image capturing device. Specific examples of the method for changing the content displayed in at least one of the sub-screens 1-4 and 2-1 include adding a predetermined character, alphanumeric character, sign, mark, background, or the like, changing the screen display size, and making the screen blink. In the example illustrated in FIG. 42, a sun mark is added to both the sub-screens 1-4 and 2-1 by the display control unit 74.

In the display screen 950, a map 980 is further displayed by display control unit 74. The map 980 indicates a bird's-eye view of the distribution site A. The map 980 contains the points of interest P1 and P2 designated by the user, which are indicated by black circles, at the coordinates corresponding to the respective coordinate values of the points of interest P1 and P2. This enables the user to simultaneously check the predetermined-area images distributed from the distribution site for each point of interest designated by the user while comparing the area-1 screen 960, the area-2 screen 970, and the map 980.

As described above, in the image communication system 1, image capturing devices suitable to simultaneously view the plurality of points of interest Pn designated by a user at a viewing site can be selected using the communication management apparatus 50. In the image communication system 1, furthermore, predetermined-area information capable of displaying images of the plurality of points of interest Pn, which are captured by selected image capturing devices 10, is transmitted from the communication management apparatus 50 to the communication terminal 70. As a result, the images indicating the plurality of points of interest Pn can be displayed on the communication terminal 70.

In the image communication system 1 according to this embodiment, when processing such as the processing of steps S74 to S76 or the processing of steps S78 to S80 described above is executed, another apparatus or the like may be present between the communication management apparatus 50 (communication management apparatus) and the communication terminal 70 (communication terminal). That is, information may be transmitted and received between the communication management apparatus 50 and the communication terminal 70 via another apparatus.

In this embodiment, the selection unit 53 divides the distribution site into four areas, by way of example. However, the selection unit 53 may change the number of areas in accordance with the number of image capturing devices 10 or distribution terminals 30 arranged in the distribution site, the network bandwidth of the communication network 100, the number of images simultaneously receivable and displayable at the communication terminal 70, or the like.

Modification of Process for Displaying Points of Interest P

Figure 43:
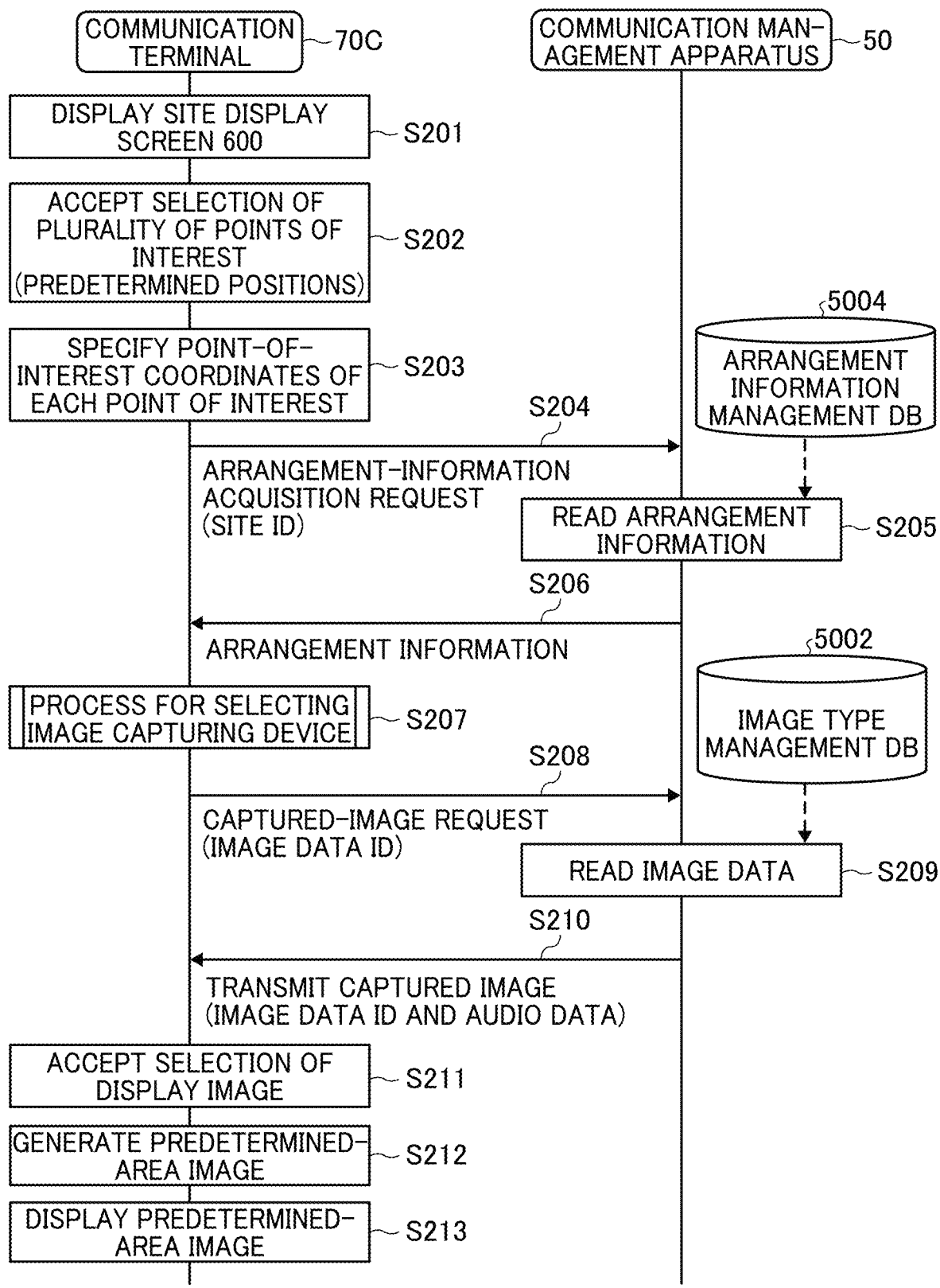
FIG. 43 is a sequence diagram illustrating a modification of the process for displaying points of interest in the image communication system.

Next, a modification of the process for displaying the points of interest P in the image communication system 1 will be described with reference to FIG. 43. FIG. 43 is a sequence diagram illustrating a modification of the process for displaying points of interest P in the image communication system 1. FIG. 43 illustrates an example in which the process for selecting an image capturing device 10 described above is executed by the communication terminal 70C at the viewing site C. Since the processing of steps S201 to S203 is similar to the processing of steps S71 to S73 in FIG. 30, the description thereof will be omitted.

In FIG. 43, the transmitting/receiving unit (acquisition unit) 71 transmits to the communication management apparatus 50 an arrangement-information acquisition request, which is a request for acquiring arrangement information indicating the arrangement positions of the image capturing devices 10 (step S204). Thus, the transmitting/receiving unit 51 of the communication management apparatus 50 receives the arrangement-information acquisition request transmitted from the communication terminal 70C. The arrangement-information acquisition request includes the site ID received in steps S14 and S16.

Then, the communication management apparatus 50 searches the arrangement information management table (the arrangement information management DB 5004, see FIG. 18) using the site ID received in step S204 as a search key to read the arrangement information associated with the same site ID as the received site ID (step S205). Then, the transmitting/receiving unit 51 transmits the arrangement information read in step S205 to the communication terminal 70C (step S206). Thus, the transmitting/receiving unit (acquisition unit) 71 of the communication terminal 70C receives the arrangement information transmitted from the communication management apparatus 50.

Then, the selection unit 81 executes a process for selecting an image capturing device 10, based on the coordinate values indicated by the arrangement information read in step S206 (step S207). Since the process for selecting an image capturing device 10 executed in step S207 is similar to the processing of step S75 illustrated in FIG. 30 (the detailed process is illustrated in the flowchart in FIG. 31), the description thereof will be omitted. The processing of steps S101 and S103 may be omitted. Then, in step S107, the storing and reading unit 79 stores the predetermined-area information in the predetermined-area management table (the predetermined-area management DB 7002, see FIG. 20B) instead of the predetermined-area management table (the predetermined-area management DB 5003, see FIG. 17). Since the processing of steps S208 to S213 is similar to the processing of steps S78 to S83 in FIG. 30, the description thereof will be omitted.

As described above, in the image communication system 1 according to a modification of the embodiment, the communication terminal 70 performs a process for selecting an image capturing device 10 that captures images in which points of interest P designated by a user are displayed. As a result, images indicating the points of interest P can be displayed on the communication terminal 70. Therefore, as in the embodiment described above, the image communication system 1 allows a user at a viewing site to simultaneously view images of a plurality of points of interest designated by the user.

An image capturing device capable of PTZ operations has a delay in its response to PTZ operations and a limited mechanical operation range. In particular, considering the mechanical operation range, even if a wide-angle camera capable of covering about 180° is placed in front of a designated point of interest, an image capturing device capable of PTZ operations is moved with a movement of an object near the point of interest. It is therefore desirable that a plurality of image capturing devices be arranged at a distribution site.

As described above, the communication management apparatus 50 in the image communication system 1 according to an embodiment of the present disclosure receives coordinate information of a plurality of points of interest Pn transmitted from the communication terminal 70 (step S74), and transmits to the communication terminal 70 the IP address of the shareable image capturing device 10A-1-4 (10A-2-1) for which distances from the coordinate values of any two points of interest (the respective coordinate values of the points of interest P1 and P2) among the respective coordinate values of the plurality of points of interest Pn are shortest and which is capable of sharing images of the two points of interest P1 and P2, and pieces of predetermined-area information of the shareable image capturing device 10A-1-4 (10A-2-1), each indicating a predetermined area in which a corresponding one of the two points of interest P1 and P2 is viewed at the front (step S76). The communication terminal 70 receives the pieces of predetermined-area information of the shareable image capturing device 10A-1-4 (10A-2-1), each indicating a predetermined area in which a corresponding one of the two points of interest P1 and P2 is viewed at the front (step S76), and displays, on the display 706, predetermined-area images in which the two points of interest P1 and P2 are viewed at the front, based on the pieces of predetermined-area information of the shareable image capturing device 10A-1-4 (10A-2-1) (step S83). As described above, the communication management apparatus 50 can cause the communication terminal 70 to simultaneously display respective predetermined-area images of a plurality of points of interest Pn designated by a user, which are obtained by a shareable image capturing device, without performing special processing for the image capturing devices 10. This enables the user who designates the plurality of points of interest Pn to simultaneously check predetermined-area images of points of interest, which are captured by a single image capturing device, on the screen of the communication terminal 70.

In addition, since a shareable image capturing device is selected, the processing load on the communication management apparatus 50 in the image communication system 1 may be reduced by an amount corresponding to one image capturing device.

In the embodiment described above, as an example of a spherical image (spherical panoramic image), the captured image (entire image) is a three-dimensional panoramic image. However, the captured image (entire image) may be a two-dimensional panoramic image.

In the embodiment described above, furthermore, the communication terminal 70 at a viewing site may not be dedicated to viewing. The communication terminal 70 may be configured to distribute a captured image and simultaneously implement both the distribution function and the viewing function. Likewise, the distribution terminal 30 at a distribution site may not be dedicated to distribution. The distribution terminal 30 may be configured to display a captured image distributed from any other site and simultaneously implement both the distribution function and the viewing function. As described above, the image communication system 1 may be configured to perform two-way communication of a captured image between a plurality of sites.

Each of the functions in the embodiment described above may be implemented by one or more processing circuits or circuitry. In the embodiment described above, the term "processing circuit or circuitry" includes a device programmed to implement each function using software, such as a processor implemented by an electronic circuit. Examples of the device include an application specific integrated circuit (ASIC), a digital signal processor (DSP), a field programmable gate array (FPGA), a system on a chip (SOC), a graphics processing unit (GPU), and a conventional circuit module.

Further, various tables in the embodiment described above may be generated by machine learning. Further, data of associated items can be classified, such that use of tables can be optional. As used herein, machine learning is a technique that enables a computer to acquire human-like learning ability. Machine learning refers to a technology in which a computer autonomously generates an algorithm to be used for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of those learning methods.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A communication management apparatus for communicating with a communication terminal that displays images captured by a plurality of image capturing devices, the communication management apparatus comprising circuitry configured to:
   receive pieces of designated-position information transmitted from the communication terminal, each of the pieces of designated-position information indicating a corresponding one of a plurality of designated positions in an area where the plurality of image capturing devices are provided; and
   transmit, to the communication terminal, identification information of a shareable image capturing device selected from among the plurality of image capturing devices and pieces of predetermined-area information of the shareable image capturing device, the shareable image capturing device being an image capturing device for which distances from any two designated positions among the plurality of designated positions indicated by the pieces of designated-position information that are received are shortest and which is capable of sharing images of the two designated positions, each of the pieces of predetermined-area information of the shareable image capturing device indicating a predetermined area in which a corresponding one of the two designated positions is viewed at the front.

2. The communication management apparatus according to claim 1,
   wherein a plurality of combinations of any two designated positions among the plurality of designated positions are present, and
   wherein the circuitry transmits, to the communication terminal, identification information of a shareable image capturing device determined for each of the plurality of combinations, and pieces of predetermined-area information of the shareable image capturing device, each indicating a predetermined area in which a corresponding one of the two designated positions in the combination is viewed at the front.

3. The communication management apparatus according to claim 1, wherein the circuitry is further configured to
   select the shareable image capturing device from among the plurality of image capturing devices, based on coordinate information indicating each of the plurality of designated positions that is received, and arrangement position information indicating arrangement positions of the plurality of image capturing devices.

4. The communication management apparatus according to claim 1, wherein the circuitry is further configured to
generate pieces of predetermined-area information, each indicating a predetermined area in which a corresponding one of the plurality of designated positions is viewed at the front, the generation of each of the pieces of predetermined-area information being based on identification information of image capturing devices closest to a corresponding one of the plurality of designated positions in a plurality of sub-areas obtained by dividing the area where the plurality of image capturing devices are provided into a predetermined number by one or more lines passing through the corresponding one of the plurality of designated positions, and designated-position coordinate information indicating coordinates of the corresponding one of the plurality of designated positions.

5. The communication management apparatus according to claim 4,
wherein the circuitry generates each of the pieces of predetermined-area information, based on arrangement directions and azimuth angles of image capturing devices closest to a corresponding one of the plurality of designated positions in the plurality of sub-areas, the azimuth angles being angles relative to the corresponding one of the plurality of designated positions.

6. The communication management apparatus according to claim 4,
wherein the circuitry transmits, to the communication terminal, identification information of an image capturing device closest to each of the plurality of designated positions, designated-position coordinate information indicating coordinates of a corresponding one of the plurality of designated positions, and predetermined-area information indicating a predetermined area in which the corresponding one of the plurality of designated positions is viewed at the front.

7. An image communication system comprising:
the communication management apparatus according to claim 1; and
a communication terminal configured to display the images captured by the plurality of image capturing devices, the communication terminal including a terminal circuitry configured to:
receive pieces of predetermined-area information, each indicating a predetermined area in which a corresponding one of the plurality of designated positions is viewed at the front; and
control a display to display predetermined-area images based on the pieces of predetermined-area information, each of the predetermined-area images being an image in which a corresponding one of the plurality of designated positions is viewed at the front.

8. The image communication system according to claim 7, wherein the terminal circuitry of the communication terminal is further configured to
receive input of the plurality of designated positions in the area where the plurality of image capturing devices are provided, the plurality of designated positions being displayed on the display, and
transmit the pieces of designated-position information to the communication management apparatus, each of the pieces of designated-position information indicating a corresponding one of the plurality of designated positions for which the input is received.

9. A communication management method, performed by a communication management apparatus configured to communicate with a communication terminal that displays images captured by a plurality of image capturing devices, the communication management method comprising:
receiving pieces of designated-position information transmitted from the communication terminal, each of the pieces of designated-position information indicating a corresponding one of a plurality of designated positions in an area where the plurality of image capturing devices are provided; and
transmitting to the communication terminal identification information of a shareable image capturing device selected from among the plurality of image capturing devices and pieces of predetermined-area information of the shareable image capturing device, the shareable image capturing device being an image capturing device for which distances from any two designated positions among the plurality of designated positions indicated by the received pieces of designated-position information are shortest and which is capable of sharing images of the two designated positions, each of the pieces of predetermined-area information of the shareable image capturing device indicating a predetermined area in which a corresponding one of the two designated positions is viewed at the front.

10. A non-transitory recording medium which, when executed by one or more processors in a communication management apparatus, causes the processors to perform a communication management method, the communication management apparatus being configured to communicate with a communication terminal that displays images captured by a plurality of image capturing devices, the communication management method comprising:
receiving pieces of designated-position information transmitted from the communication terminal, each of the pieces of designated-position information indicating a corresponding one of a plurality of designated positions in an area where the plurality of image capturing devices are provided; and
transmitting to the communication terminal identification information of a shareable image capturing device selected from among the plurality of image capturing devices and pieces of predetermined-area information of the shareable image capturing device, the shareable image capturing device being an image capturing device for which distances from any two designated positions among the plurality of designated positions indicated by the received pieces of designated-position information are shortest and which is capable of sharing images of the two designated positions, each of the pieces of predetermined-area information of the shareable image capturing device indicating a predetermined area in which a corresponding one of the two designated positions is viewed at the front.

\* \* \* \* \*